(12) United States Patent
Watters

(10) Patent No.: US 12,522,270 B1
(45) Date of Patent: *Jan. 13, 2026

(54) CONCRETE TOOL SUPPORT SHELF OR RACK FOR A CONCRETE WHEELBARROW OR SIMILAR DEVICE AND A METHOD OF USING A CONCRETE TOOL SUPPORT SHELF OR RACK TO CLEAN CONCRETE MATERIALS FROM CONCRETE TOOLS

(71) Applicant: Dennis K. Watters, McKees Rocks, PA (US)

(72) Inventor: Dennis K. Watters, McKees Rocks, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,399

(22) Filed: Feb. 6, 2024

Related U.S. Application Data

(63) Continuation of application No. 17/749,706, filed on May 20, 2022, now Pat. No. 11,945,489.

(60) Provisional application No. 63/191,369, filed on May 21, 2021.

(51) Int. Cl.
    *B62B 5/00* (2006.01)
    *B62B 1/18* (2006.01)

(52) U.S. Cl.
    CPC .............. *B62B 5/0003* (2013.01); *B62B 1/18* (2013.01)

(58) Field of Classification Search
    CPC ................................ B62B 5/0003; B62B 1/18
    See application file for complete search history.

(56) References Cited

U.S. PATENT DOCUMENTS

| | | | | |
|---|---|---|---|---|
| 3,028,617 | A * | 4/1962 | Racina | A47L 23/22 15/112 |
| 3,142,853 | A * | 8/1964 | Hensley | A47L 23/22 248/230.8 |
| 5,374,095 | A * | 12/1994 | Ramseth | B62B 1/20 D34/27 |
| 5,437,075 | A * | 8/1995 | Peake | A47L 23/22 15/160 |
| 5,622,266 | A * | 4/1997 | Curtis | B07B 1/46 209/365.1 |
| 6,547,309 | B1 * | 4/2003 | Franklin | B62B 1/20 296/98 |
| 6,898,817 | B1 * | 5/2005 | Jackson | B60R 3/04 15/112 |
| 7,070,316 | B1 * | 7/2006 | Roth | B28C 5/0893 366/242 |
| 7,240,910 | B2 * | 7/2007 | Stuemke | B65F 1/14 280/79.5 |
| 7,467,590 | B1 * | 12/2008 | Meller | A47B 37/00 297/188.09 |
| 8,191,684 | B1 * | 6/2012 | Dammann | A46B 15/0055 15/237 |
| 8,997,658 | B2 * | 4/2015 | Pipkorn | B62B 5/0013 108/42 |
| D732,785 | S * | 6/2015 | Thorsen | D34/27 |
| 9,352,359 | B2 * | 5/2016 | Lamjav | B07B 1/04 |
| 9,358,583 | B1 * | 6/2016 | Kahn | B07B 1/282 |
| 10,040,217 | B2 * | 8/2018 | Frammartino | B28D 7/04 |
| 10,220,505 | B2 * | 3/2019 | Thorsen | B62B 1/20 |
| 10,414,533 | B2 * | 9/2019 | Davis | B62B 1/266 |
| 10,582,819 | B2 * | 3/2020 | Sickler | A47L 7/0019 |

(Continued)

*Primary Examiner* — Kimberly T Wood

(57) ABSTRACT

A concrete tool support shelf or rack for a concrete wheelbarrow or similar device and a method of using a concrete tool support shelf or rack to clean concrete materials from concrete tools.

8 Claims, 54 Drawing Sheets

(56) References Cited

U.S. PATENT DOCUMENTS

| | | | | |
|---|---|---|---|---|
| 10,800,437 | B2* | 10/2020 | Paino | B62B 5/06 |
| 11,945,489 | B2* | 4/2024 | Watters | B62B 1/204 |
| 2002/0144935 | A1* | 10/2002 | Tims | B07B 1/005 |
| | | | | 209/420 |
| 2004/0055979 | A1* | 3/2004 | Fabregas | B25H 3/06 |
| | | | | 211/70.6 |
| 2004/0195140 | A1* | 10/2004 | Friel | B62B 1/20 |
| | | | | 296/39.1 |
| 2004/0217238 | A1* | 11/2004 | Chochinov | B25H 3/06 |
| | | | | 248/99 |
| 2005/0212238 | A1* | 9/2005 | Conley | B62B 1/20 |
| | | | | 280/47.32 |
| 2005/0251939 | A1* | 11/2005 | Levingston | A47L 23/26 |
| | | | | 15/112 |
| 2012/0305455 | A1* | 12/2012 | Westgard | B07B 1/02 |
| | | | | 209/401 |
| 2013/0056397 | A1* | 3/2013 | Geller | B62B 1/204 |
| | | | | 209/352 |
| 2015/0001267 | A1* | 1/2015 | Thorsen | B62B 1/22 |
| | | | | 224/401 |

\* cited by examiner

CONCRETE TOOL SUPPORT SHELF OR RACK FOR A CONCRETE WHEELBARROW OR SIMILAR DEVICE AND A METHOD OF USING A CONCRETE TOOL SUPPORT SHELF OR RACK TO CLEAN CONCRETE MATERIALS FROM CONCRETE TOOLS

CROSS-REFERENCE TO RELATED APPLICATIONS

The present application is a continuation of pending U.S. patent application Ser. No. 17/749,706, filed May 20, 2022, which claims the benefit of U.S. provisional patent application 63/191,369, filed May 21, 2021, which applications are incorporated by reference as if set forth herein in their entirety.

BACKGROUND INFORMATION

1. Technical Field

In the concrete building industry, it is necessary to regularly clean concrete tools of the concrete materials that build up on the tools to prevent the concrete from hardening and ruining the tool. Such concrete tools include wheelbarrows, rubber boots, work boots, gloves, safety glasses, levels, tape measures, shovels, rakes, concrete rakes, come-along rakes, tampers, screeds, straight edges, bump cutters, flat pieces of lumber, bull floats, magnesium floats, kneeling boards, trowels, float blades, troweling blades, groove cutters, jointers, edgers, and brooms. All of these different tools and devices need to be kept as free of concrete material as possible. Concrete finishing tools especially need to be kept free of hardened concrete material in order to maintain smooth edges and surfaces necessary to produce a smooth concrete surface with minimal surface irregularities, such as scratches, bumps, ridges, and grooves.

2. Background Art

This section is for informational purposes only and does not necessarily admit that any publications discussed or referred to herein, if any, are prior art.

In the concrete building industry, wheelbarrows are used extensively. These wheelbarrows usually have a metal tray made of steel or similar strong metal. The tray has a generally flat bottom and side surfaces that extend upwardly at an angle to form a basin or dish-like structure for holding things. For ease of understanding, since the term "tray" generally refers to flat structures or plates, such as used in food service, and since the wheelbarrow often can be relatively and more like a basin in shape, the term "basin" will be used herein to refer to the tray of the wheelbarrow. The basin is mounted on a support frame, also usually made of a strong metal. Connected to the support frame are two extending handles made of wood or metal. Finally, one or sometimes two wheels are connected to the frame to both support the wheelbarrow and permit a worker to roll the wheelbarrow from one location to the other. Wheelbarrows for concrete work usually must be made of quite durable materials due to the weight of the concrete mix that is often transported in the wheelbarrows.

Wheelbarrows are traditionally used in the concrete building industry for a few main functions. The first is transporting items from one location to the other, such as concrete tools and concrete materials, such as water, aggregate (rock, sand, or gravel), and Portland cement. A second function is for mixing batches of concrete in the basin. A third function is for holding water in the basin and then using the basin as a sort of wash basin for cleaning concrete materials off of the concrete tools.

When using the wheelbarrow basin as a wash basin, the wheelbarrow basin is at least partially filled with water. A worker then uses brushes and scrapers to remove the concrete material from the tools. Some of the tools, such as trowels, have handles that allow for the tool to be hung on the side of the wheelbarrow basin while cleaning. Larger items, like the lengthy concrete screeds, push brooms, and rakes can be leaned against the wheelbarrow, but are quite difficult to handle. Often these tools, especially brooms and similar devices, are simply soaked with water and then struck against the ground to shake off the concrete material, leaving substantial amounts of concrete material on the ground of the work site, which is undesirable. Most tools though are left in a nearby bucket or simply dropped into the water in the wheelbarrow basin like dishes in a kitchen sink.

The cleaning process is both time-consuming and labor-intensive. For example, a worker cleaning such tools cannot easily place them somewhere during cleaning or drying. Leaving the tools in a bucket requires the worker to regularly bend down and up to pick up and deposit tools, which is often quite painful and strenuous for a concrete worker at the end of a long work day. Often tools get dropped or knocked off of the edge of the wheelbarrow during cleaning, thereby possibly dirtying the tools again and requiring the worker to once again bend down and up. The cleaning process requires the worker to use two hands: one to hold a brush and one to hold the tool. While this is not very challenging for small, handheld tools, it is quite cumbersome and difficult for large tools like screeds and brooms that are hard to manipulate with one hand. Tools and brushes often are dropped into the water, again risking becoming dirty due to concrete materials in the dirty water. In addition, as the water becomes increasingly dirtied with concrete materials, it can become more and more opaque, thereby making it difficult for the worker to see where the tool or brush is in the water.

The fact that the tools and brushes fall into the water and sometimes cannot be readily seen is one of the biggest problems facing a concrete worker during the cleaning process, especially in colder climates or conditions. For example, if a worker is working in colder conditions, such as about 4-16° C. (39.2-60.8° F.) or colder, the water in the wheelbarrow is similarly as cold. As the worker cleans the tools at the end of a long work day—at which point the worker is usually quite tired and the worker has less strength in his body and hands—the worker must regularly immerse his hands in the water. The cold water causes the worker's hands to become quite cold and possibly numb, depending on the surrounding temperature, making it very difficult if not near impossible to readily grip and hold the tools and cleaning brushes. This causes the worker to drop the tools and brushes more often, thereby lengthening the cleaning process. The worker cannot grip the tools and brushes as firmly, thereby rendering the cleaning less effective. The worker must bend over more often to pick up dropped tools and brushes, which is only made more challenging by stiff muscles caused by the cold weather. The worker may even tend to try to take shortcuts or work faster to get the job finished due to pain and fatigue, thereby risking damaging the tools and/or not cleaning them sufficiently or properly. There is currently no solution available on the market to concrete workers to address these problems of which the inventor is aware.

BRIEF SUMMARY

In order to address the above problems of cleaning concrete tools, a concrete tool support shelf or rack for a concrete wheelbarrow or similar device, as well as a method of using a concrete tool support shelf or rack to clean concrete materials from concrete tools, are disclosed herein in one or more exemplary embodiments.

In accordance with at least one possible exemplary embodiment, a shelf is designed to be installed on a wheelbarrow. It should be noted that the term "shelf" should be understood as encompassing any shelf or shelf-like structures, such as racks, trays, tables, grates, plates, or similar structures that have a relatively wide and/or long support surface and a smaller height or thickness. It should also be noted that the term "wheelbarrow" refers to any wheelbarrow or wheelbarrow-like device that includes a basin.

The shelf is designed to be seated on or connected to or attached to or disposed at, either temporarily, removably, or permanently, a portion of an edge or lip of a basin of a wheelbarrow in the manner of a partial cover or lid over or across a portion of the basin. During a concrete tool cleaning or washing process, concrete tools and cleaning devices can be placed on or suspended from or connected to the shelf. In this manner, the concrete tools and cleaning devices can be conveniently stored out of the water in the basin, minimizing the above problems relating to the current cleaning methods. In addition, in accordance with at least one possible exemplary embodiment, the shelf could have cleaning devices or structures or other concrete tool treatment devices or structures connected or attached to the shelf in a permanent or removable manner, or such devices or structures could be formed integrally as part of the shelf itself, in order to free up the hands of the worker for more efficient and easier cleaning of concrete tools. The shelf has openings therein to permit flow of liquids, such as water or cleaning solution, and solids, such as concrete material and dirt, through the shelf and into the wheelbarrow basin underneath the shelf to promote drying and minimize accumulation of solid materials on the concrete tools and the shelf itself. In accordance with at least one possible exemplary embodiment, the shelf has a retaining flange or bracket or similar connecting or retaining or holding structure to permit the shelf to be removably mounted or suspended from a portion of the lip or edge of the basin of the wheelbarrow when the shelf is not in use, such that the shelf is easily transported on or with the wheelbarrow but the basin is completely open and not obstructed by the shelf.

The shelf may be constructed from any number of materials that are substantially water-resistant, durable, and rigid, such as steel, aluminum, other metals, wood, hard plastic, hard rubber, or hard elastomers, and could include a protective coating thereon to increase water resistance and durability. The openings in the shelf could be achieved by the inclusion of slots or holes in the main body of the shelf, or by designing the main body of the shelf in a grid or mesh or wire frame design.

DETAILED DESCRIPTION

Figure 1:
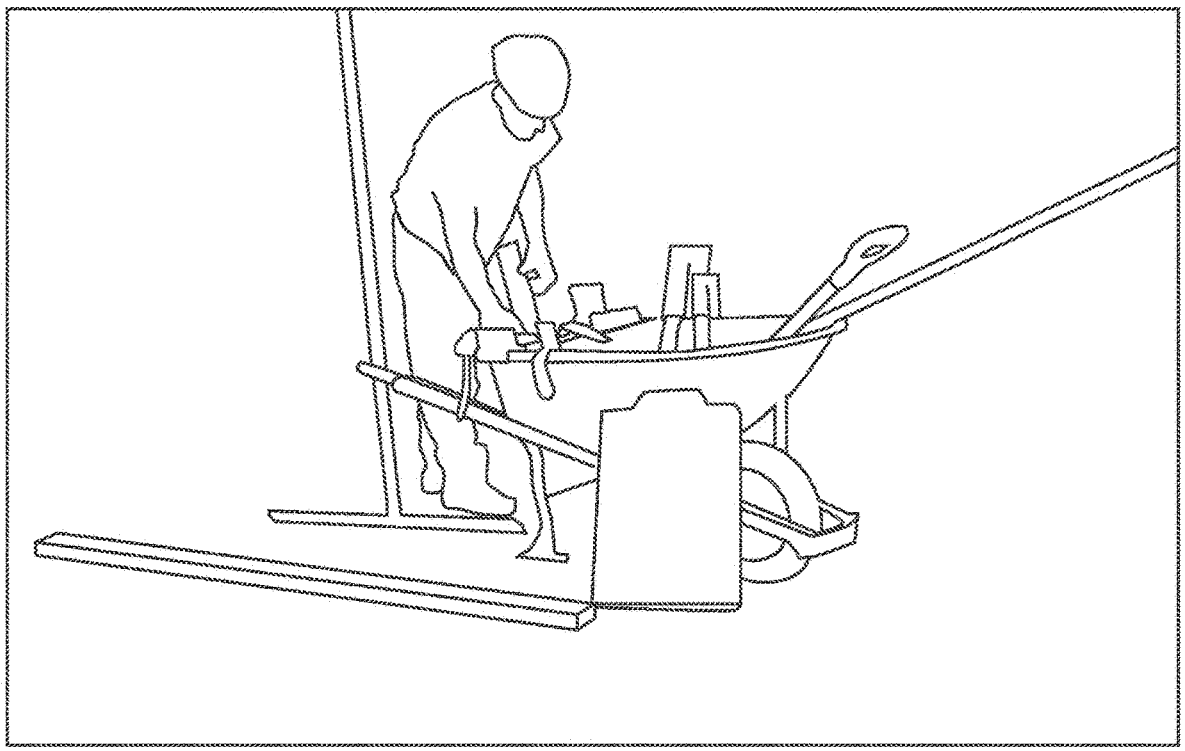
FIG. 1 shows a wheelbarrow and concrete tools for use in the concrete building and construction industry.

FIG. 1 shows a wheelbarrow and concrete tools for use in the concrete building and construction industry. The wheelbarrow is the type of wheelbarrow suitable for use in the concrete building industry, which are often heavier duty wheelbarrows made of steel or similar metals. Different concrete tools are also shown, such as rubber boots, work boots, gloves, safety glasses, shovels, rakes, concrete rakes, come-along rakes, screeds, straight edges, bump cutters, flat pieces of lumber, kneeling boards, trowels, float blades, troweling blades, groove cutters, jointers, edgers, and brooms. In addition, cleaning brushes and similar devices are also shown.

Figure 2:
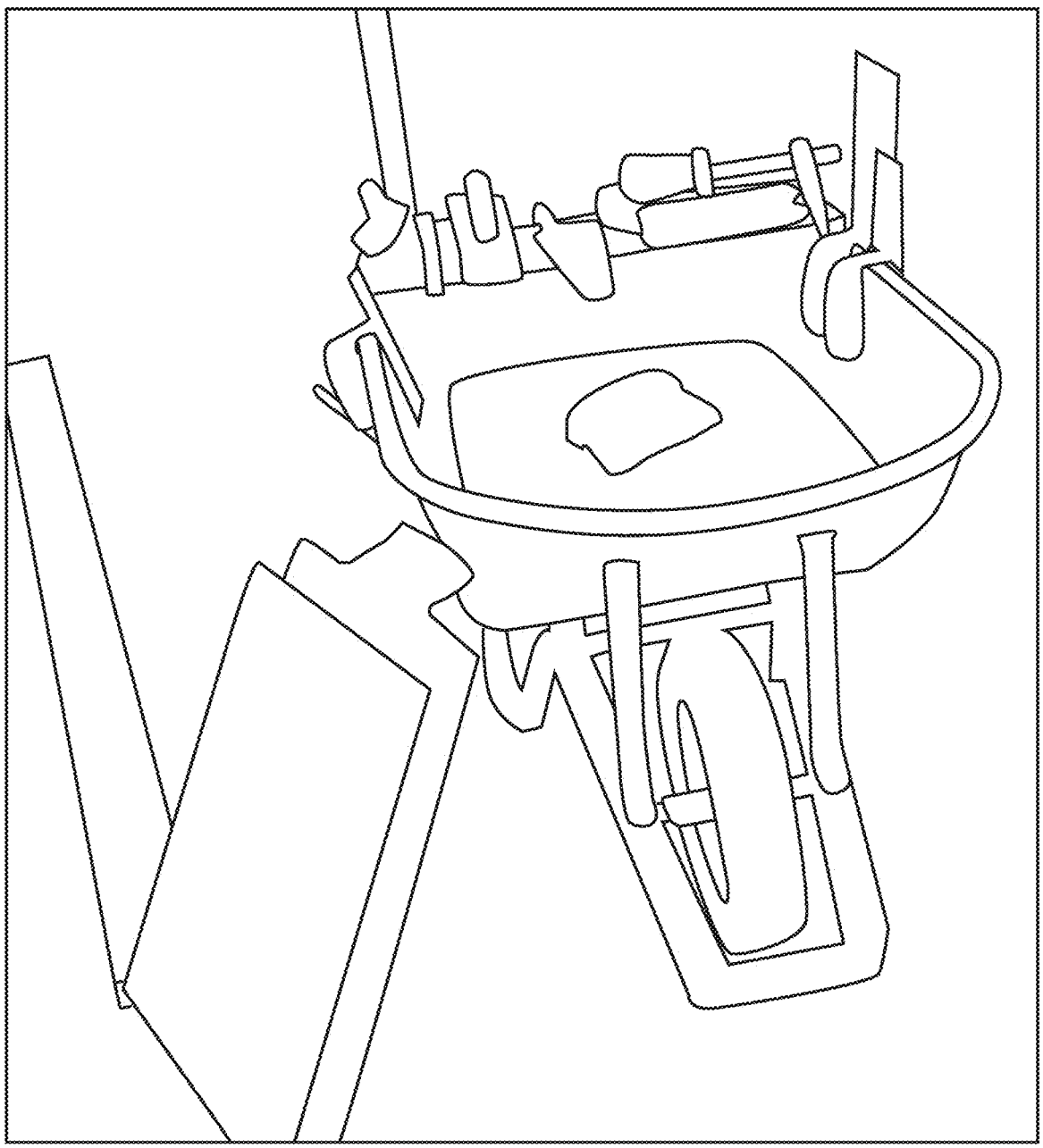
FIG. 2 shows the wheelbarrow with a shelf in accordance with at least one possible exemplary embodiment.

FIG. 2 shows the wheelbarrow with a shelf in accordance with at least one possible exemplary embodiment. Various concrete tools are positioned on the shelf.

Figure 3:
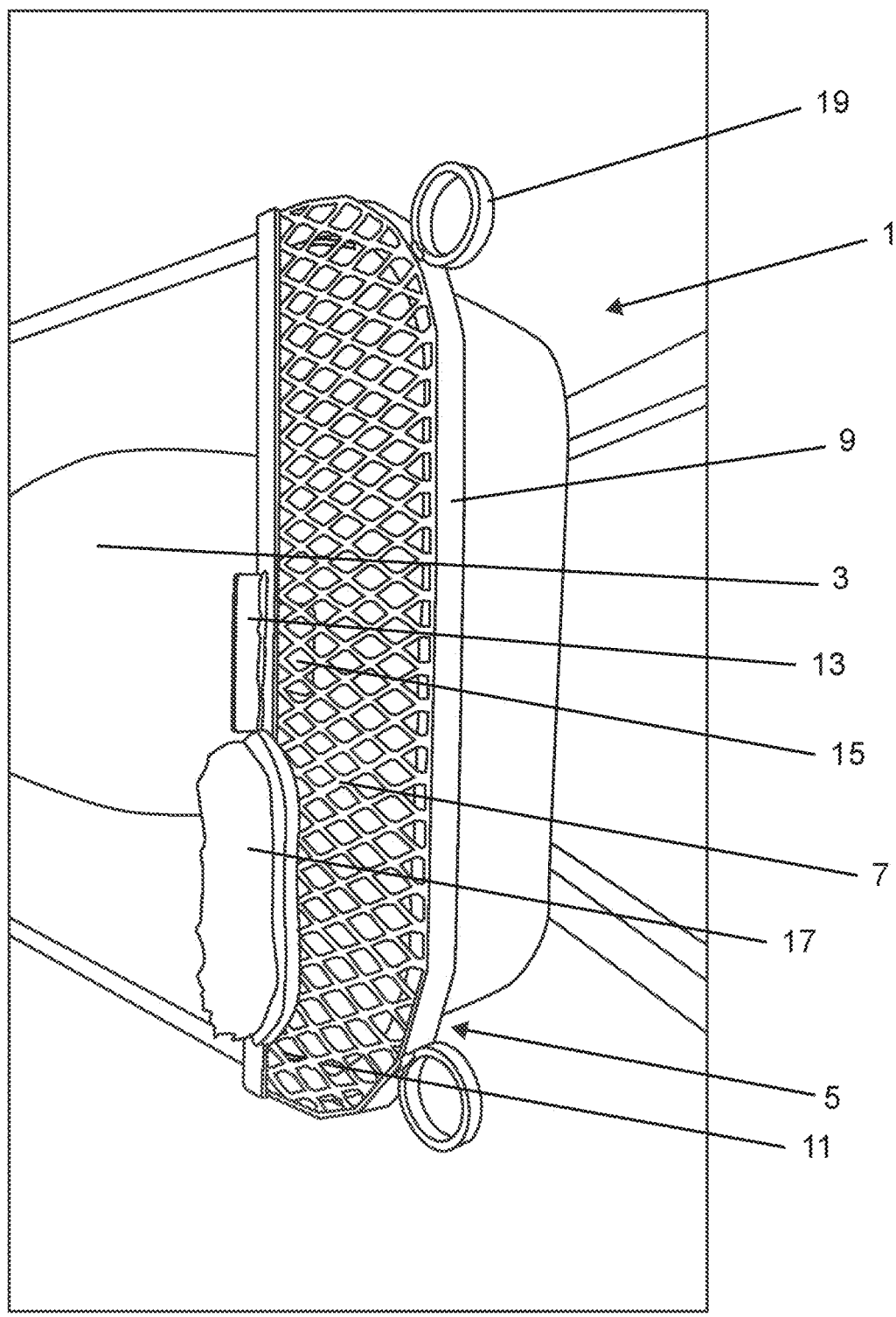
FIG. 3 shows the shelf installed on the wheelbarrow.

FIG. 3 shows the shelf 5 installed on the wheelbarrow 1. In the embodiment shown, the shelf 5 has a contoured design to substantially follow the shape of a portion of the edge or lip of a basin, i.e., a tray, 3 of the wheelbarrow 1. The basin 3 is the basin-shaped structure that is used to carry materials or objects therein. The shelf 5 has a main body or support portion 7 that, upon installation on a wheelbarrow, is disposed to cover over or span across a portion of the basin 3. In the exemplary embodiment shown, the main body portion 7 of the shelf 5 is the form of a wire-frame grate. This design permits water and concrete material to pass through the shelf 5 and into the basin 3 during cleaning of concrete tools. In addition, items such as brushes or brooms can be rubbed against the grating in order to scrape off concrete material.

The shelf 5 has an outer flange or edge 9 that extends transverse to or essentially perpendicular to the upper surface of the shelf 5. The outer flange 9 acts as a retaining structure to minimize or prevent sliding movement of the shelf 5 along the lip of the basin 3 of the wheelbarrow 1. The outer flange 9 also can retain the shelf 5 in the installed or use position when the wheelbarrow 1 is tipped or inclined up to 90 degrees, such that the wheelbarrow 1 can be tipped and emptied as needed without the shelf 5 falling off of the basin 3. The shelf 5 also has an inner flange or edge 11 that extends transverse to or essentially perpendicular to the lower surface of the shelf 5. The inner flange 11 is also contoured but acts against the inside of the lip of the basin 3. Similarly to the outer flange 9, the inner flange 11 minimizes or prevents sliding movement of the shelf 5. Both the outer flange 9 and the inner flange 11 can be formed as a single flange structure or can be formed as multiple flange sections that are spaced apart. In the embodiment shown in FIG. 3, the outer flange 9 is a single structure extending from one end of the shelf to the other, whereas there are two inner flanges 11 that are substantially shorter and disposed on opposite ends of the shelf. The inner flanges 11 can be seen more readily in the views of the lower side of the shelf, such as in FIG. 9, for example.

The shelf 5 includes a scraping flange 13 that can be used to clean concrete tools, as will be discussed herein below. The shelf 5 also includes a retaining bracket 15 that is used to suspend the shelf 5 from the lip of the basin 3 in a storage position when the shelf 5 is not in use. An optional brush 17 is connected to the shelf 5, either in a permanent or removable manner, such as by bolts or screws or similar. The brush 17 is thereby held in place on the shelf 5, such that a worker can rub concrete tools against the brush 17 to clean the concrete tools. This design allows the worker to hold the concrete tool with both hands, rather than holding the concrete tool in one hand and the brush 17 in the other, which is advantageous in cold weather and/or when trying to clean a larger tool, such as a broom or a screed. This design also allows the worker to use more force with both hands to remove concrete material that is sticking to the concrete tool. While only one brush 17 is shown in FIG. 3, more than one brush can be connected to the shelf 5, which brushes can be of different configurations, such as a double-brush device, or of different materials, such as wire brushes. Finally, by connecting the brush 17 to the shelf 5, the brush 17 will not fall into the water accidentally. All of these advantages greatly increase the ease and efficiency of cleaning the concrete tools.

The shelf 5 also includes holding rings 19. The shelf 5 in FIG. 3 only has two holding rings 19, but more holding rings 19 could be added. The holding rings 19 are integral to the metal shelf 5. They are used to hold brushes or similar cleaning implements that have a handle and cleaning head, wherein the handle is inserted through the holding ring 19 and the cleaning head rests against the holding ring 19 such that the cleaning implement is suspended from the holding ring 19. The holding ring 19 makes it very easy for a worker to store the cleaning implements, usually handheld brushes, during the cleaning process, rather than the cleaning implements being left on the ground, in a bucket, or in the water in the basin 3.

Figure 4:
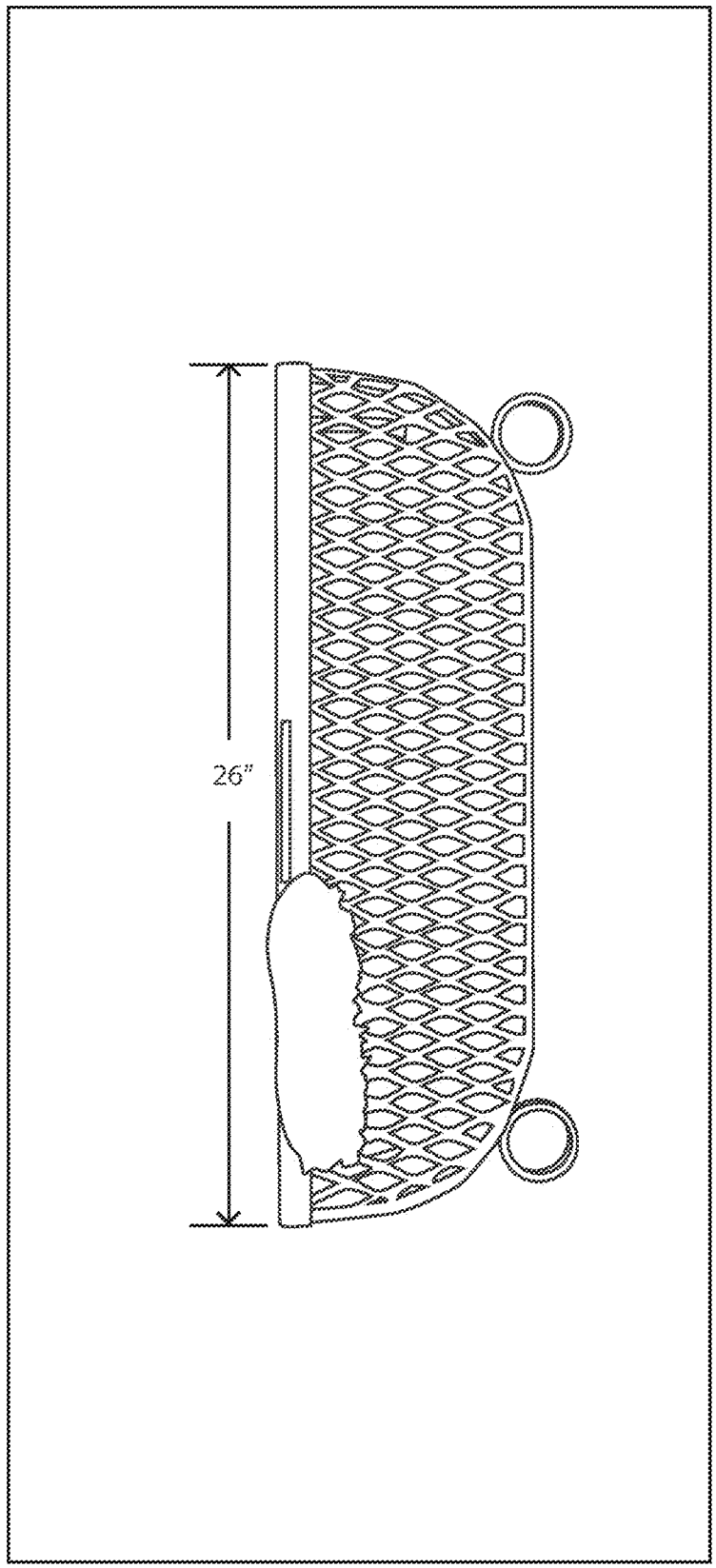
FIGS. 4, 5, 6, and 7 show views of the upper side of the shelf.
Figure 5:
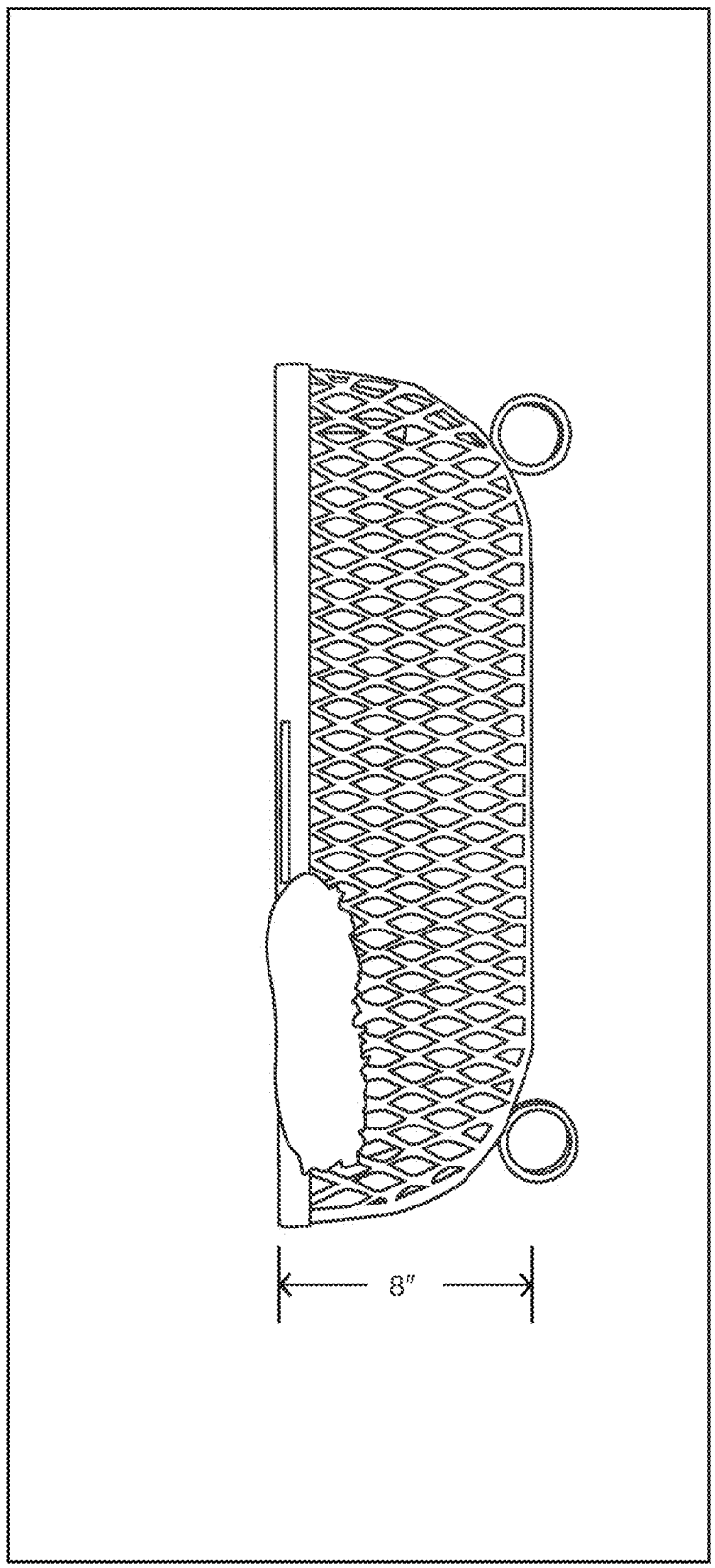
Figure 6:
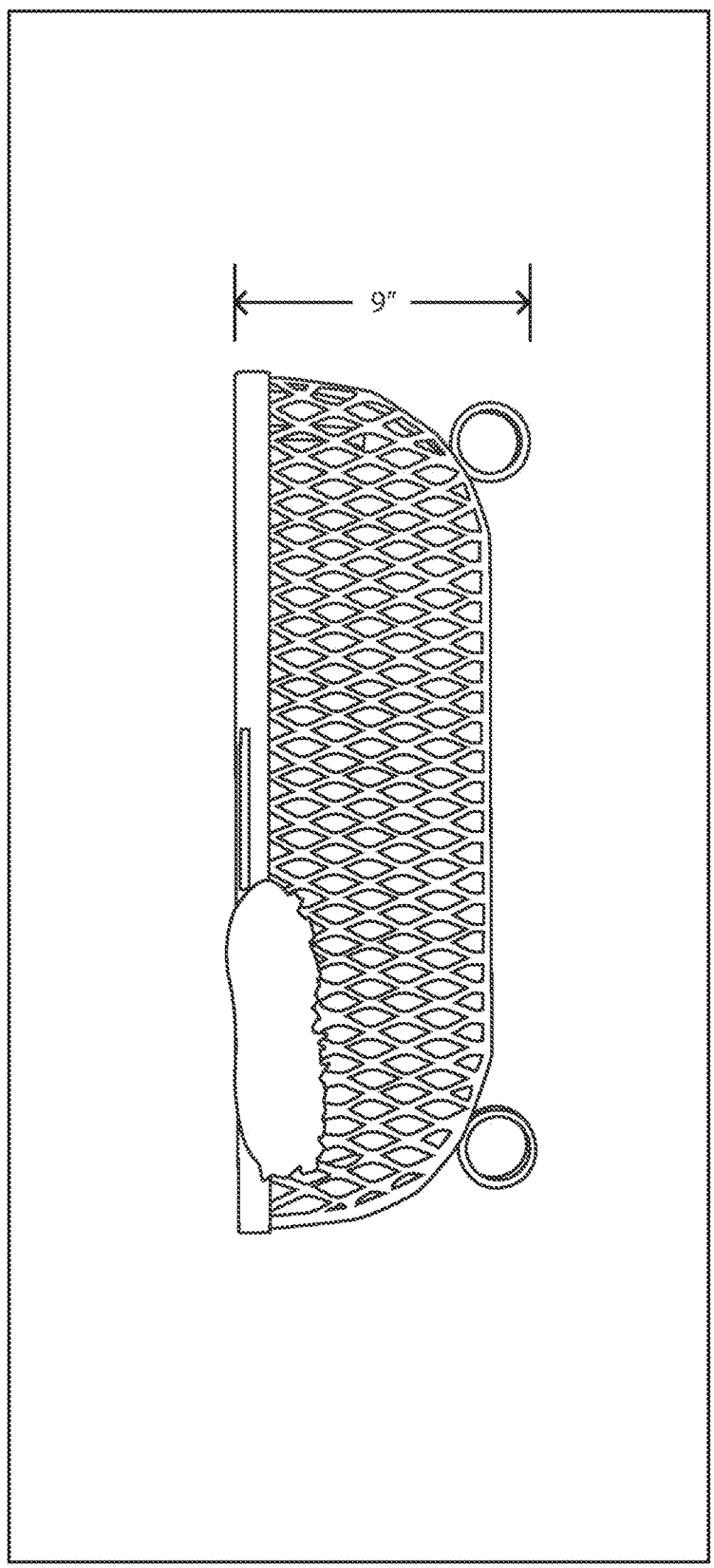
Figure 7:
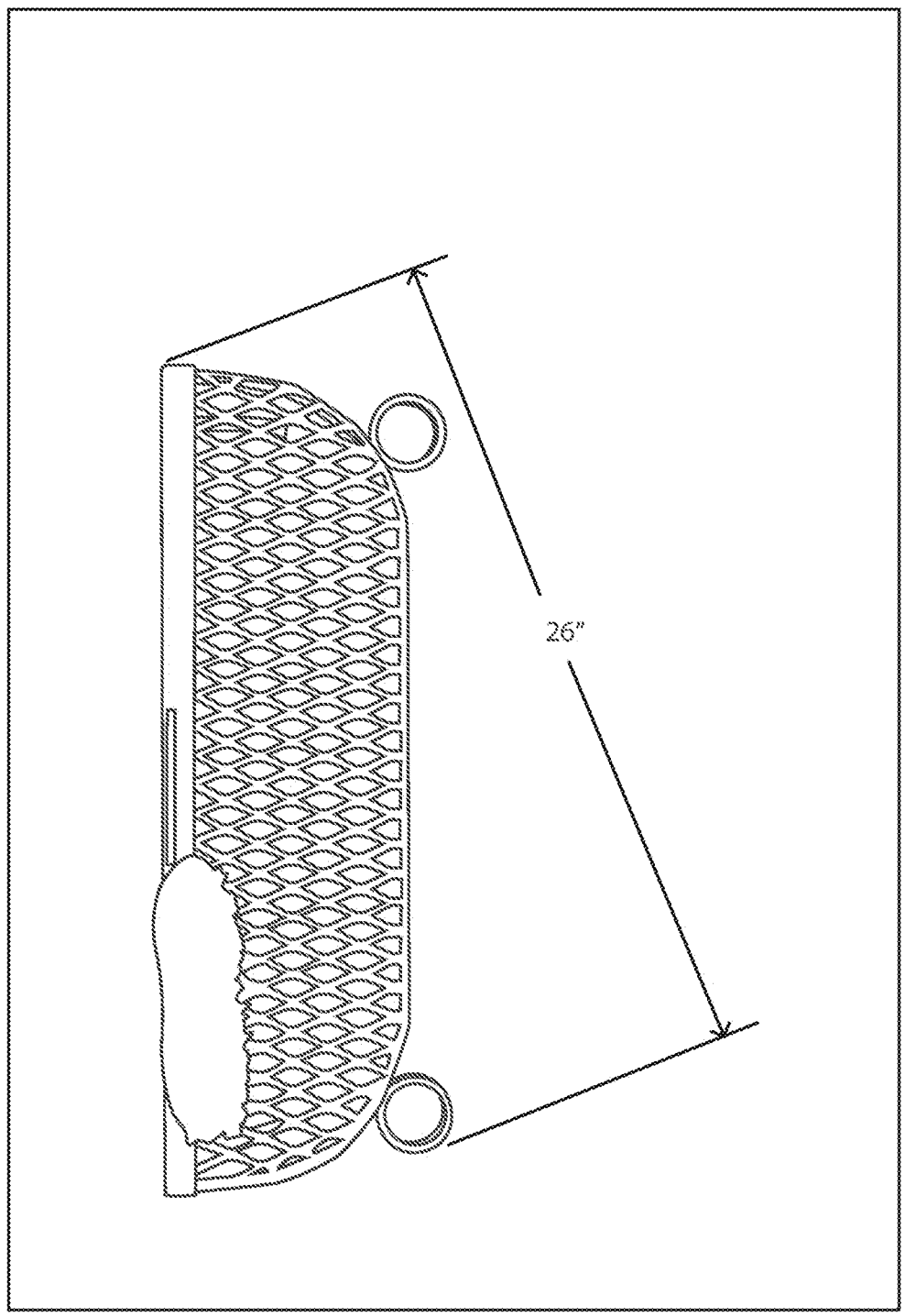

FIGS. 4, 5, 6, and 7 show views of the upper side of the shelf 5. FIG. 4 shows a length dimension of a front edge of the shelf 5 of approximately 26 inches. FIG. 5 shows a width dimension from the front edge to a back edge of approximately eight inches. FIG. 6 shows another width dimension from the front edge to an edge of a holding ring 19 of approximately nine inches. FIG. 7 shows a diagonal dimension from a corner of the shelf 5 to the opposing holding ring 19 of approximately 26 inches. It should be noted at this time that all measurements disclosed herein are for exemplary purposes in accordance with at least one possible exemplary embodiment, and that all reasonable variations understandable to the person of ordinary skill in the art are disclosed herein. In addition, the shelf 5 is designed to fit with most any wheelbarrow suitable for use in the concrete building and construction industry, but could easily be modified as necessary to fit essentially any wheelbarrow.

Figure 8:
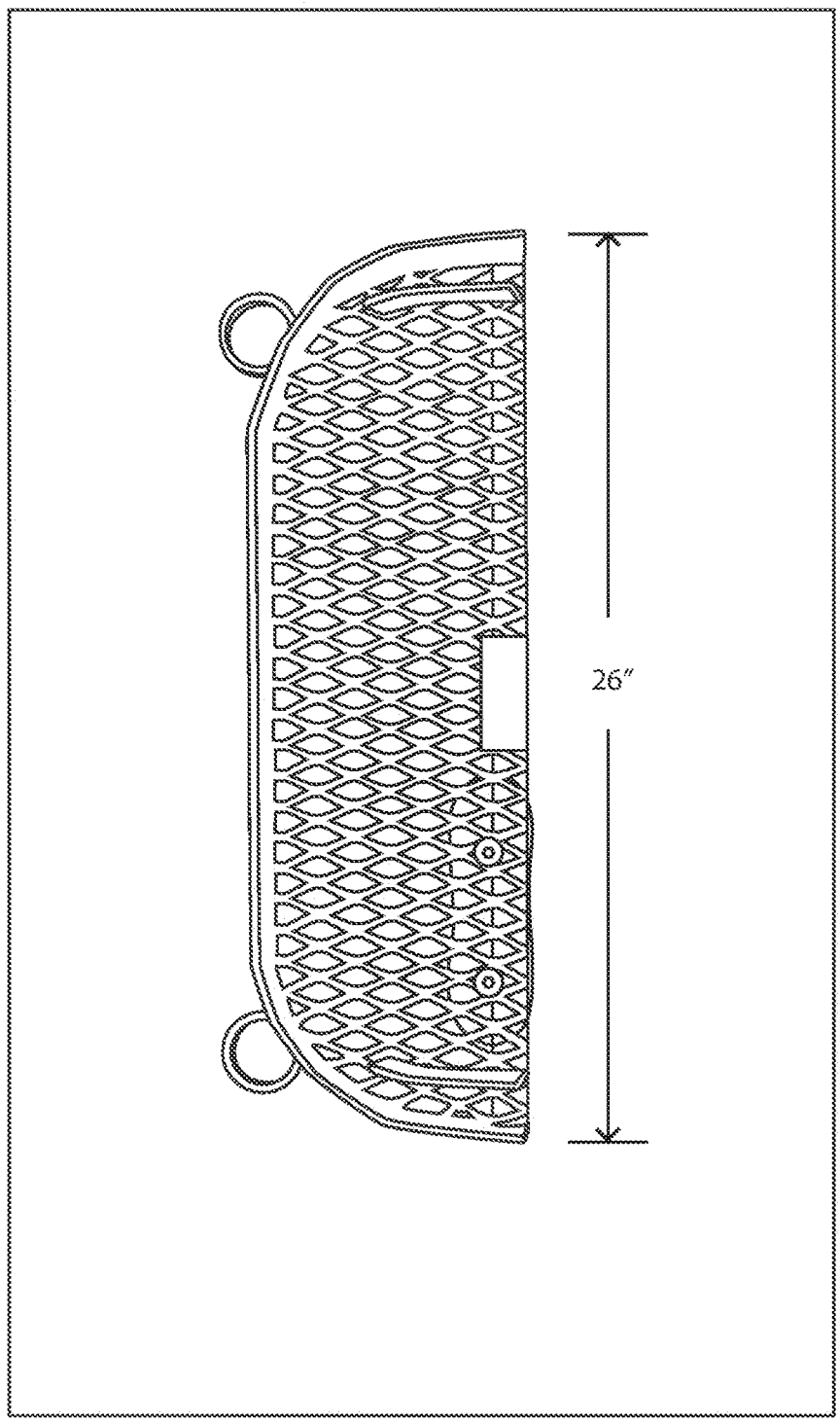
FIGS. 8, 9, 10, 11, and 12 show views of the lower side of the shelf.
Figure 9:
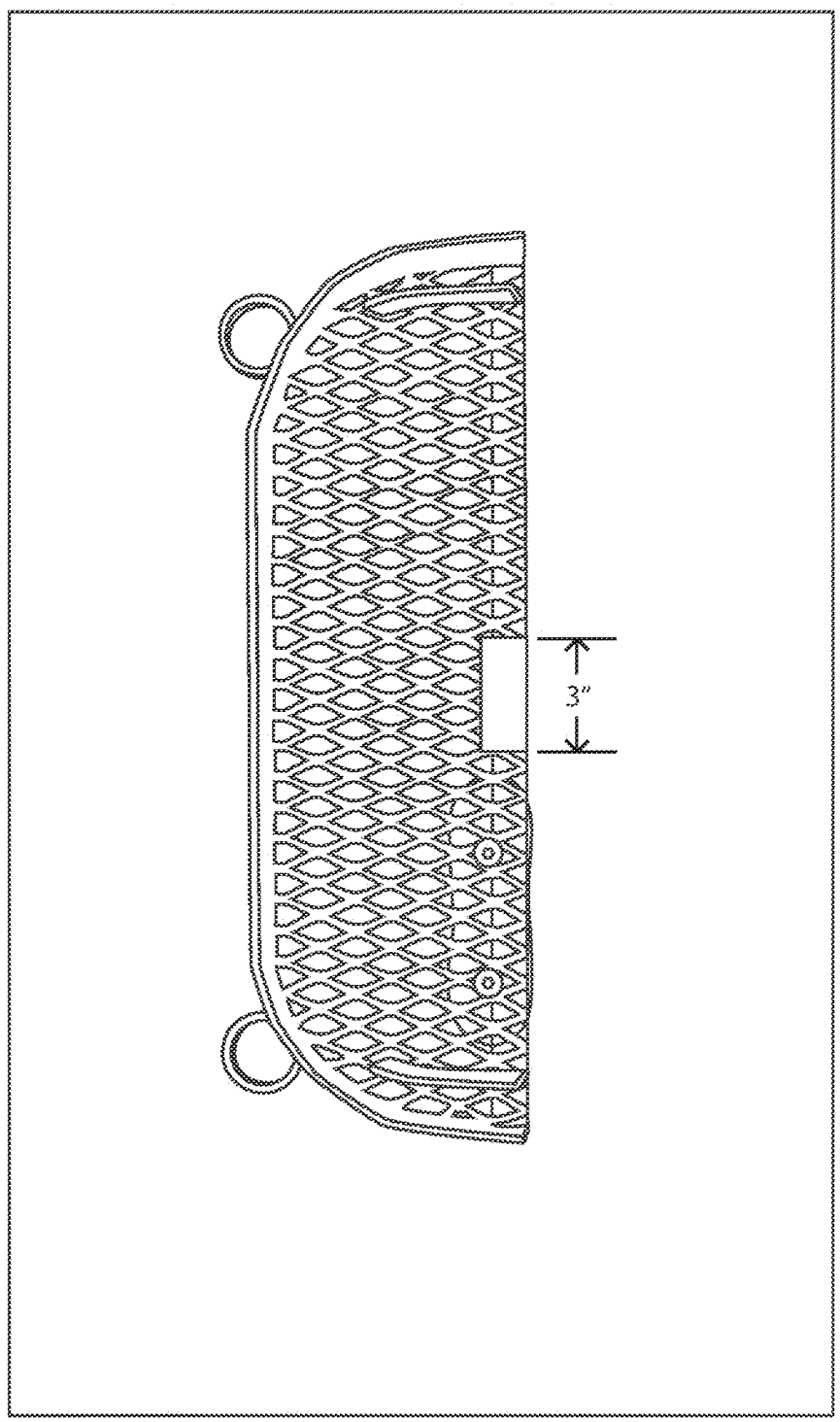
Figure 10:
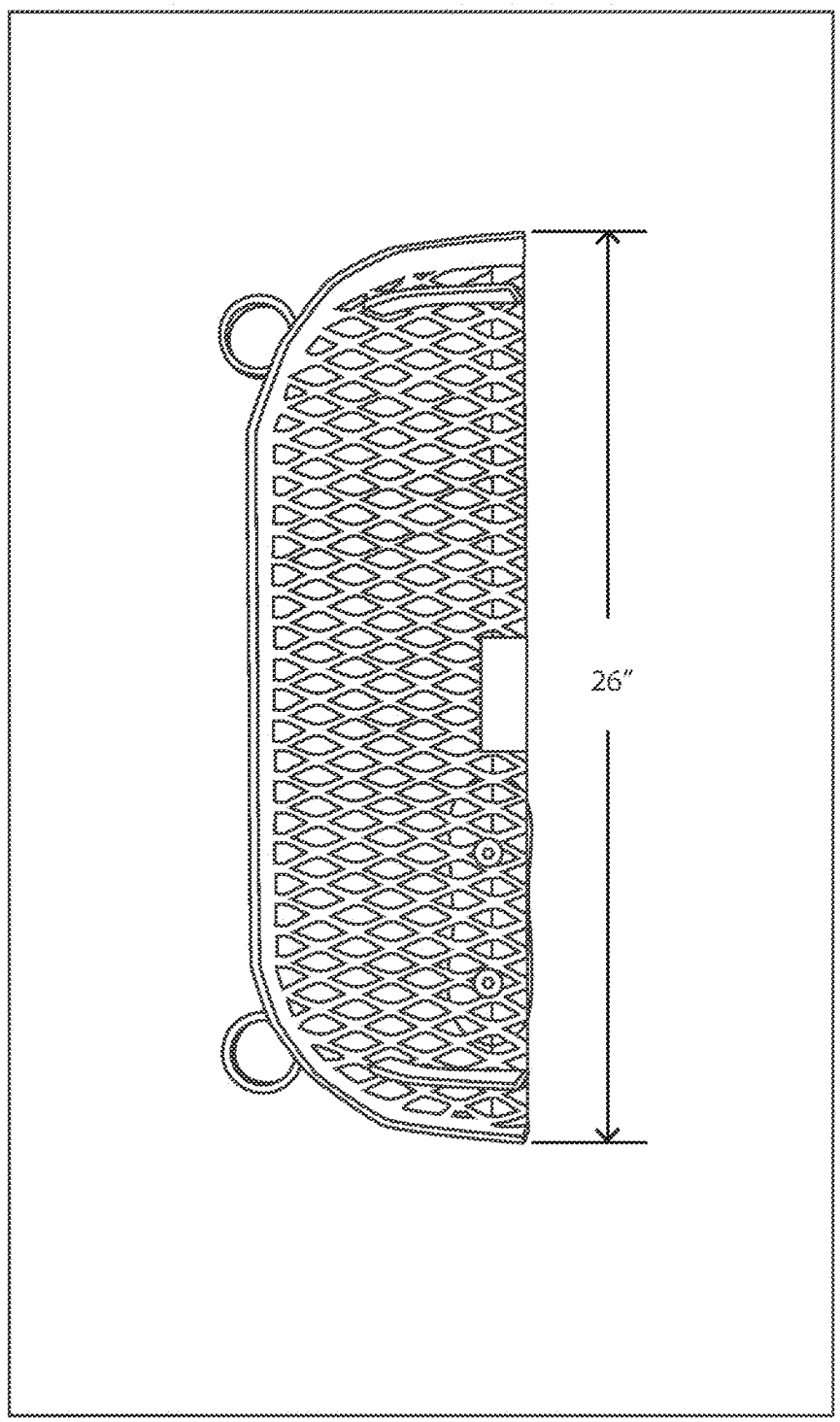
Figure 11:
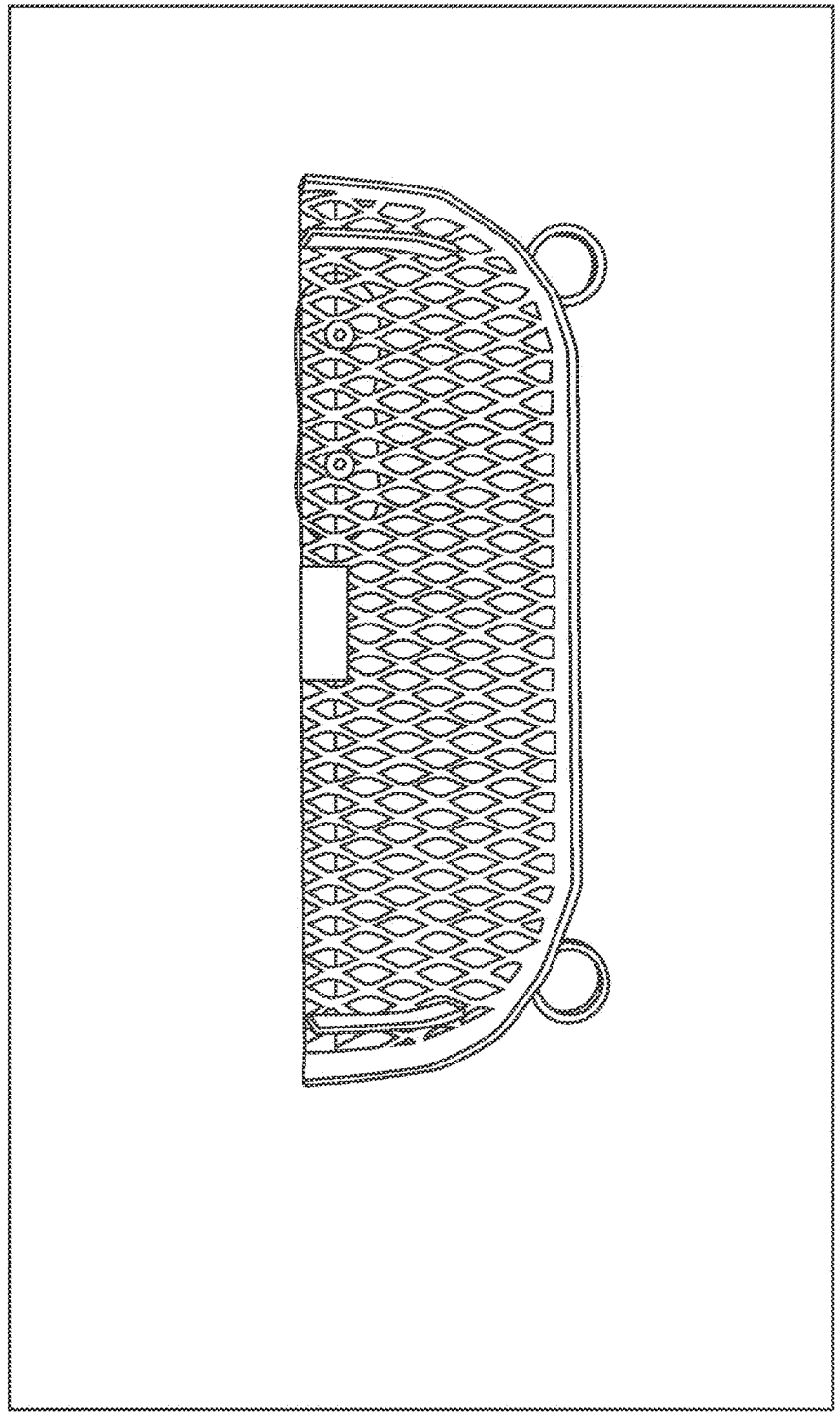
Figure 12:
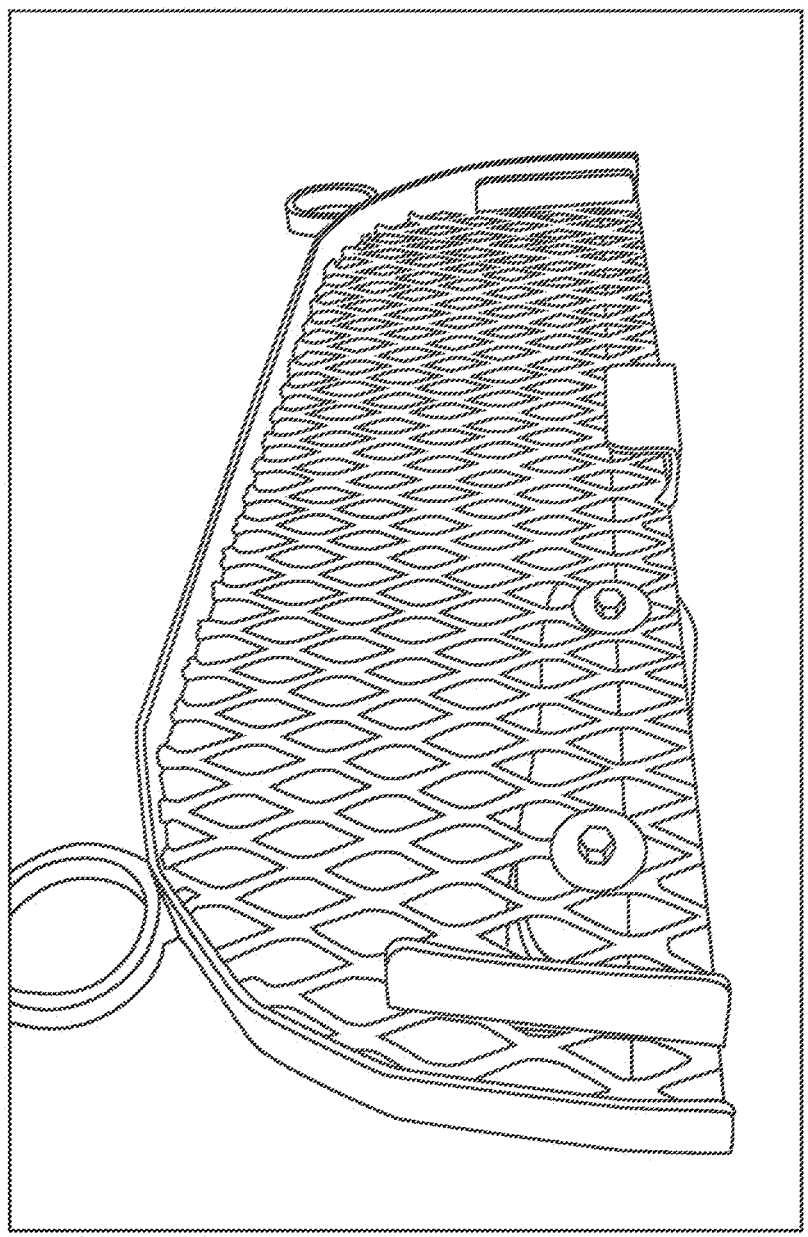
Figure 13:
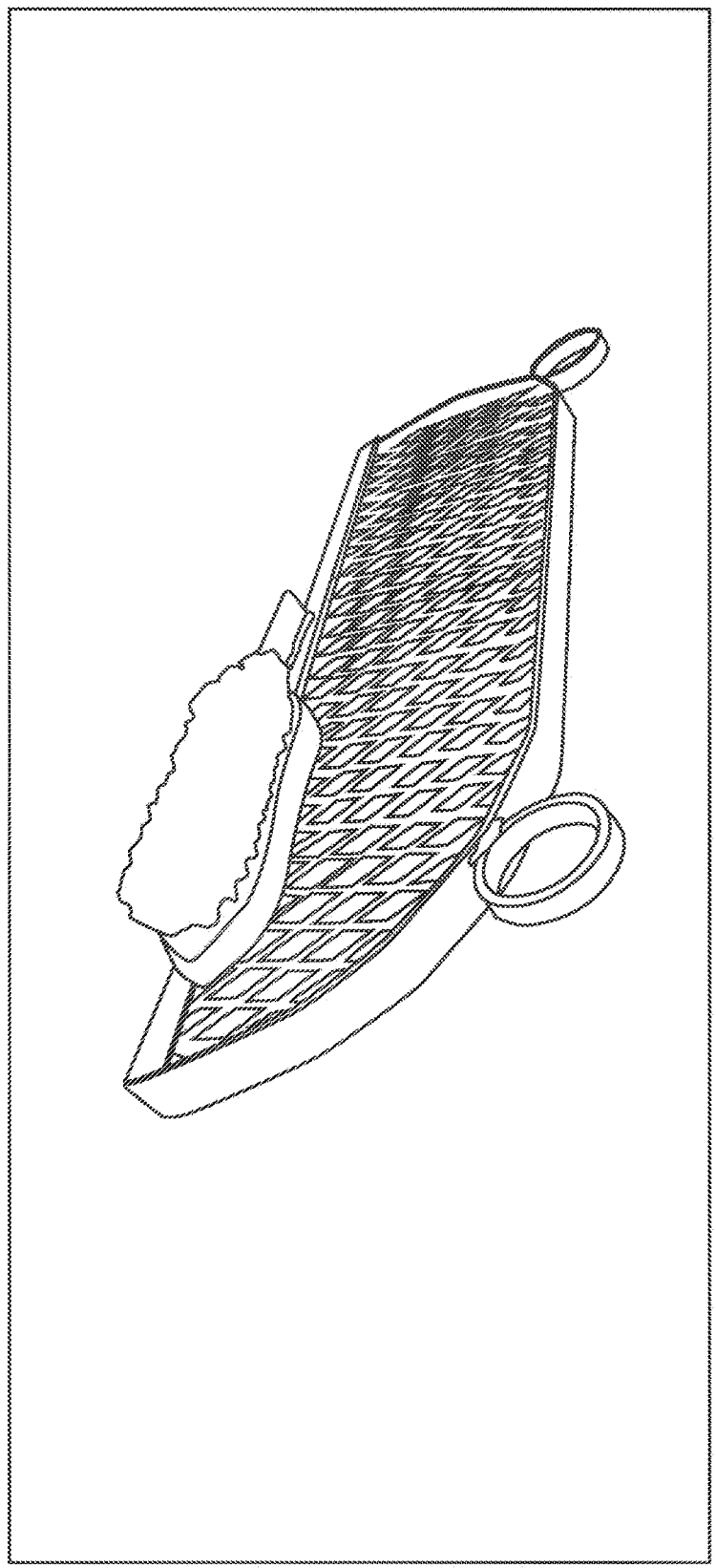
FIG. 13 shows a view of the upper side of the shelf.
Figure 14:
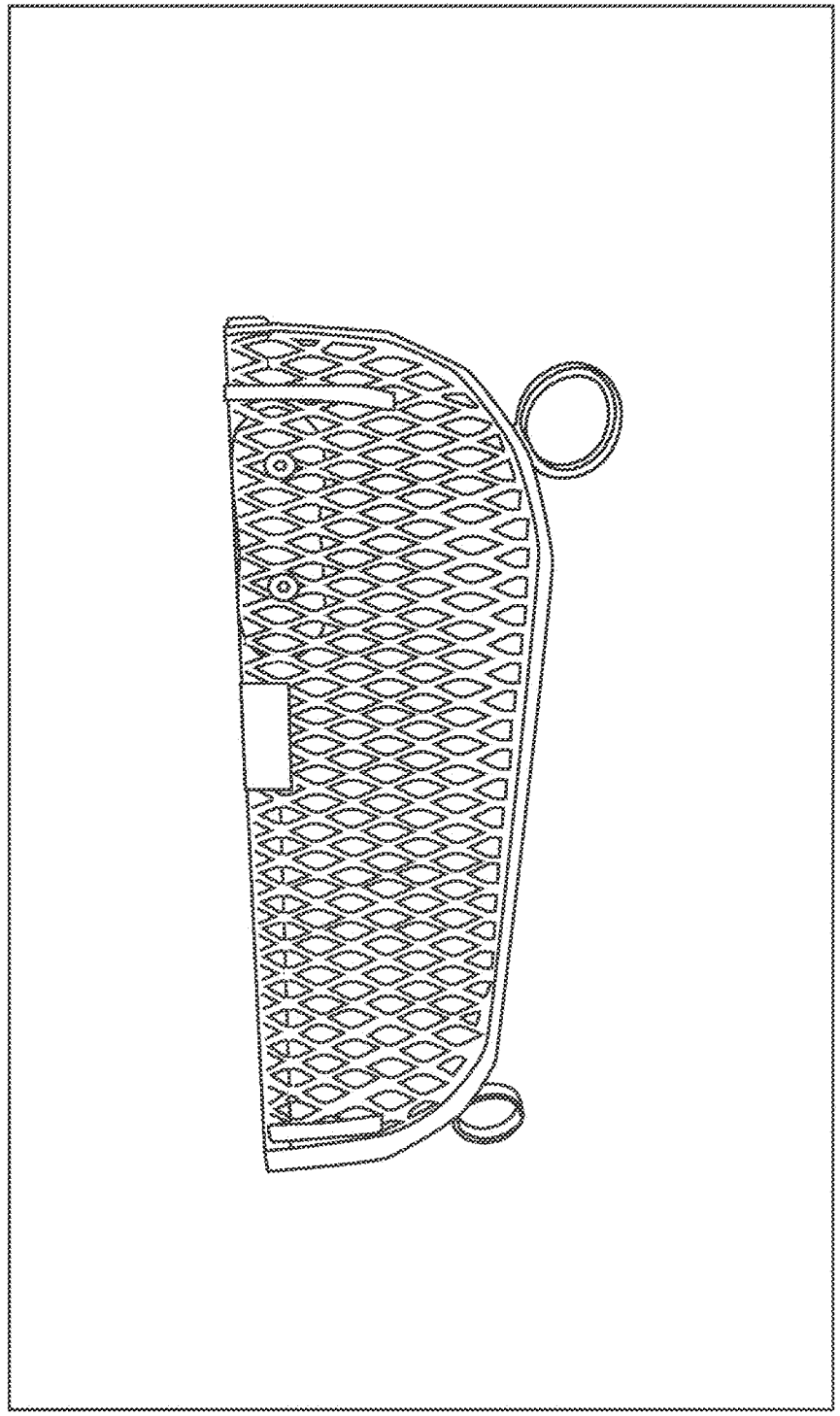
FIGS. 14 and 15 show views of the lower side of the shelf.
Figure 15:
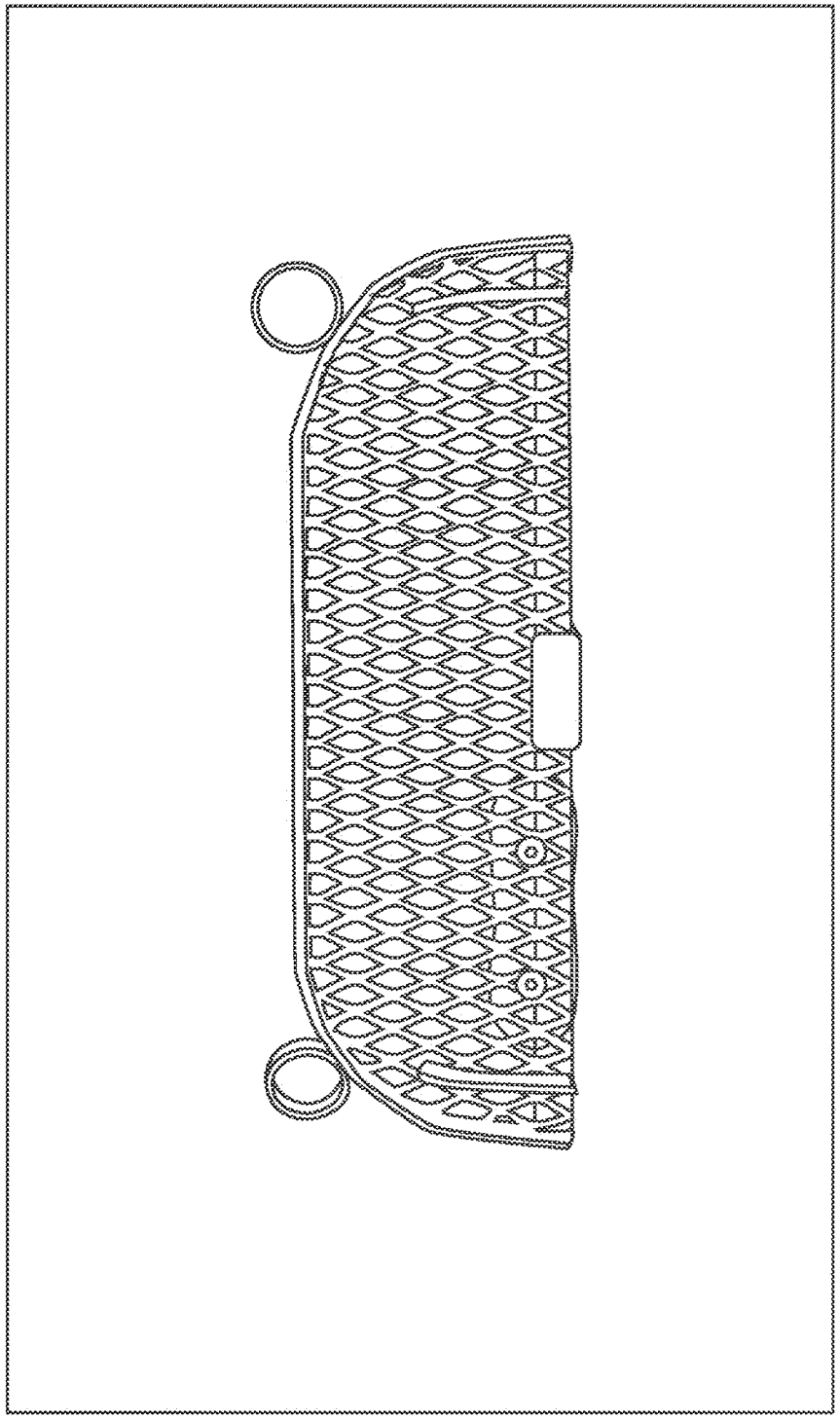
Figure 16:
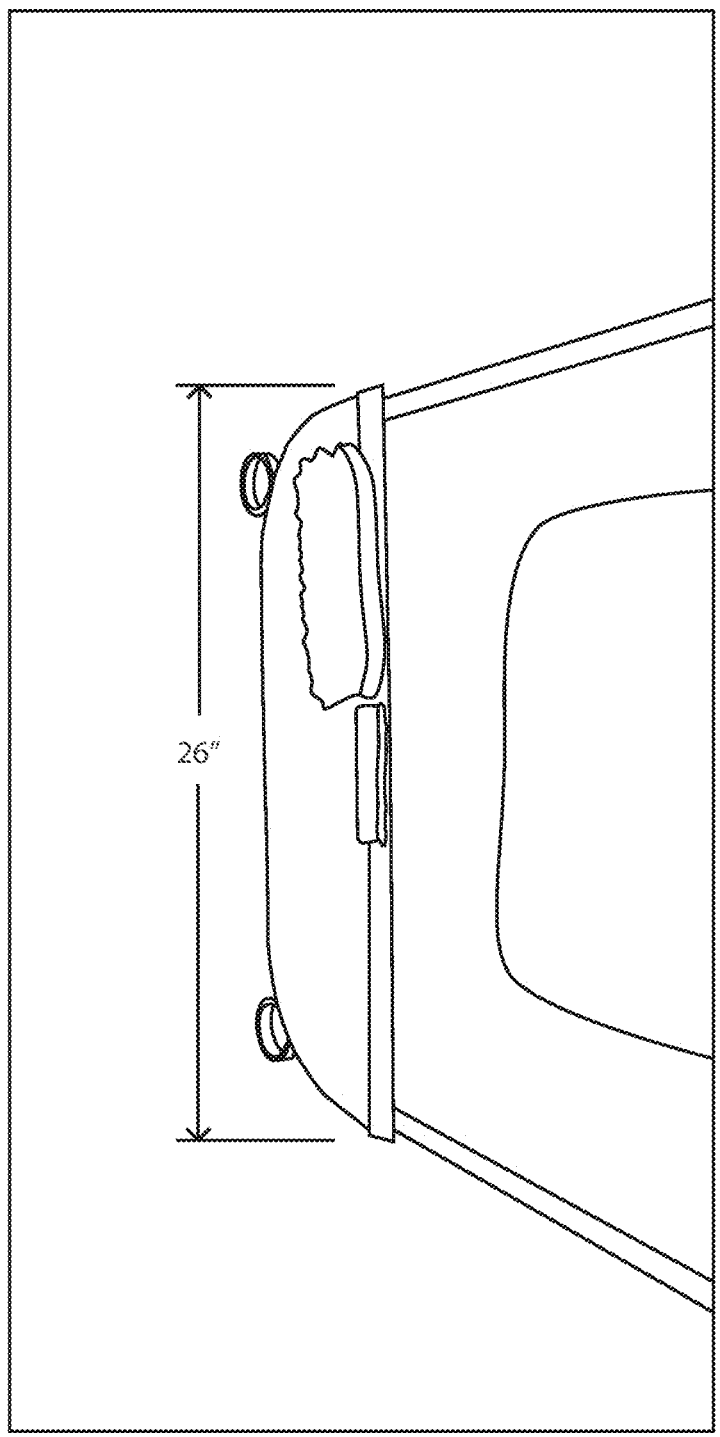
FIG. 16 shows the shelf installed on the wheelbarrow.
Figure 17:
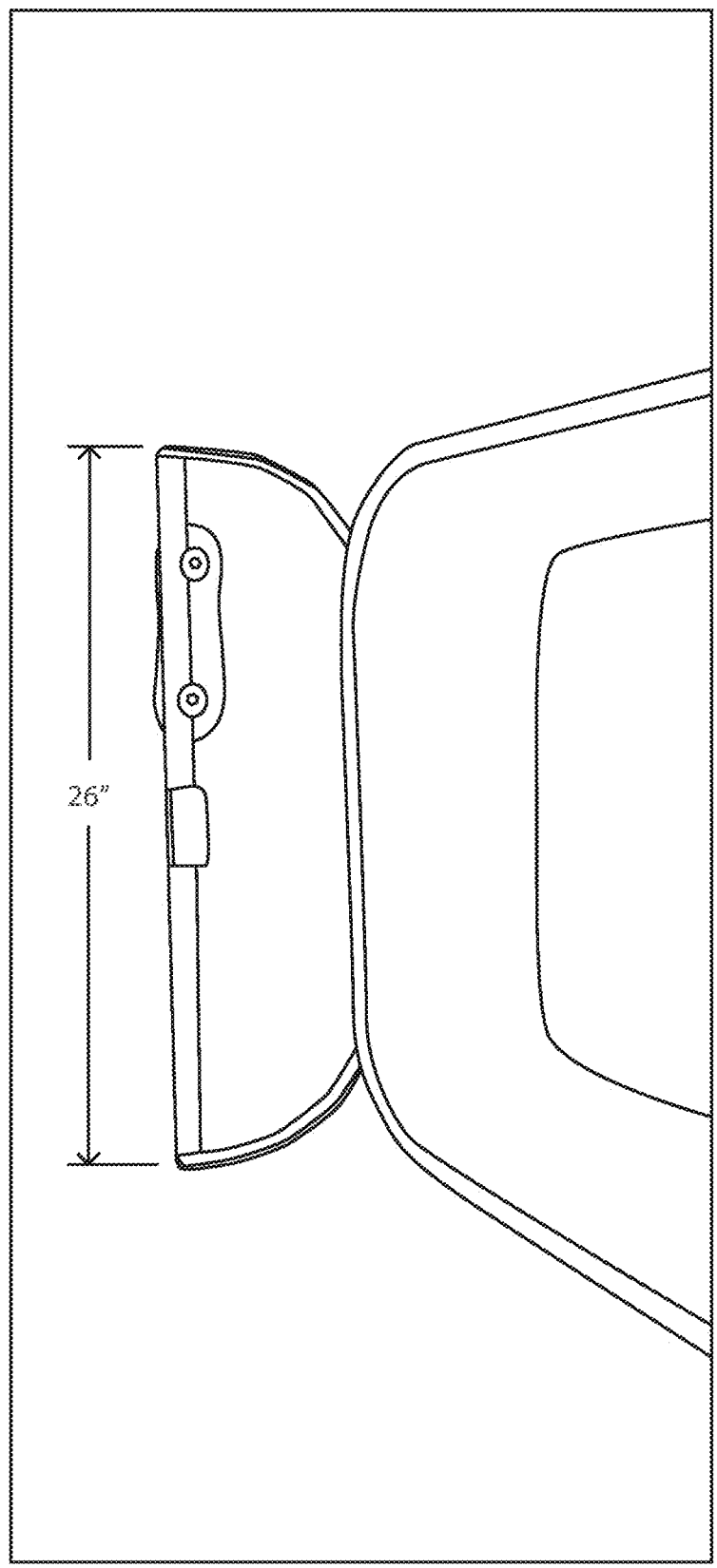
FIG. 17 shows the shelf pivoted off of the wheelbarrow.

FIGS. 8, 9, 10, 11, and 12 show views of the lower side of the shelf. FIGS. 8 and 10 show a length dimension of approximately 26 inches. FIG. 9 shows the retaining bracket 15, which has a width dimension of approximately three inches. FIGS. 11 and 12 show views of the lower surface of the shelf 5, wherein bolts and washers used to clamp or hold the brush 17 to the shelf 5 are shown. FIG. 13 shows a view of the upper side of the shelf 5 and the brush 17 connected thereto. FIGS. 14 and 15 show additional views of the lower side of the shelf 5, wherein the right-angle or L-shaped design of the retaining bracket 15 can be easily seen. FIG. 16 shows the shelf 5 installed on the wheelbarrow 1, whereas FIG. 17 shows the shelf pivoted off of the wheelbarrow 1.

Figure 18:
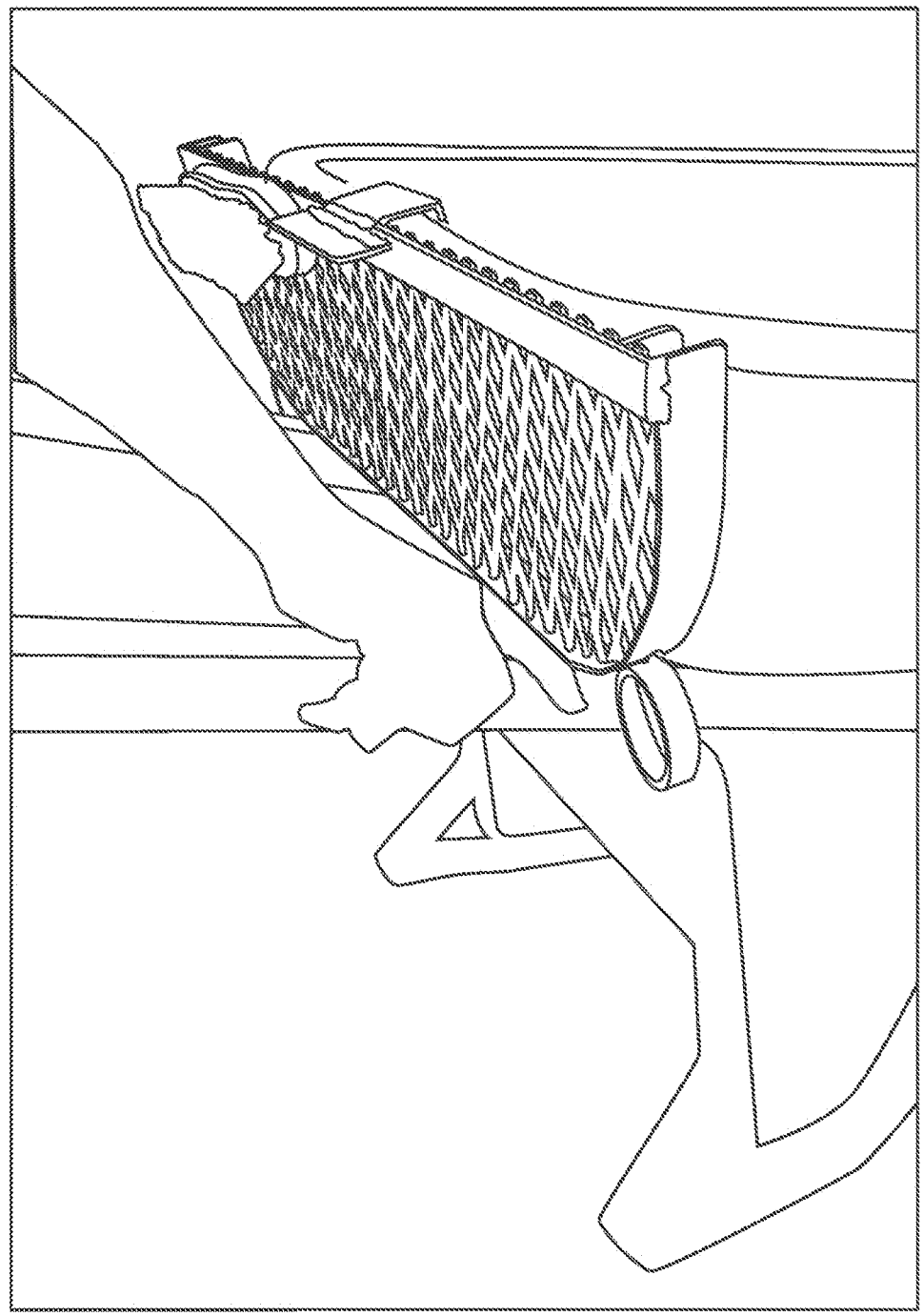
FIGS. 18, 19, and 20 show the shelf hanging off the lip of the basin of the wheelbarrow in a storage position when not in use.
Figure 19:
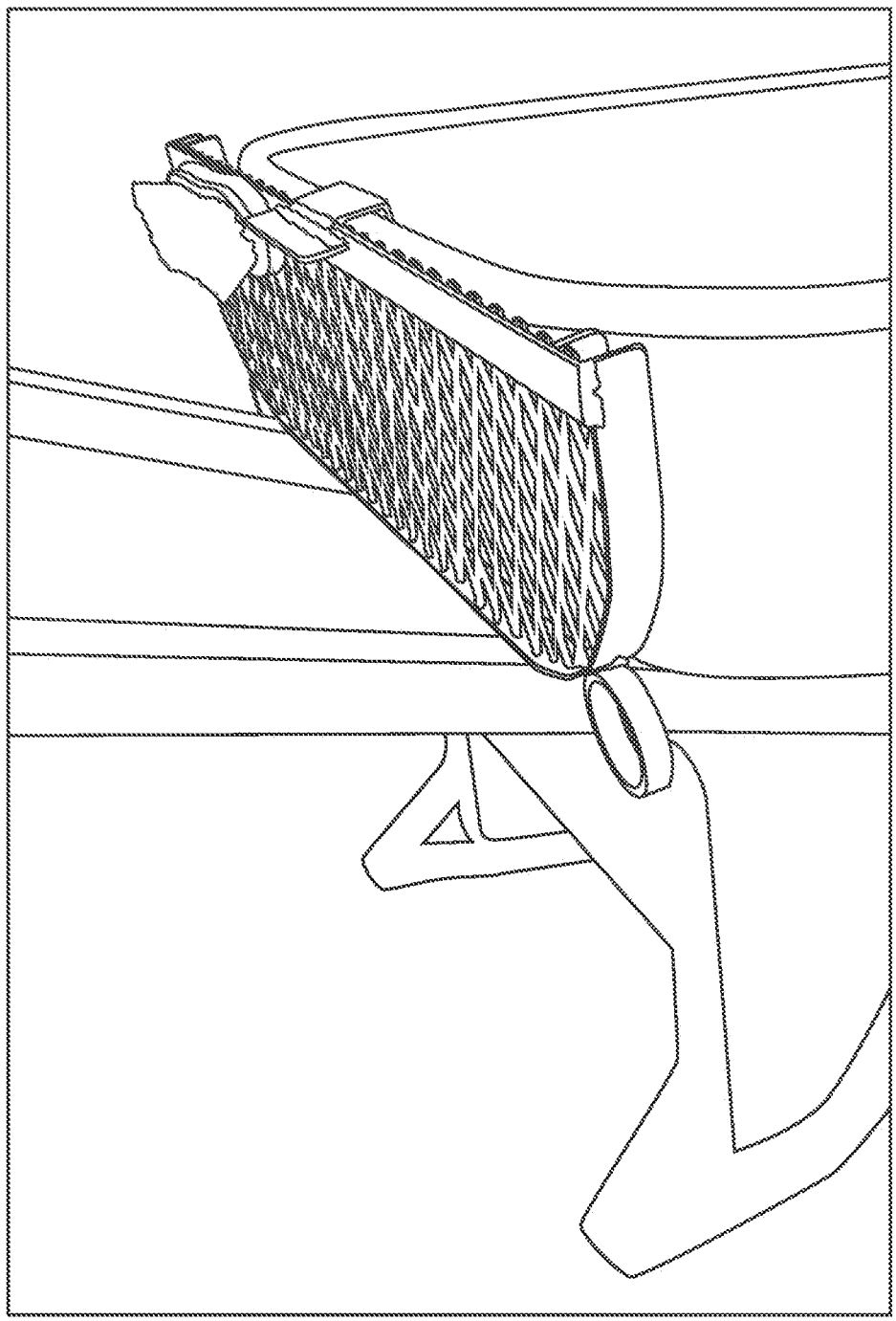
Figure 20:
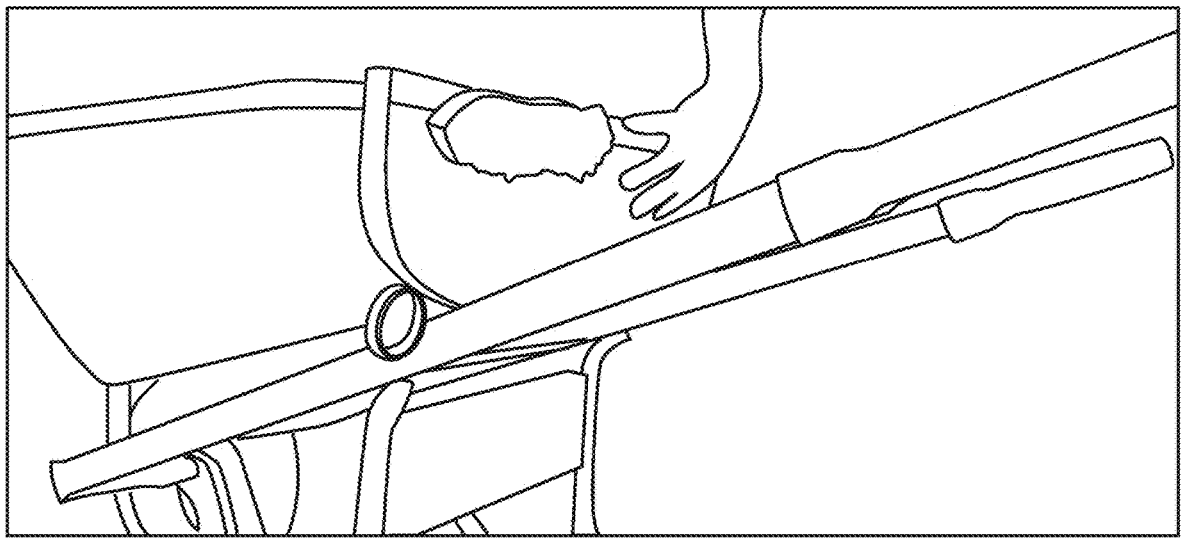

FIGS. 18, 19, and 20 show the shelf hanging off the lip of the basin of the wheelbarrow in a storage position when not in use. The retaining bracket 15 allows the shelf 5 to be hung from the edge of the basin 3 in a position adjacent the handles of the wheelbarrow 1. In this exemplary embodiment, the width of the shelf 5 is such that the shelf 5 does not contact or only slightly contacts the handles of the wheelbarrow 1. This design permits the worker to easily carry the shelf 5 on the wheelbarrow 1 to any location without interfering with or blocking access to the entirety of the basin 3.

Figure 21:
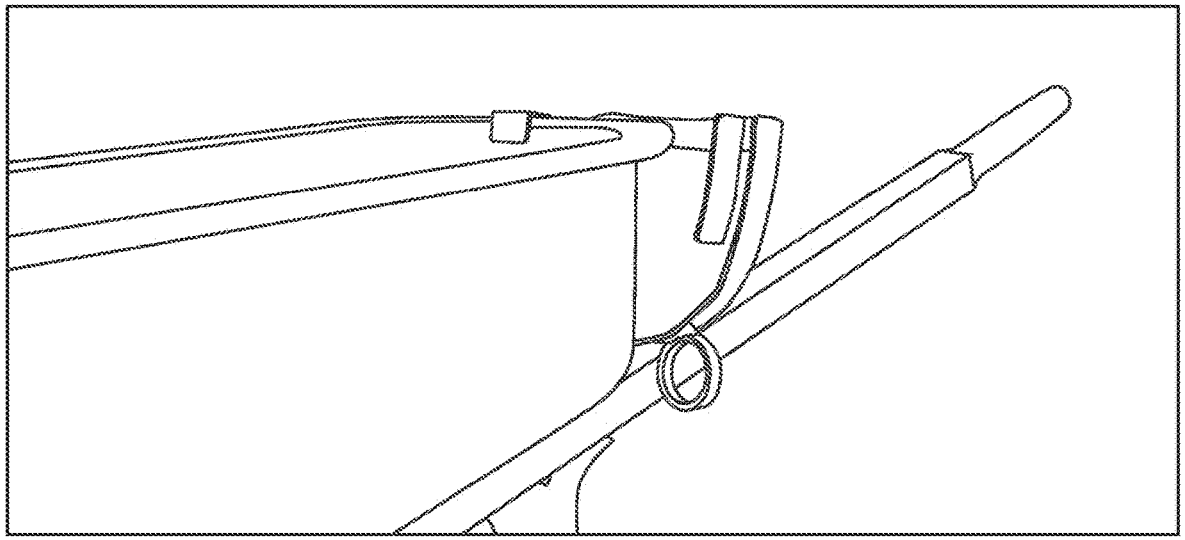
FIGS. 21, 22, and 23 show the steps of moving the shelf out of the storage position and into the use position above the basin of the wheelbarrow.
Figure 22:
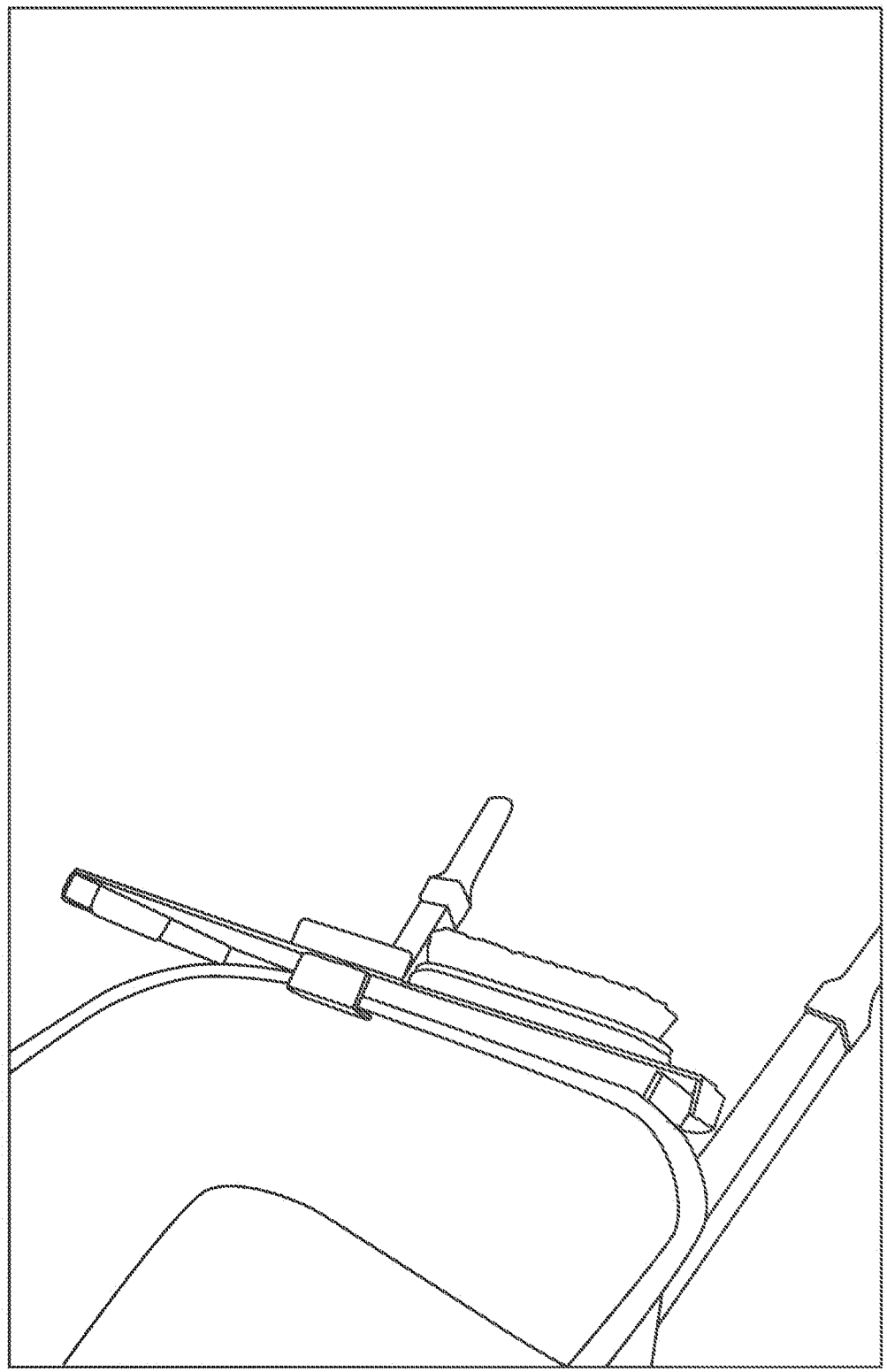
Figure 23:
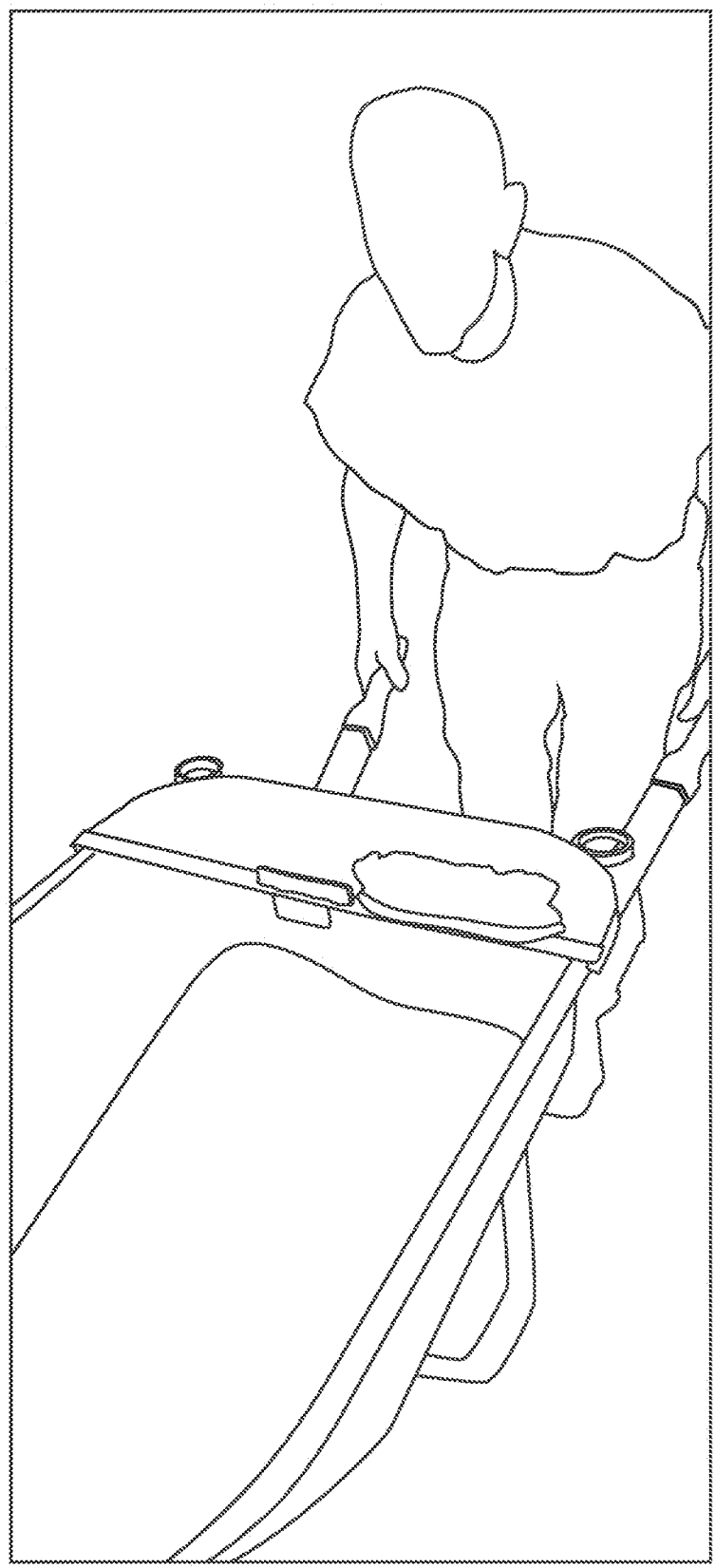

FIGS. 21, 22, and 23 show the steps of moving the shelf out of the storage position and into the use position above the basin of the wheelbarrow. The shelf 5 is first grasped and lifted upwardly out of the use position. The shelf 5 is then easily pivoted and over the lip of the basin 3, as shown in FIG. 22, and then placed into the use position, as shown in FIG. 23.

Figure 24:
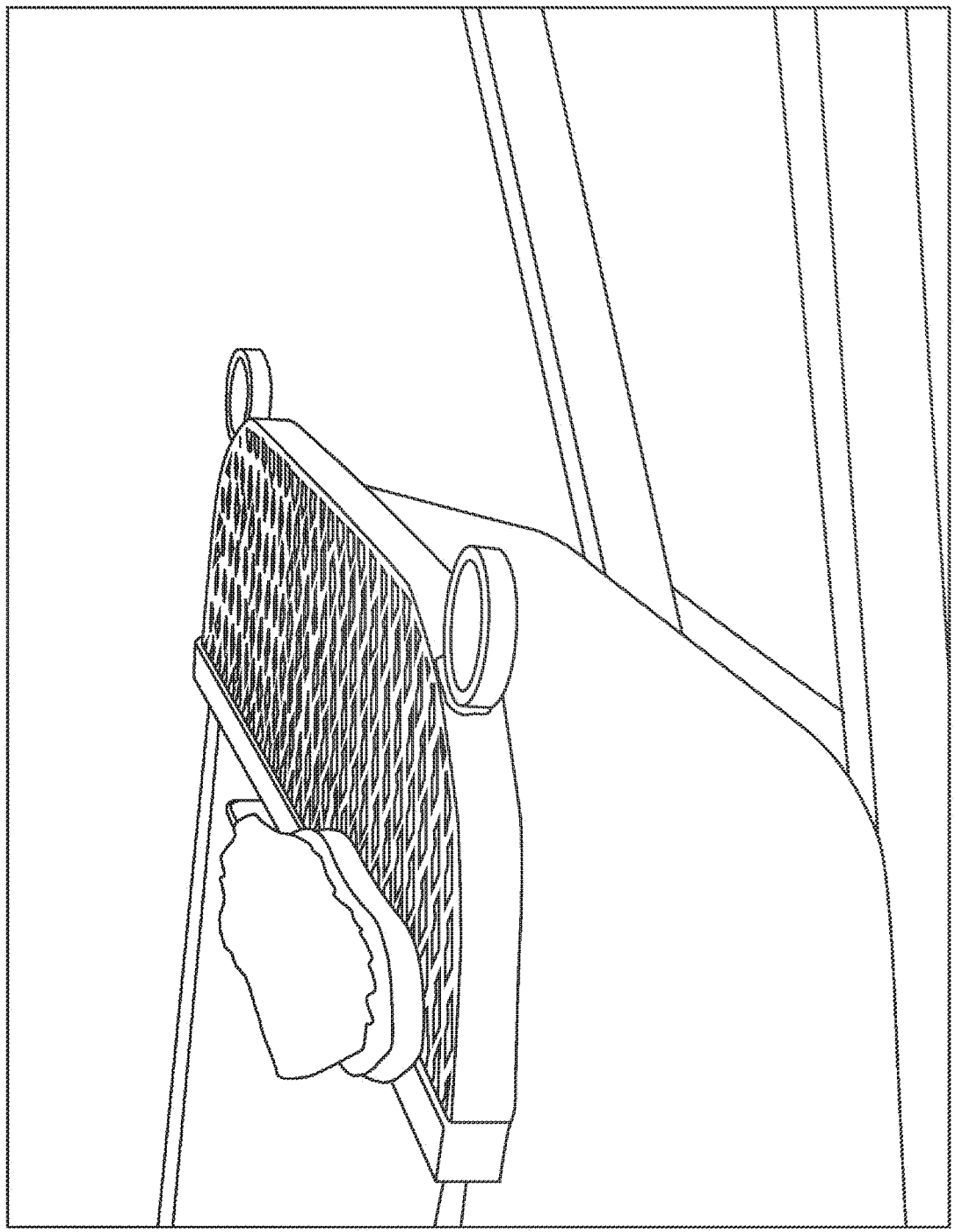
FIGS. 24 and 25 show the wheelbarrow in an inclined position with the shelf being retained in the use position by an outer flange.
Figure 25:
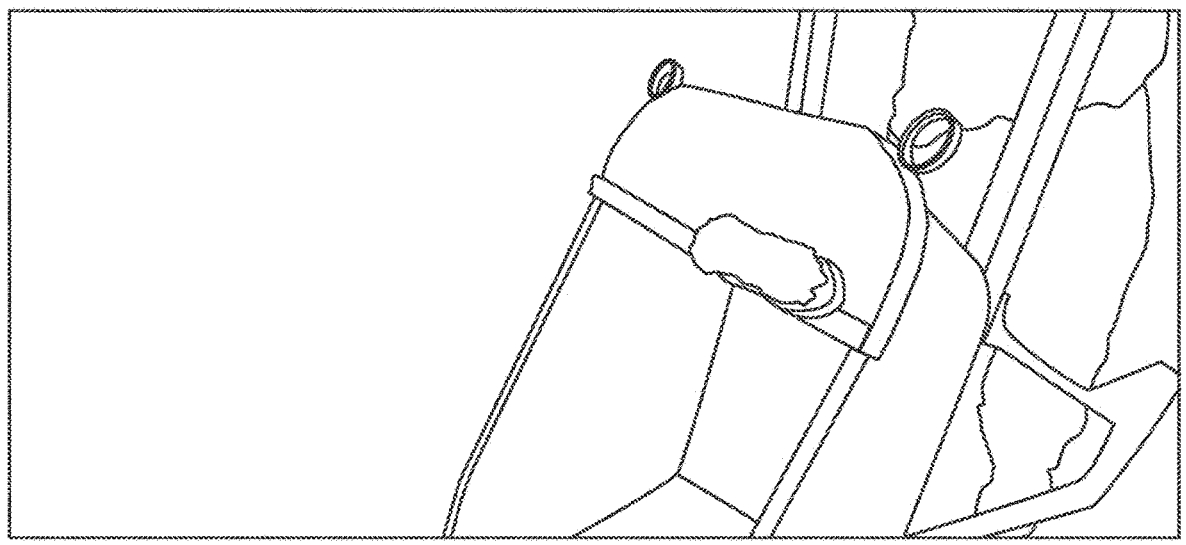

FIGS. 24 and 25 show the wheelbarrow in an inclined position with the shelf being retained in the use position by the outer flange 9. The wheelbarrow 1 can be pivoted up to 90 degrees before the shelf 5 would fall off. In accordance with at least one possible exemplary embodiment, the shelf 5 and/or the outer flange 9 could include an additional retaining piece or structure that could retain the shelf 5 in place even if the wheelbarrow 1 were pivoted past 90 degrees.

Figure 26:
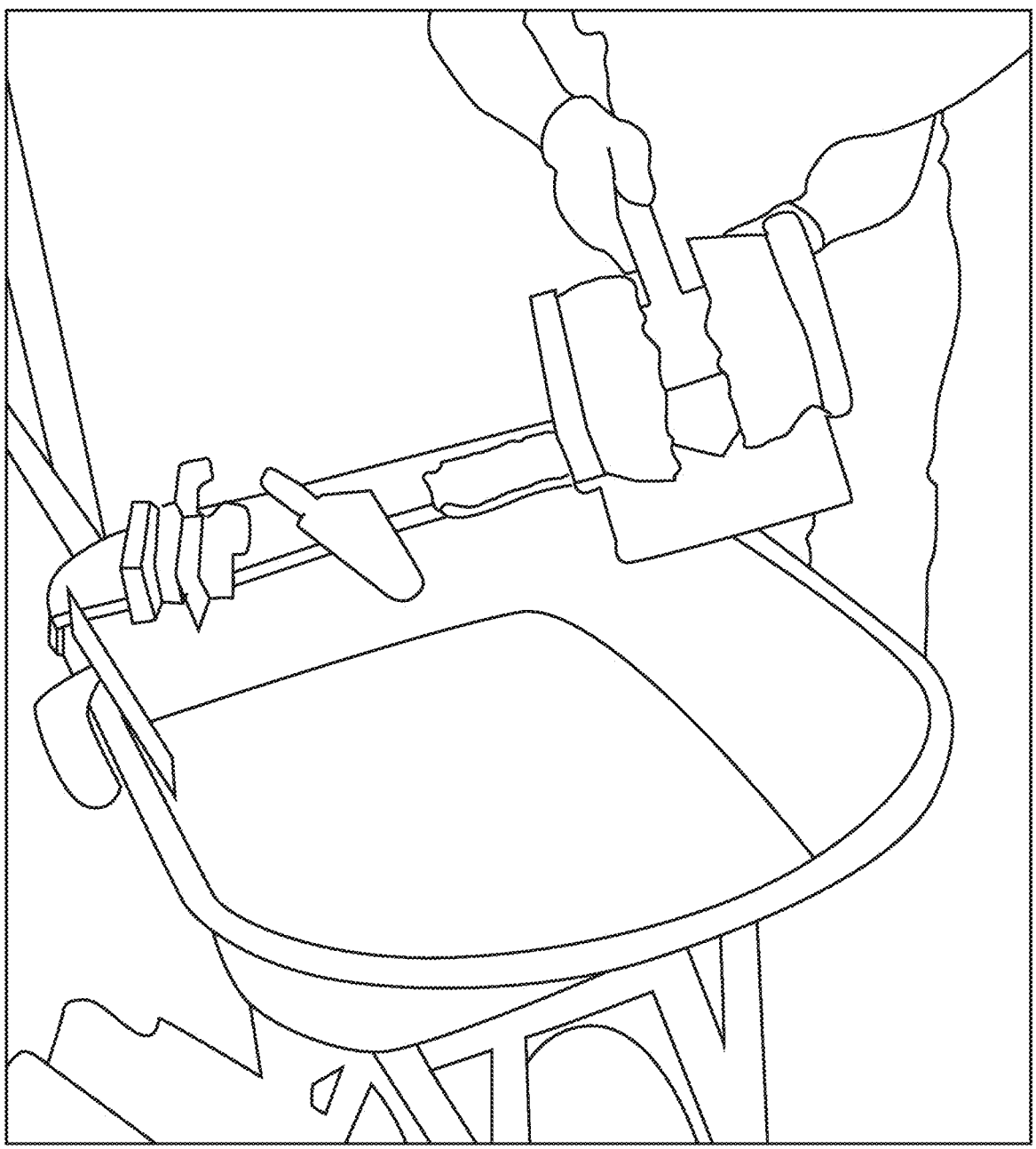
FIGS. 26 and 27 show a double-brush device for use in cleaning concrete tools that can be connected or attached to the shelf.
Figure 27:
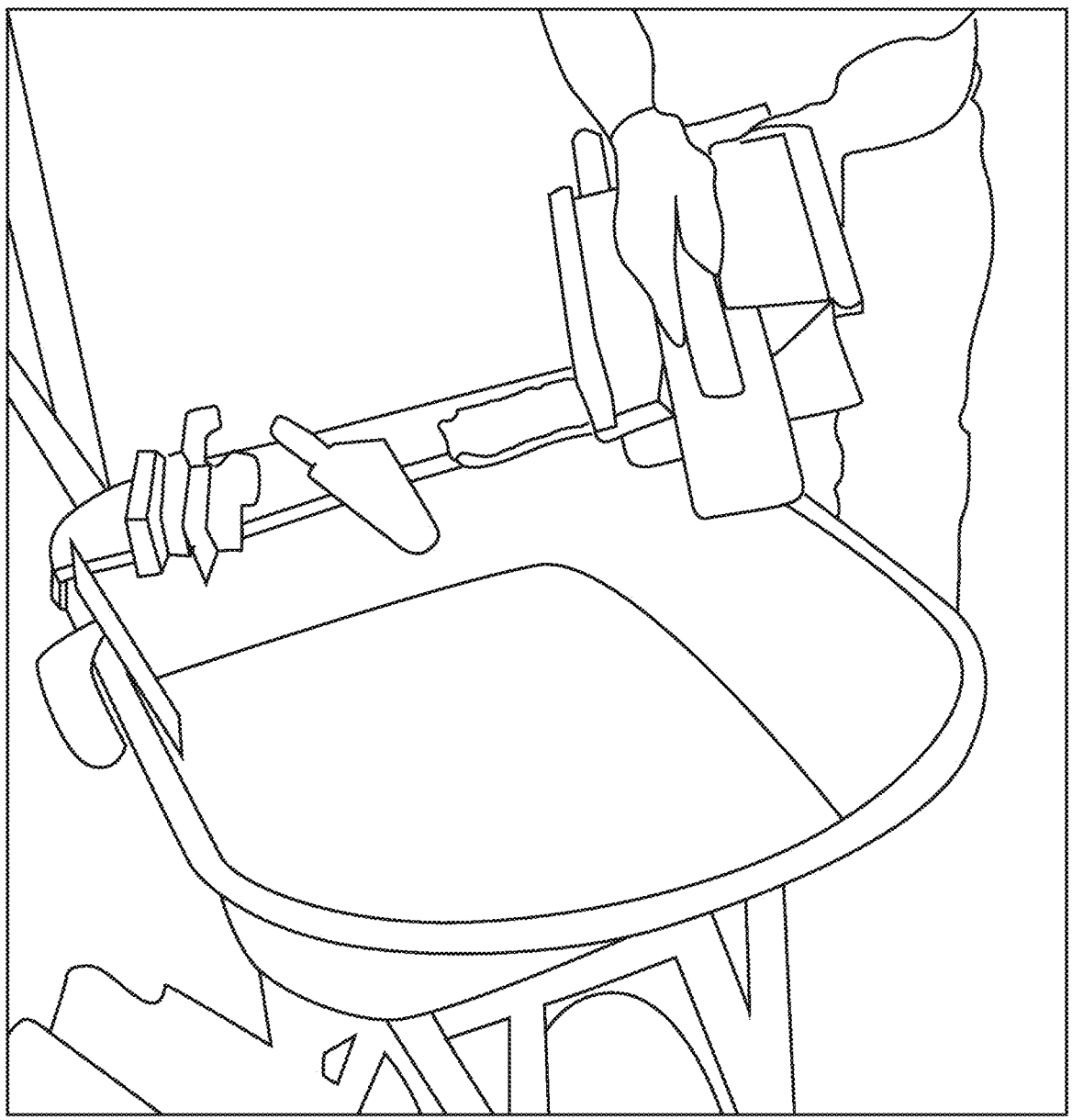
Figure 28:
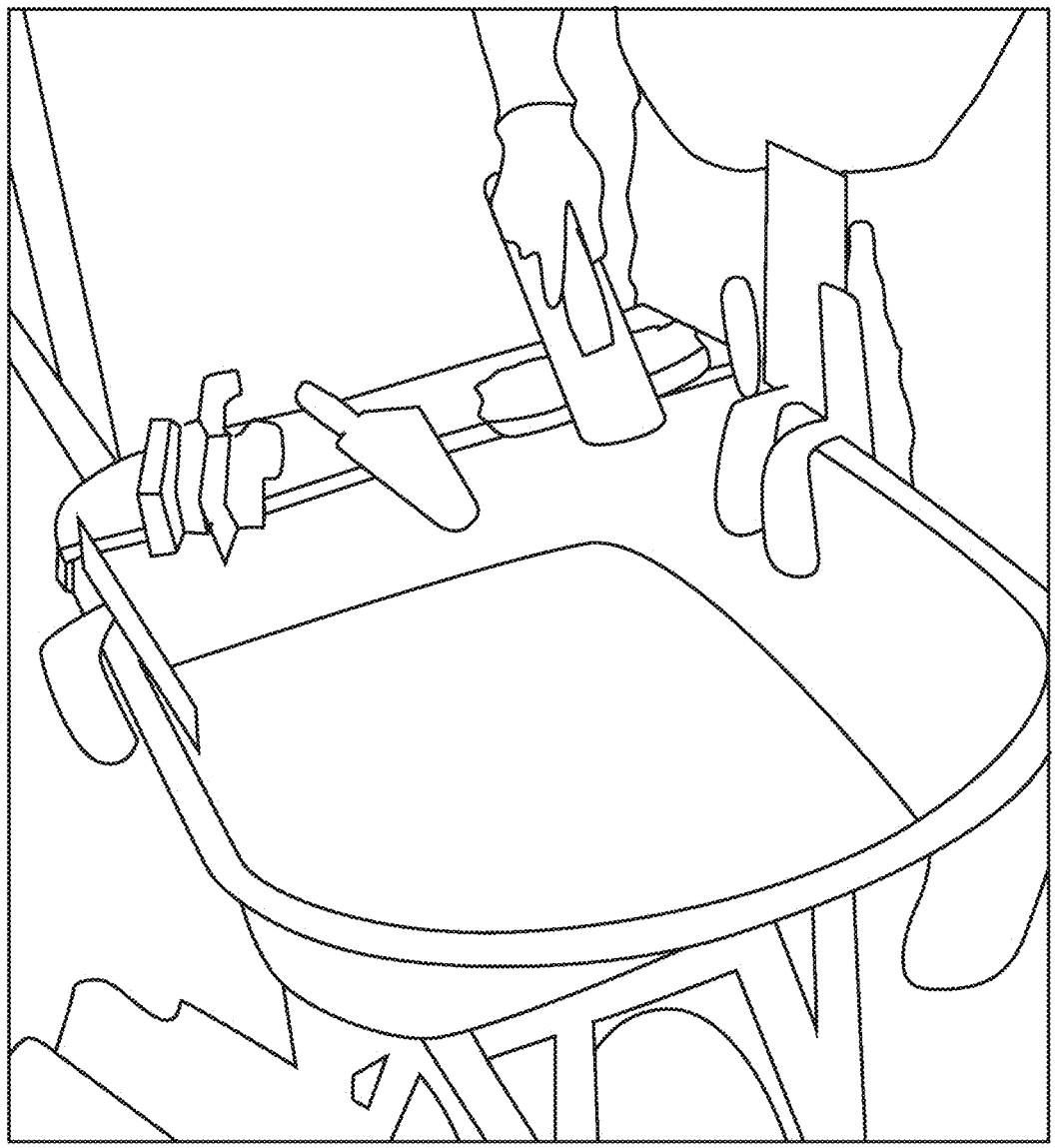
FIGS. 28 and 29 show a single-brush device for use in cleaning concrete tools that is connected or attached to the shelf.
Figure 29:
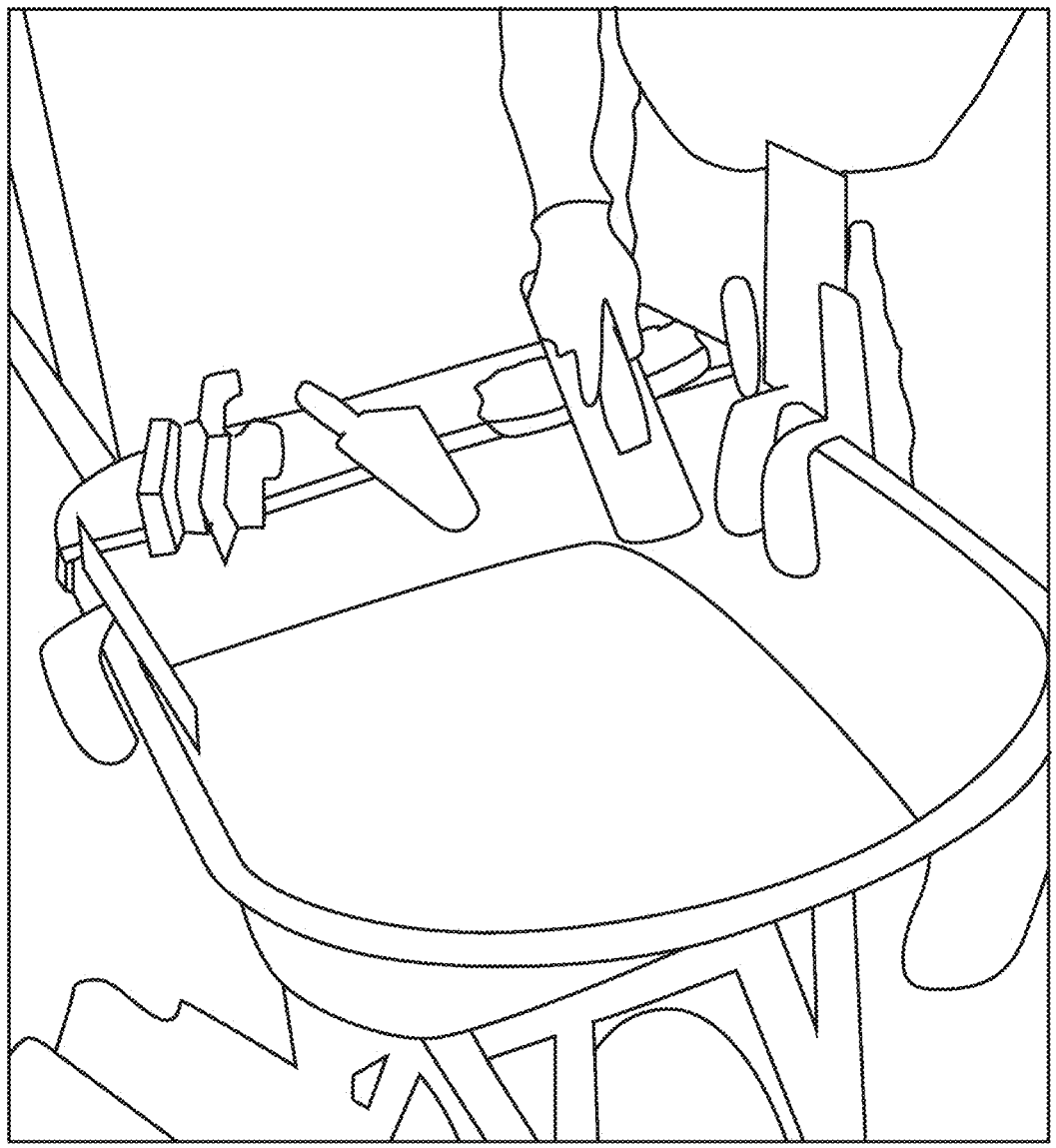

FIGS. 26 and 27 show a double-brush device for use in cleaning concrete tools that can be connected or attached to the shelf. FIGS. 28 and 29 show a single-brush device for use in cleaning concrete tools that is connected or attached to the shelf. As can be seen, a concrete trowel can be easily and quickly cleaned by rubbing the trowel against the brushes.

Figure 30:
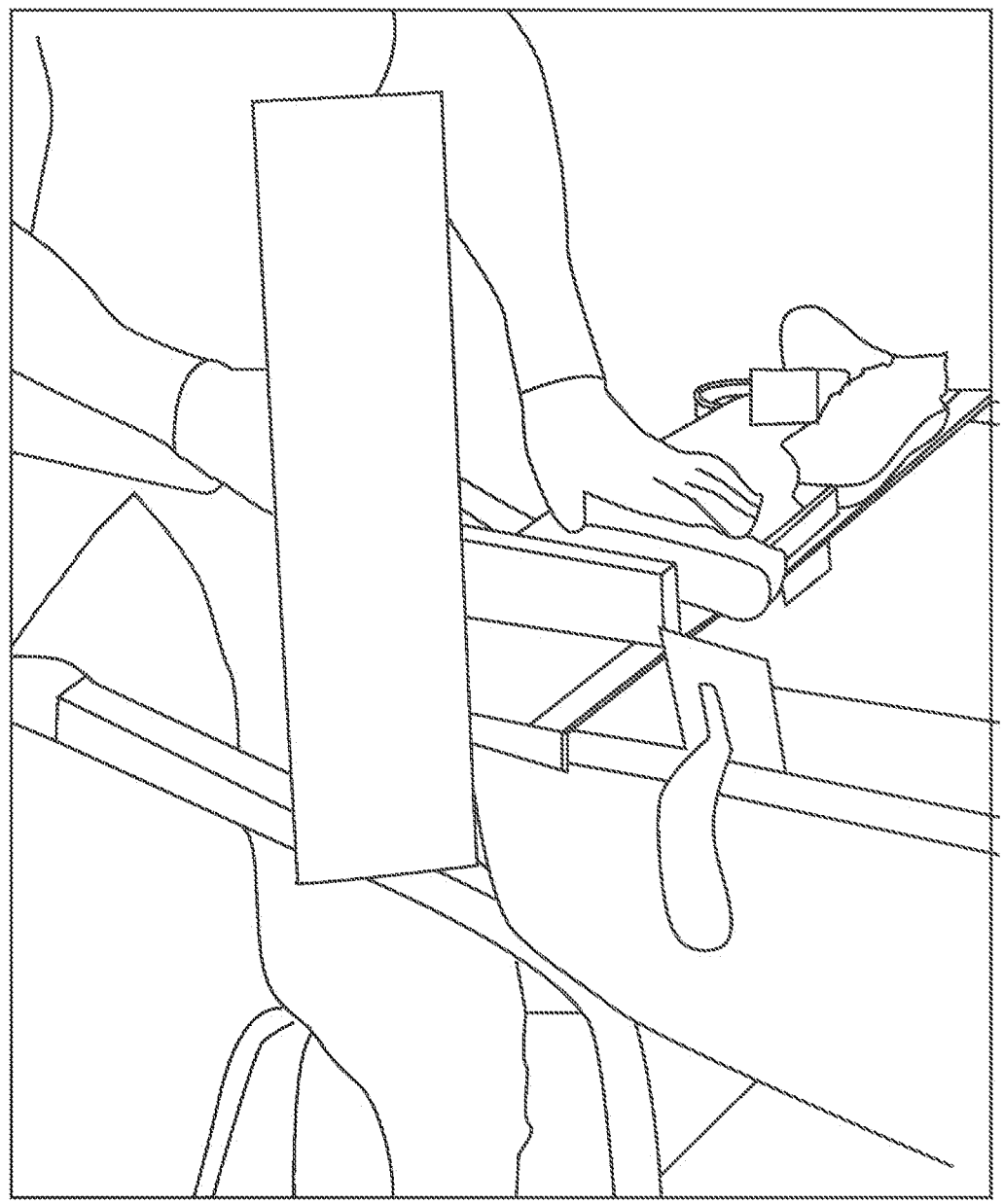
FIGS. 30, 31, and 32 show a concrete tool being scraped against an edge of the shelf.
Figure 31:
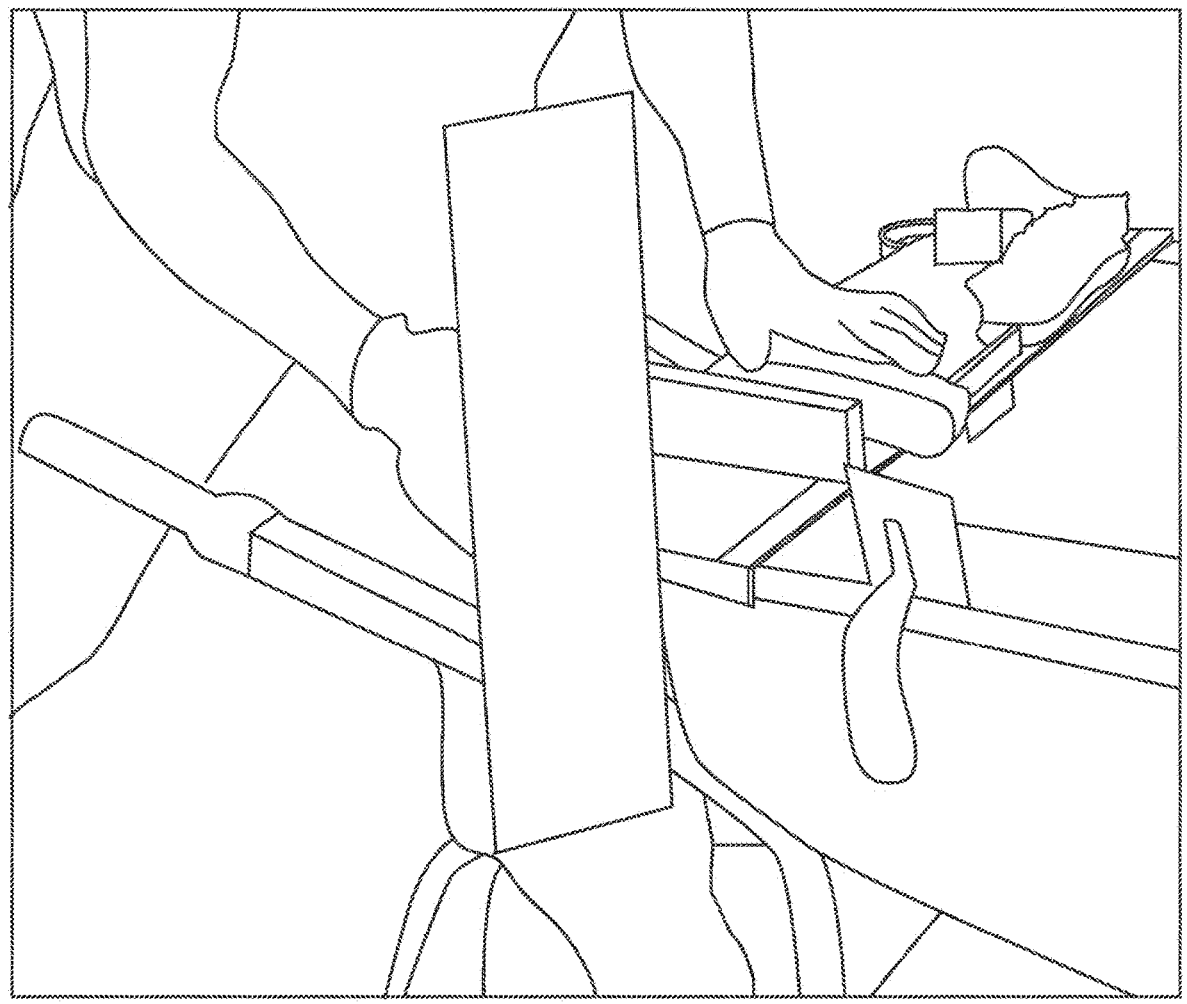
Figure 32:
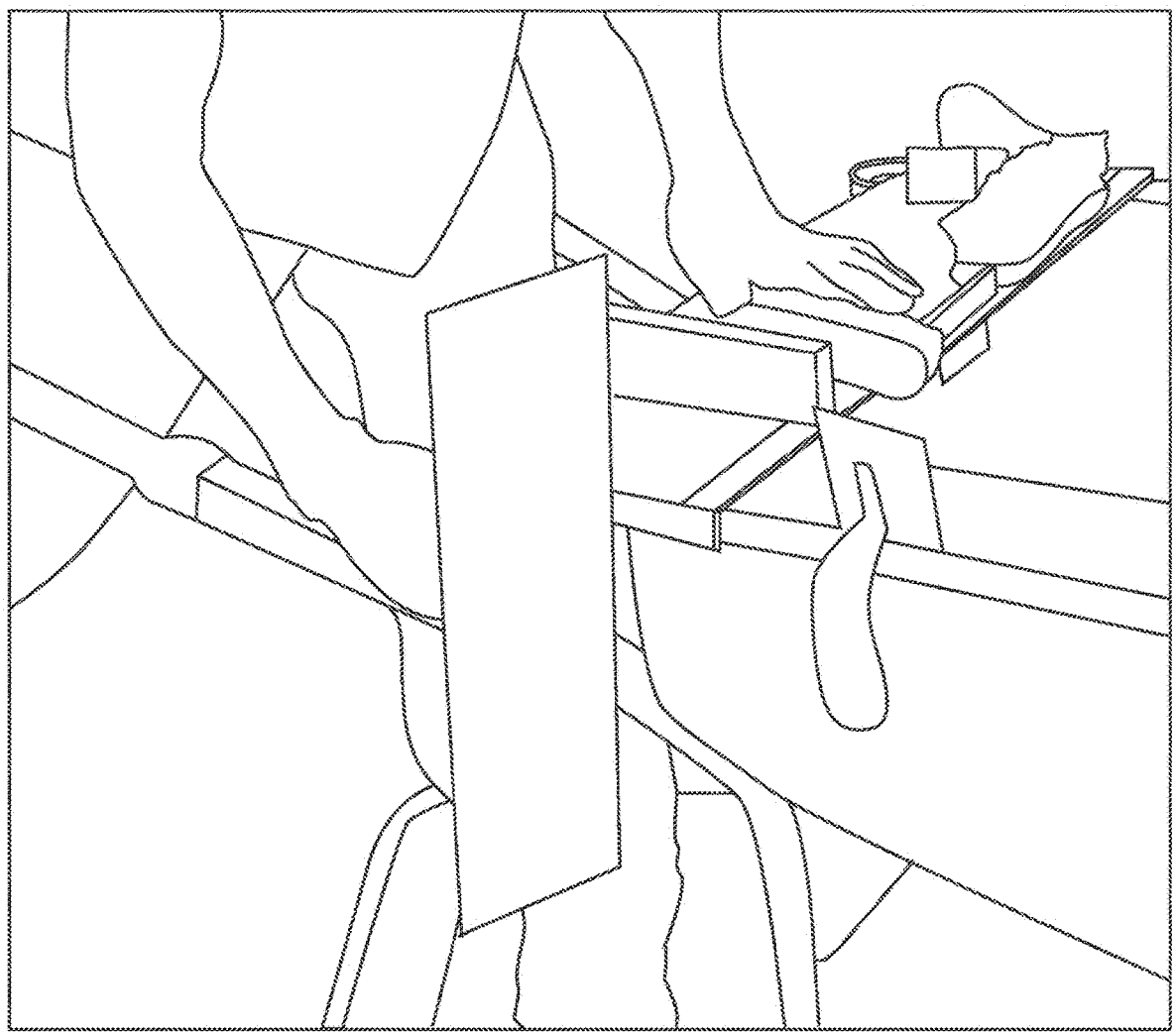
Figure 33:
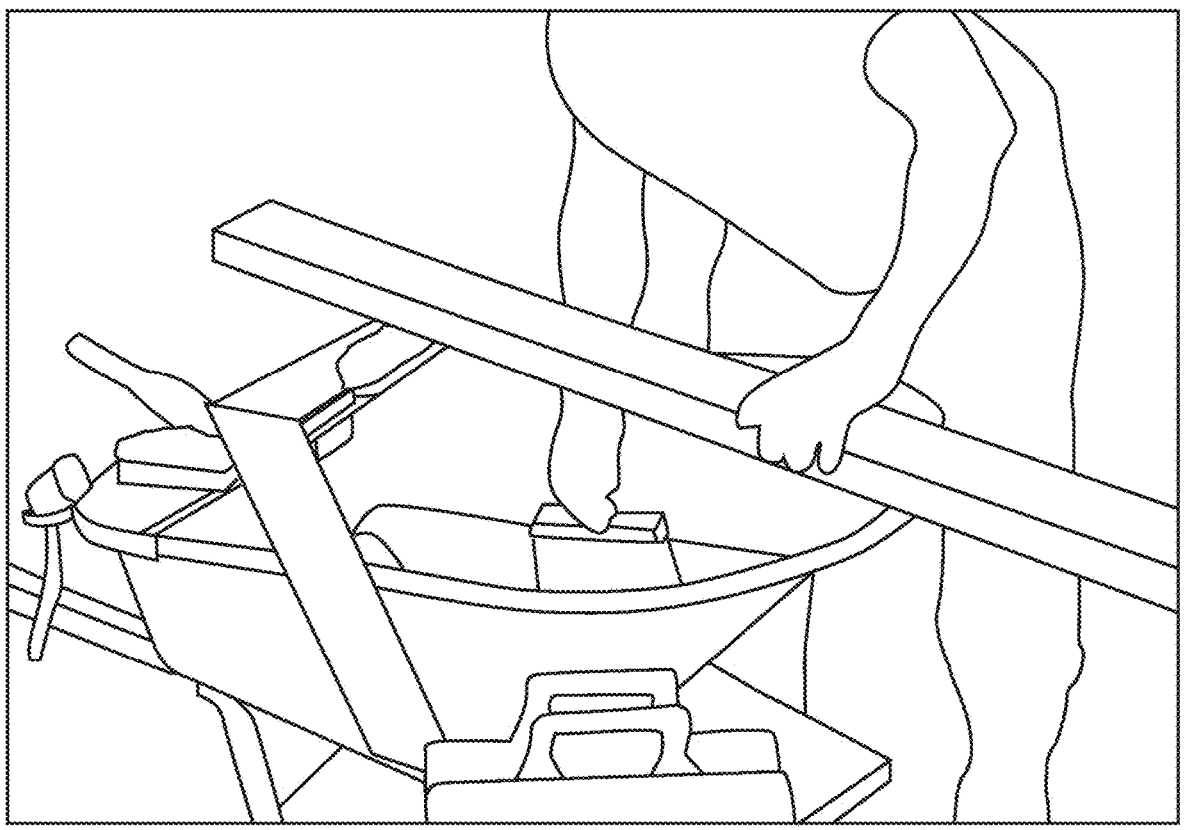
FIGS. 33, 34, 35, 36, and 37 show steps in cleaning a concrete screed with the shelf.
Figure 34:
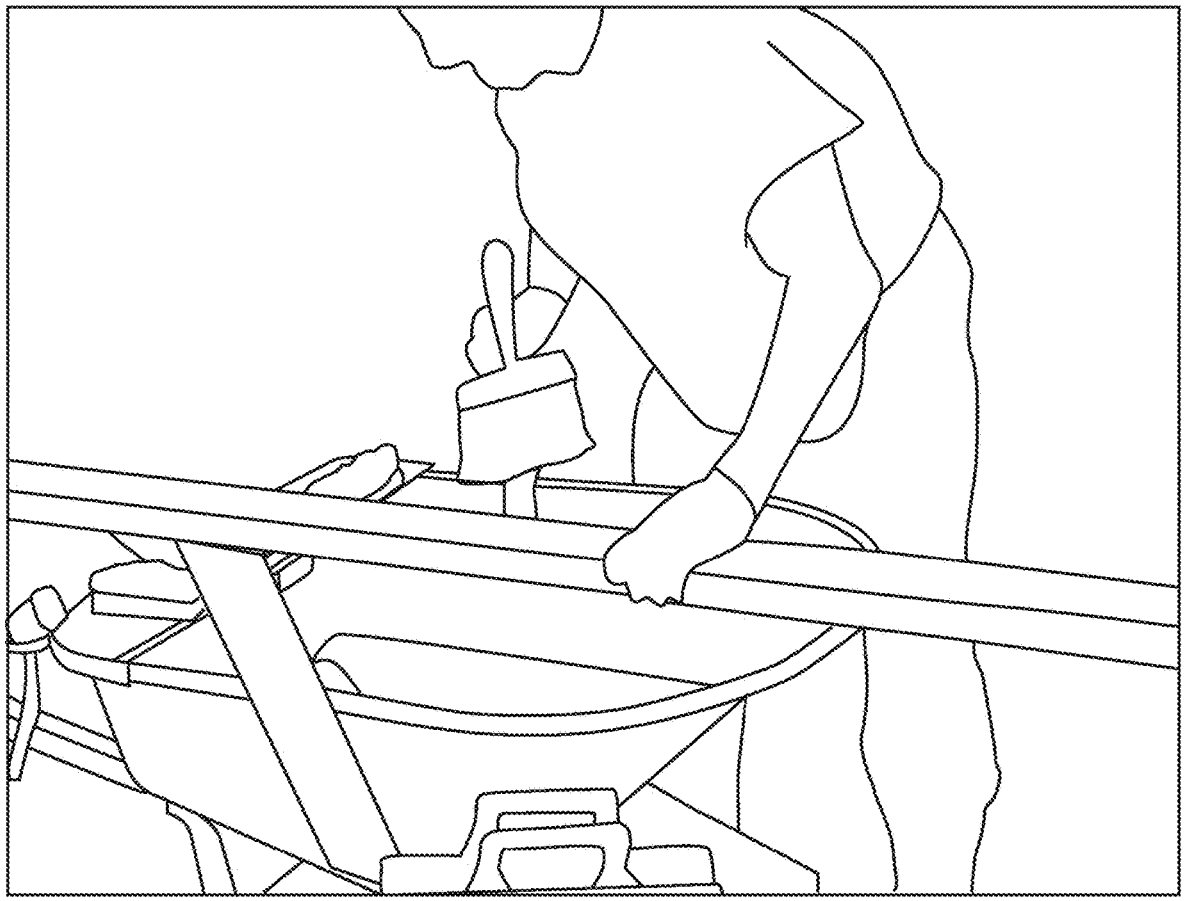

FIGS. 30, 31, and 32 show a concrete tool being scraped against an edge of the shelf. As is well known in the concrete building industry, concrete tools for smoothing and edging require a smooth and uninterrupted edge to achieve a smooth finish of the concrete. However, it is common for concrete tool edges to become chipped or damaged. In accordance with at least one possible exemplary embodiment, the side of the shelf 5 includes a metal file structure to permit filing of an edge of a concrete tool. As shown in FIGS. 30, 31, and 32, a worker could file the tool by scraping the tool up and down or back and forth across the file. By including the file on the shelf, not only is the file readily available to the worker at the work site, but the file is also held firmly in place to allow a vigorous scraping or filing to achieve the best results with minimal effort.

Figure 35:
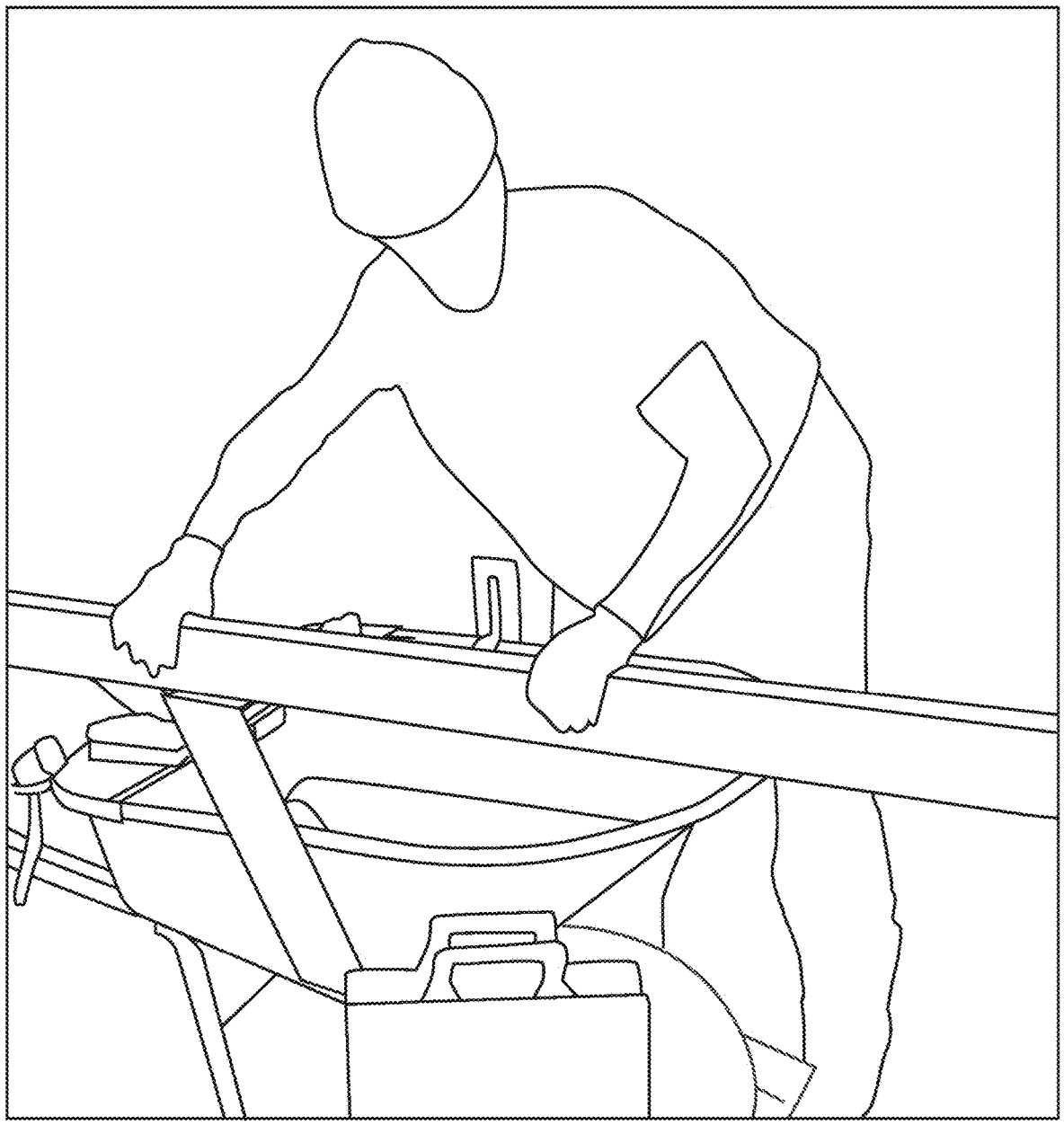
Figure 36:
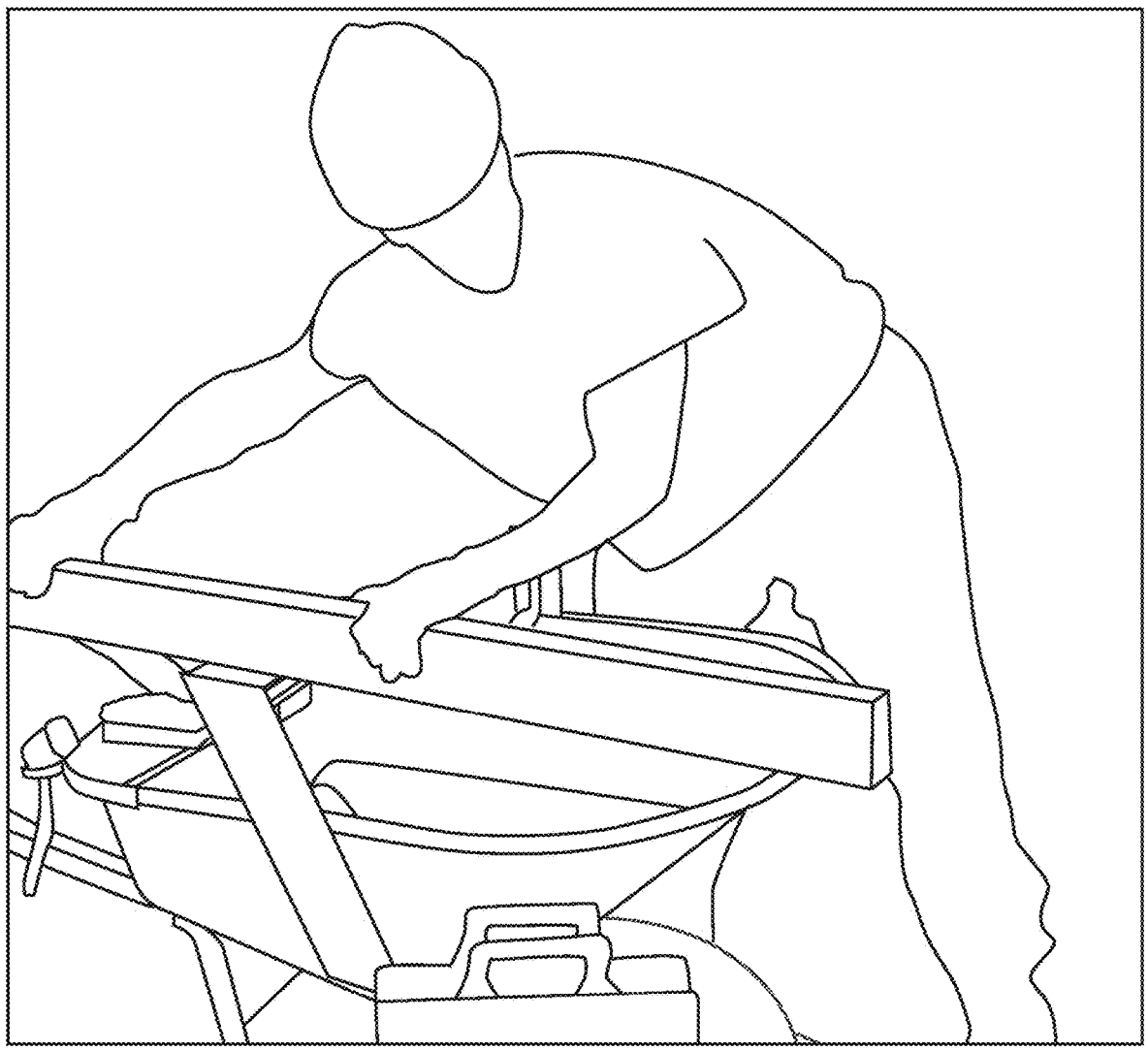
Figure 37:
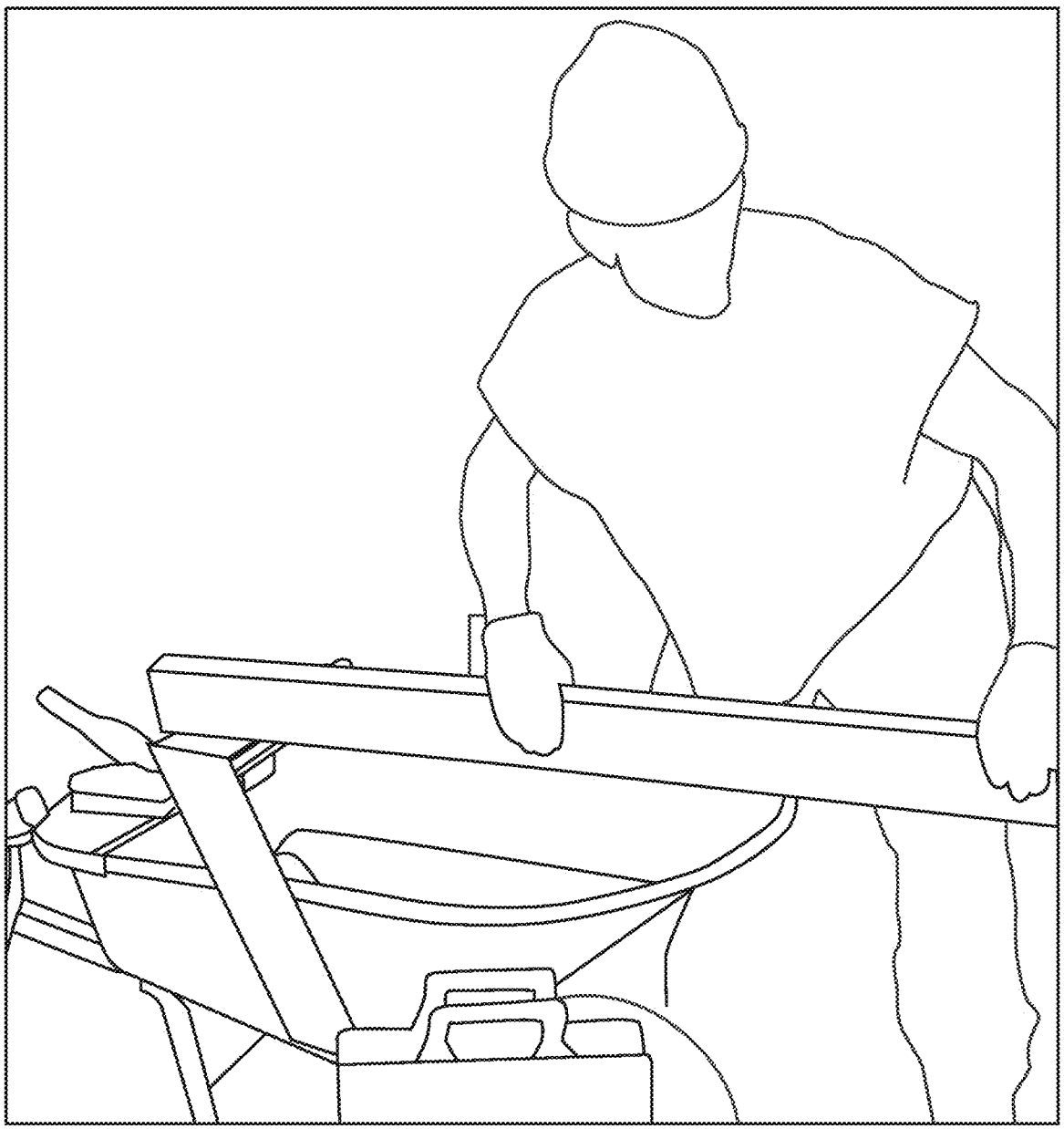

FIGS. 33, 34, 35, 36, and 37 show steps in cleaning a concrete screed with the shelf. As is known in the industry, concrete screeds are very long bars of wood or metal, and thus are unwieldy and can be difficult to clean. A shown in FIGS. 33 and 34, the shelf 5 provides a stable support surface on which to place the screed during cleaning. In addition, the scraping flange 13 can be used to very quickly scrape concrete material off of the screed. As shown in FIGS. 35, 36, and 37, all a worker has to do is slide the screed back and forth along the scraping flange 13. Not only does this quickly clean the screed, but it allows the worker to use two hands to move the screed around and apply more force to remove concrete material that might be more strongly adhered to the screed. In addition, since the shelf 5 is positioned above the basin 3, the concrete material scraped off the screed is collected in the basin 3, rather than being left on the ground of the work site to create a messy or unclean appearance.

Another use of the scraper flange 13 is for opening concrete bags during concrete work. Bags of concrete mix are fairly durable so as to not easily break open. In addition, the concrete bags are often quite heavy, ranging from 40 to 50 pounds or more or less. The scraper flange 13 provides a puncturing or tearing device for opening concrete bags without the need for a knife or other device. A worker can simply drop a concrete bag onto the scraper flange 13. The durable shelf 5 can hold the weight of the bag. The scraper flange 13 will thereby puncture the bag via the impact and weight of the bag. Since the opening is facing the basin 3 of the wheelbarrow 1, concrete mix drops right into the basin 3 easily without spilling out onto the ground. The worker can pull the bag in a horizontal direction against the scraper flange 13, thereby widening and lengthening the hole and allowing the concrete mix to just drop into the basin 3. The scraper flange 13 therefore allows a worker to quickly tear open bags of concrete mix while minimizing spillage or loss of concrete mix on the ground. As discussed herein, the shelf 5 can be easily moved between a working position and a storage position, so a worker can move the shelf 5 into the working position over the basin 3 to open concrete bags, then move the shelf 5 back into the storage position at the rear of the basin 3 when done opening concrete bags to permit maximum access to the basin 3 for mixing of the concrete.

Figure 38:
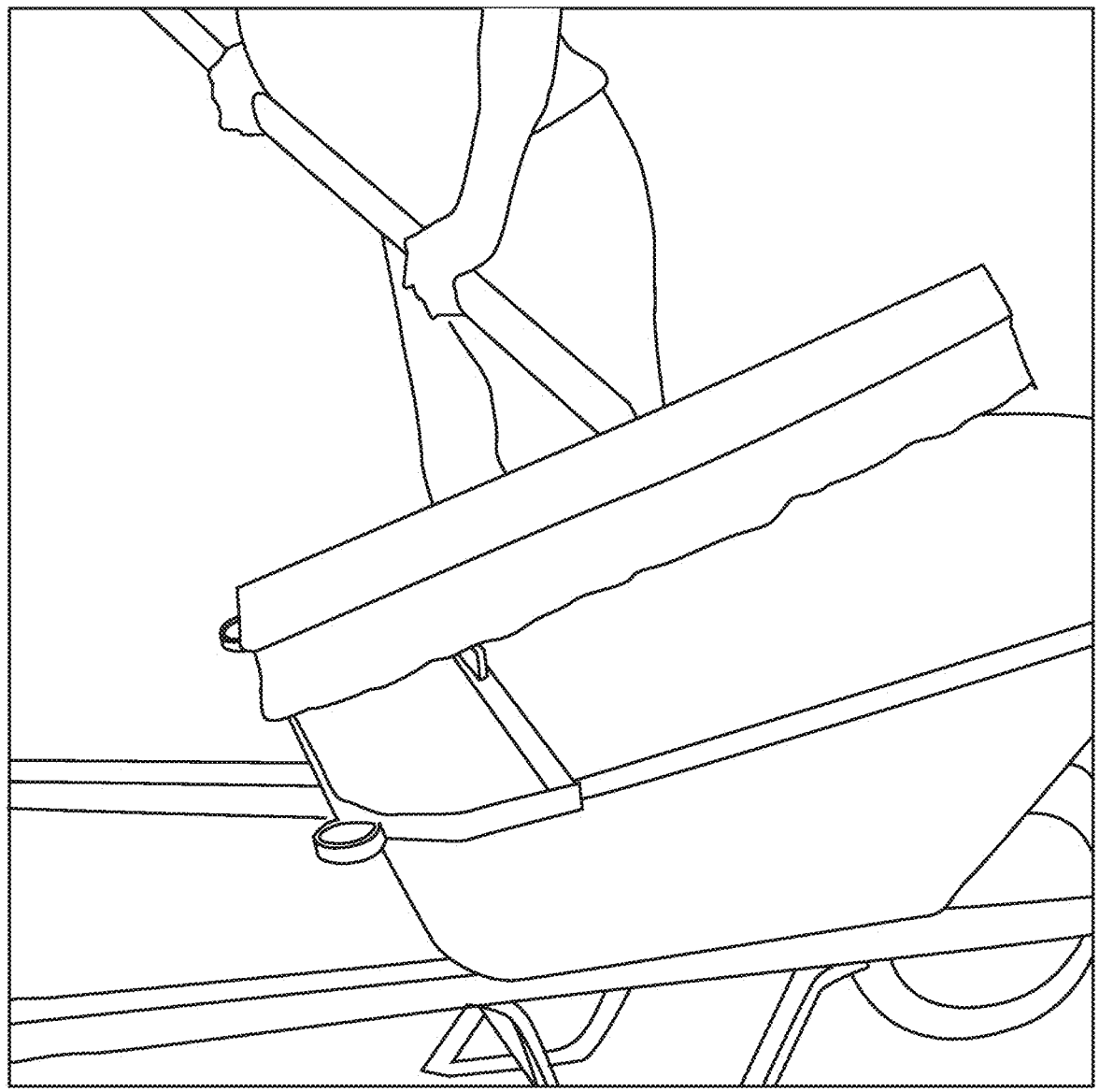
FIGS. 38, 39, 40, and 41 show steps in cleaning a concrete broom or brush with the shelf.
Figure 39:
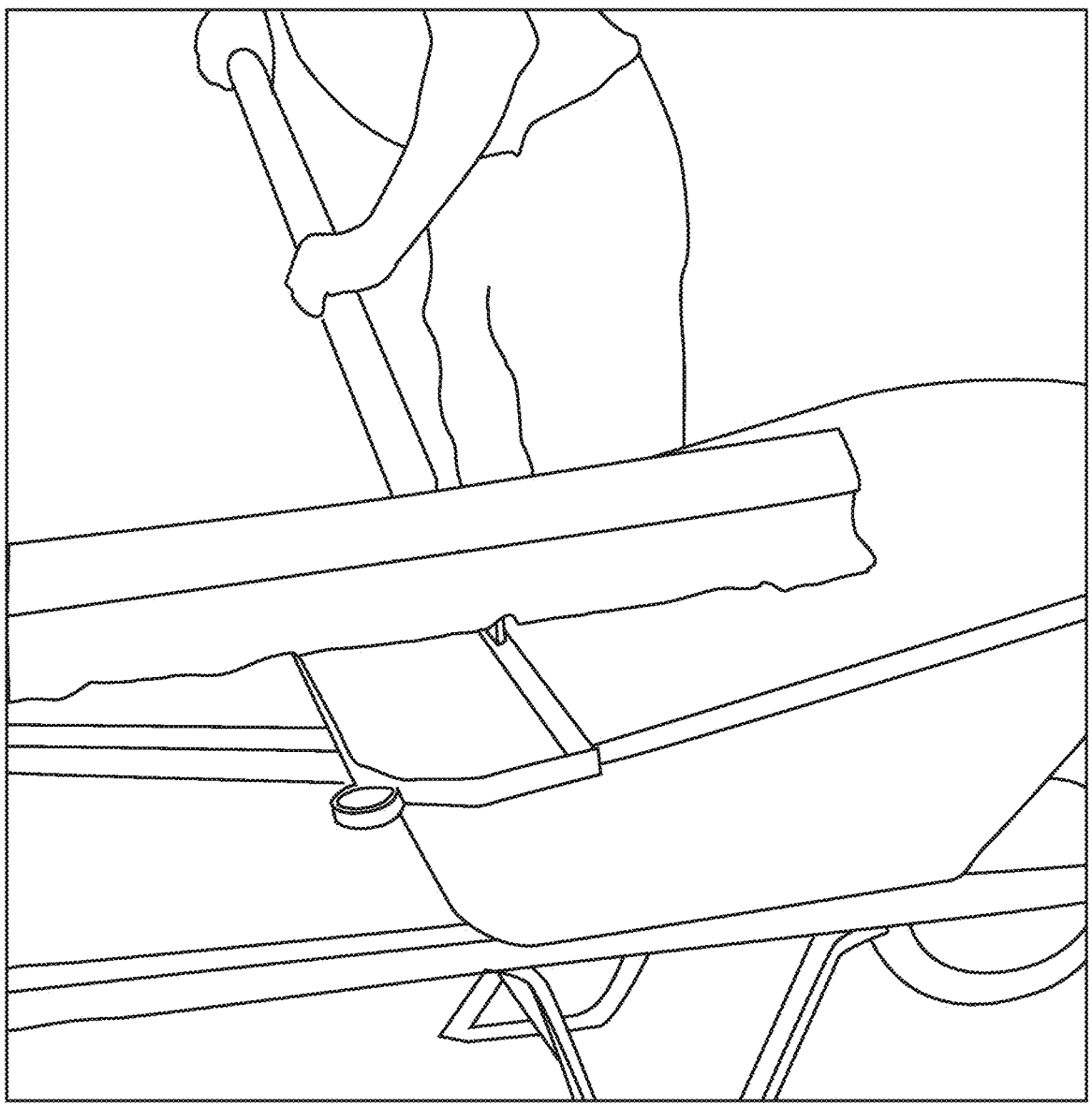
Figure 40:
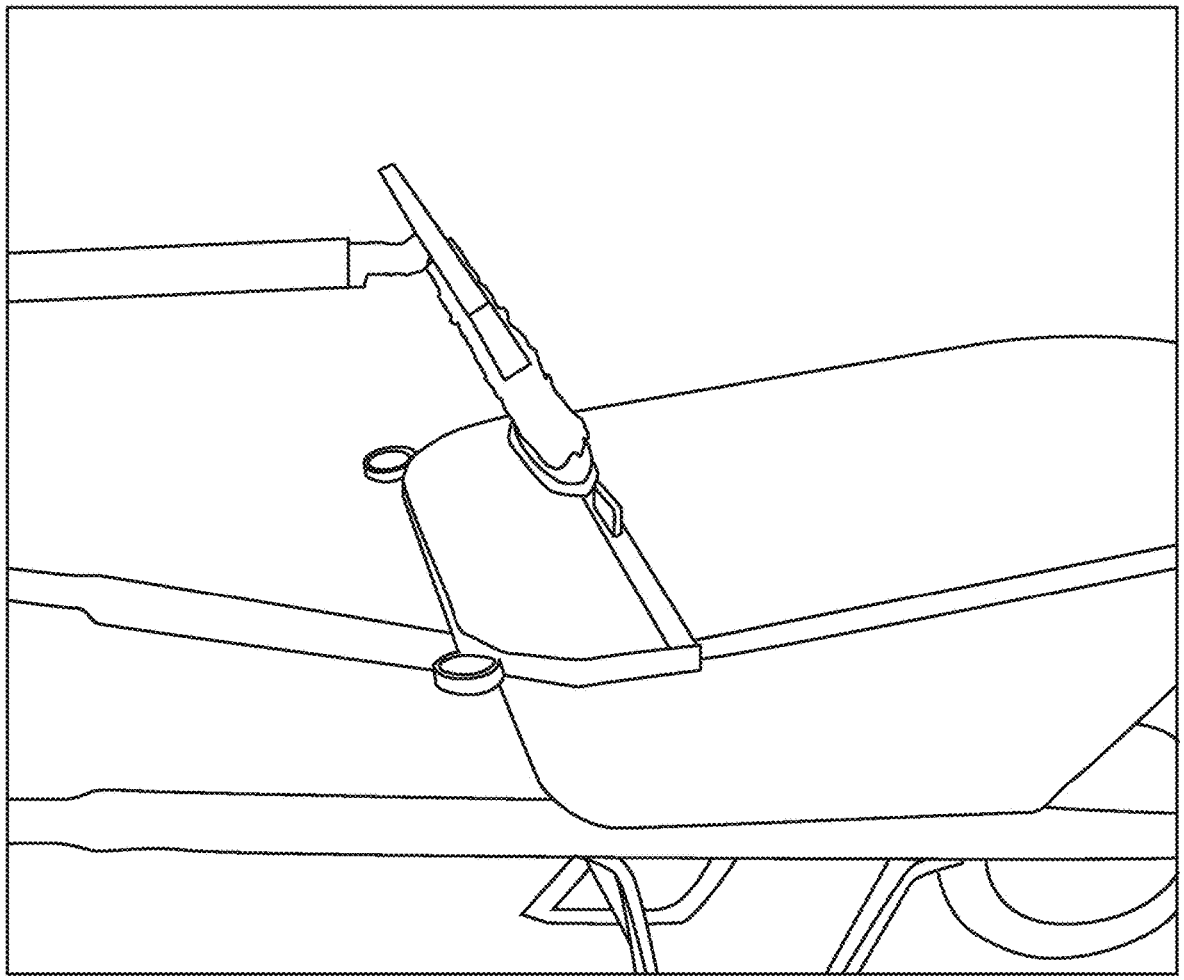
Figure 41:
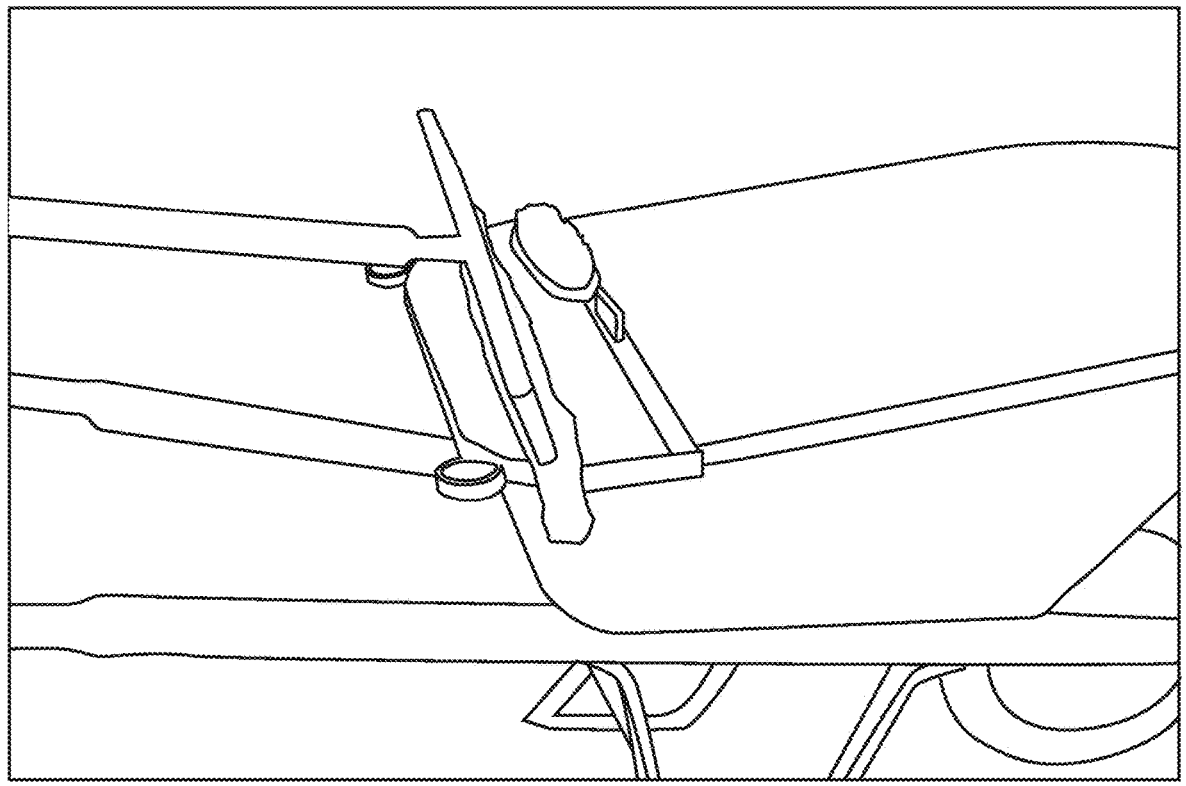
Figure 42:
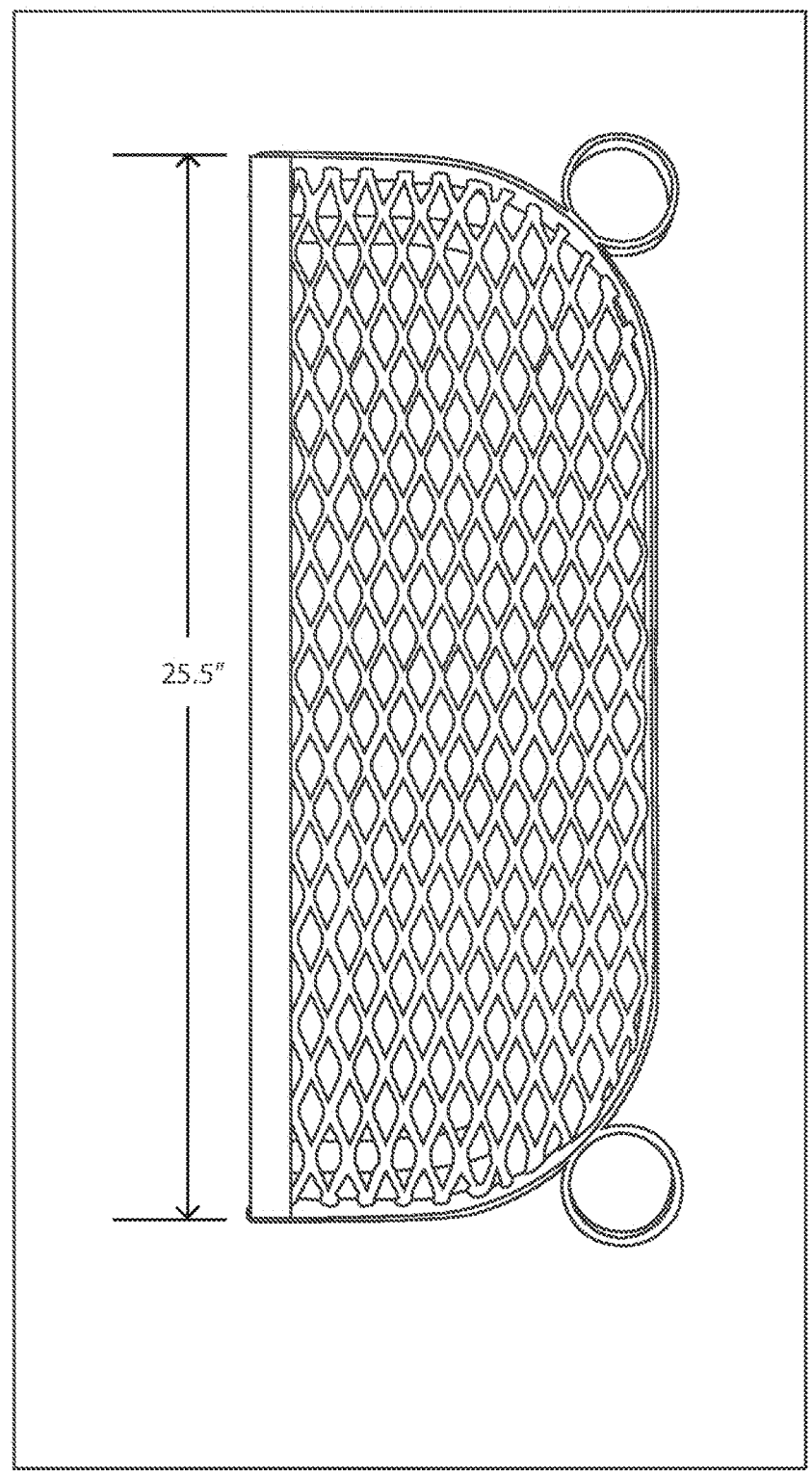
FIGS. 42, 43, 44, and 45 show views of the upper side of a shelf in accordance with at least one possible exemplary embodiment.
Figure 43:
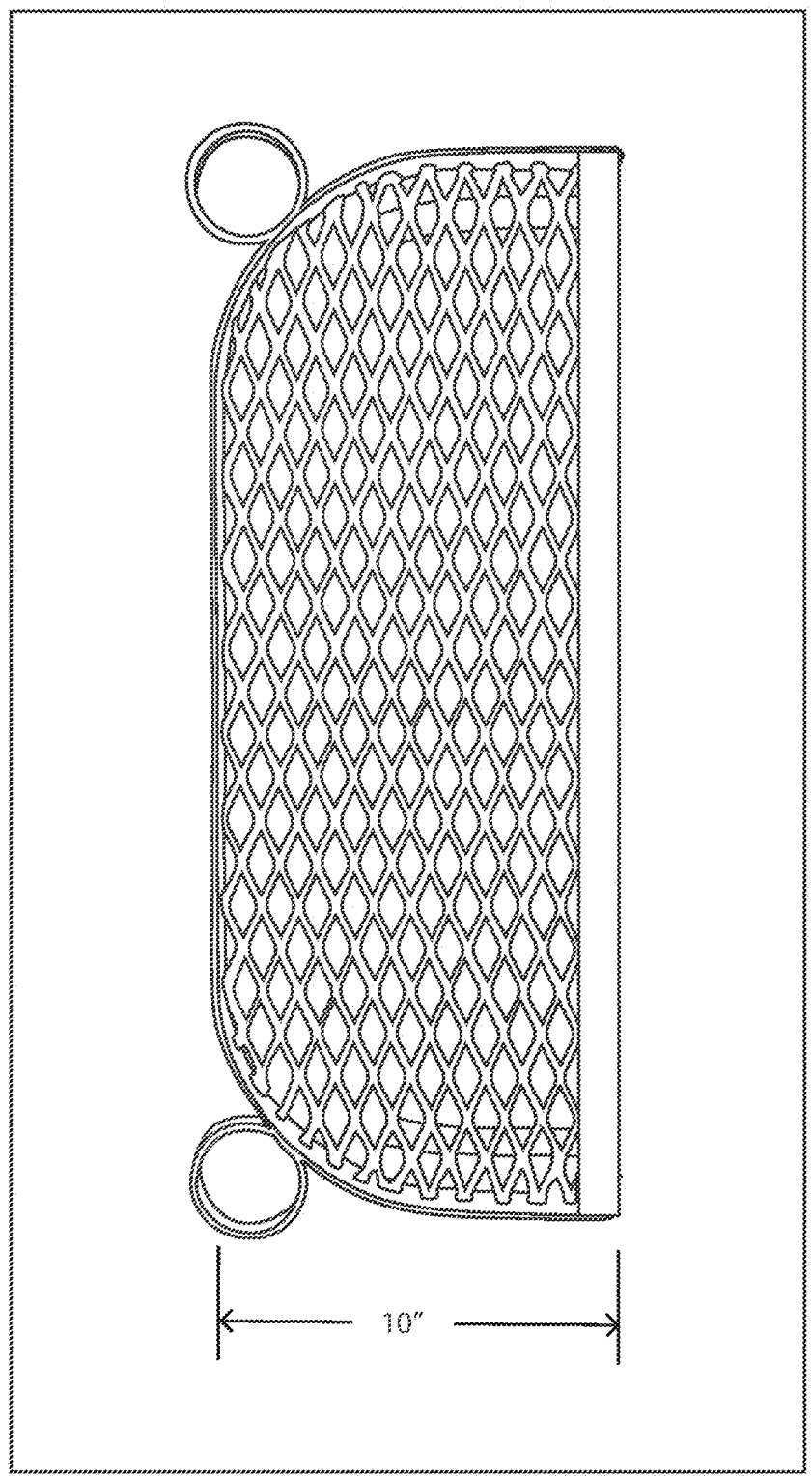
Figure 44:
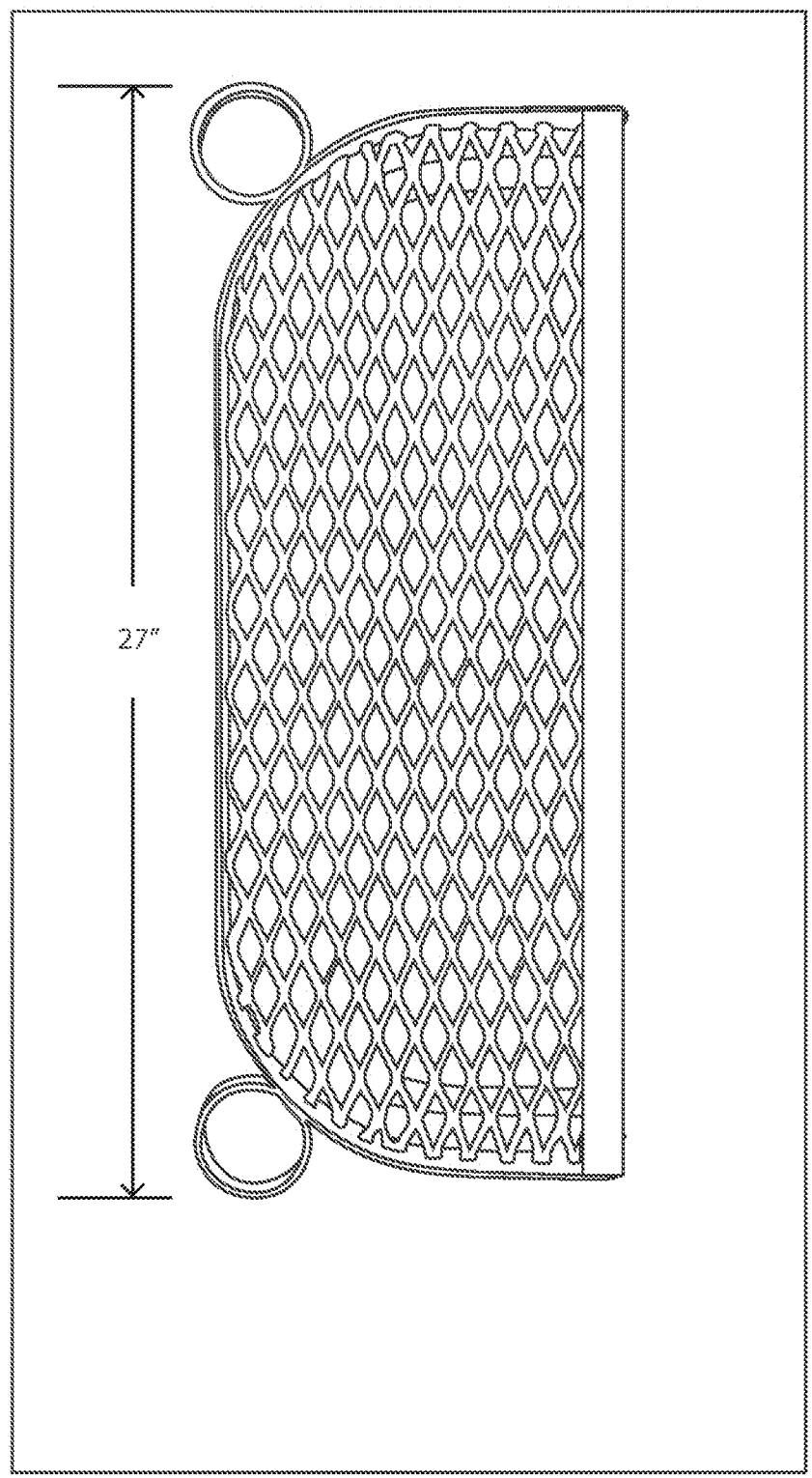
Figure 45:
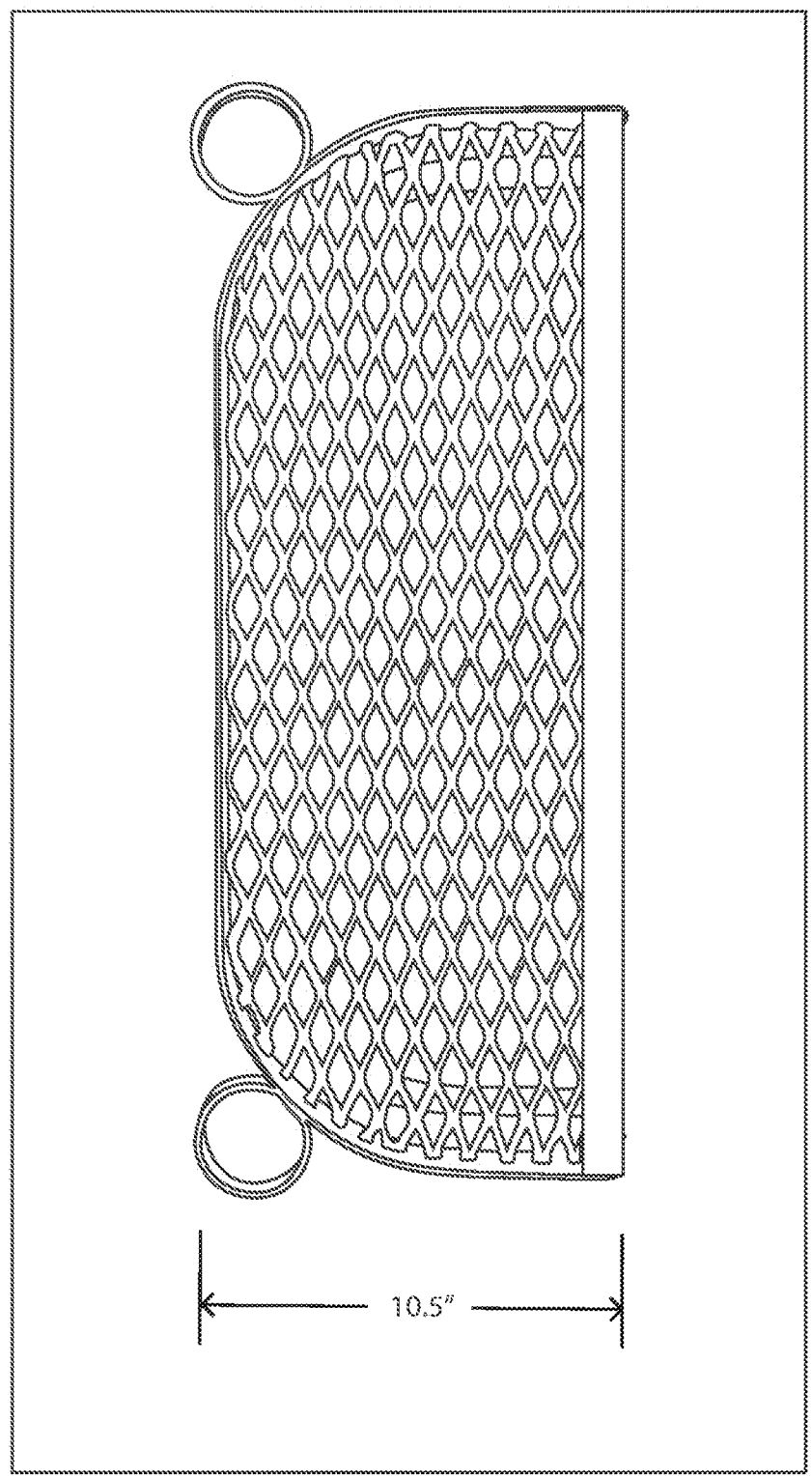
Figure 46:
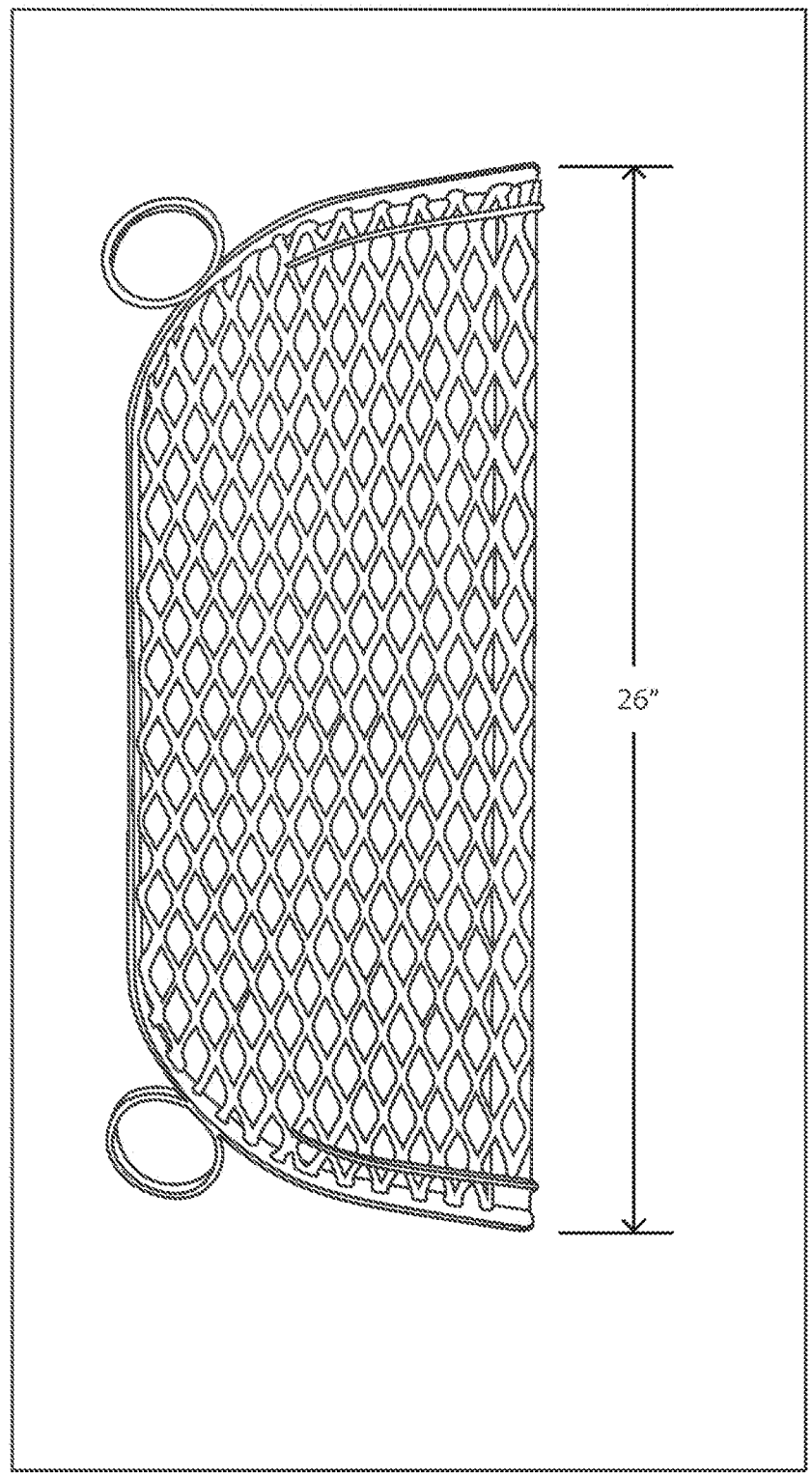
FIGS. 46, 47, 48, 49, 50, 51, 52, 53, and 54 show views of the lower side of the shelf shown in FIGS. 42, 43, 44, and 45.
Figure 47:
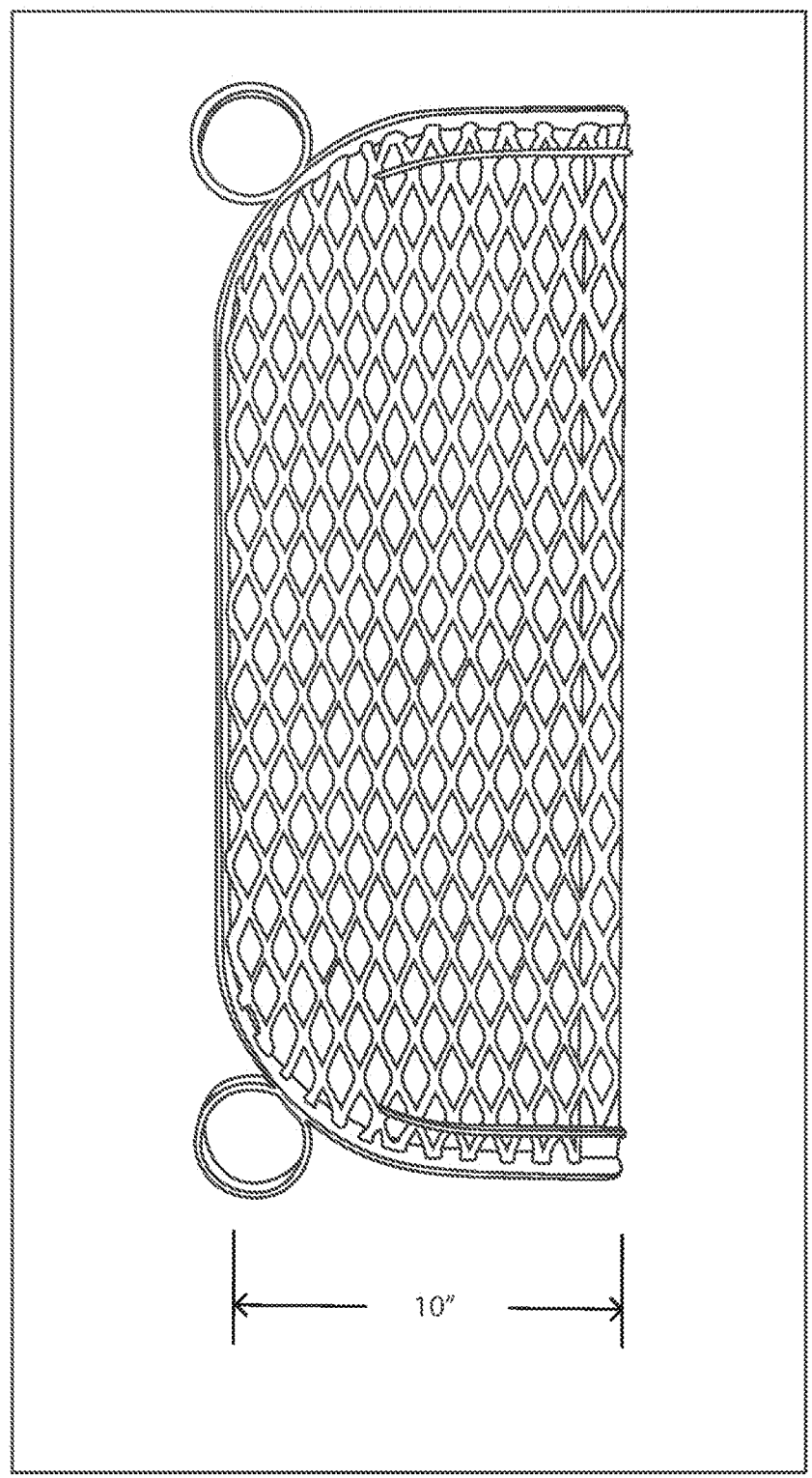
Figure 48:
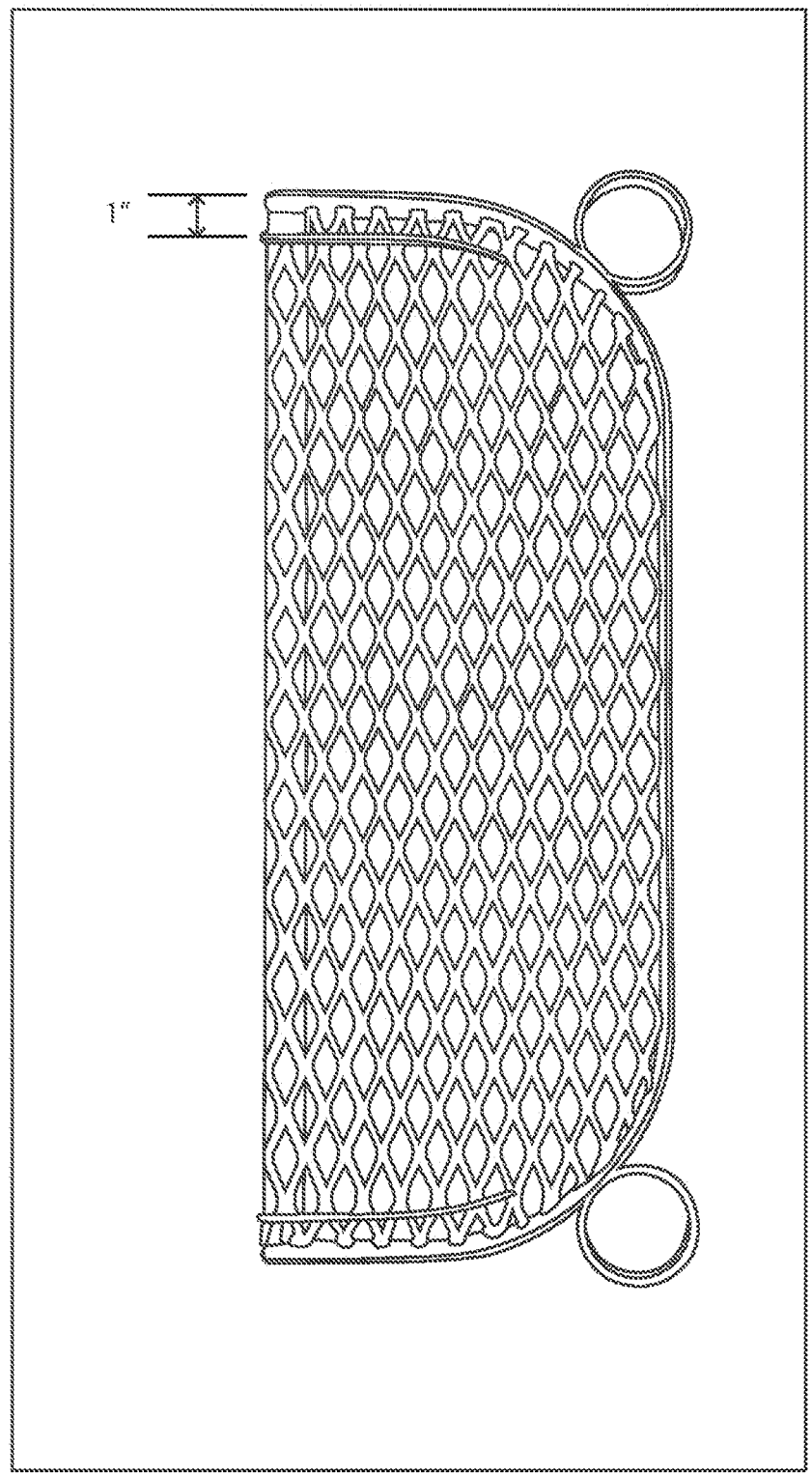
Figure 49:
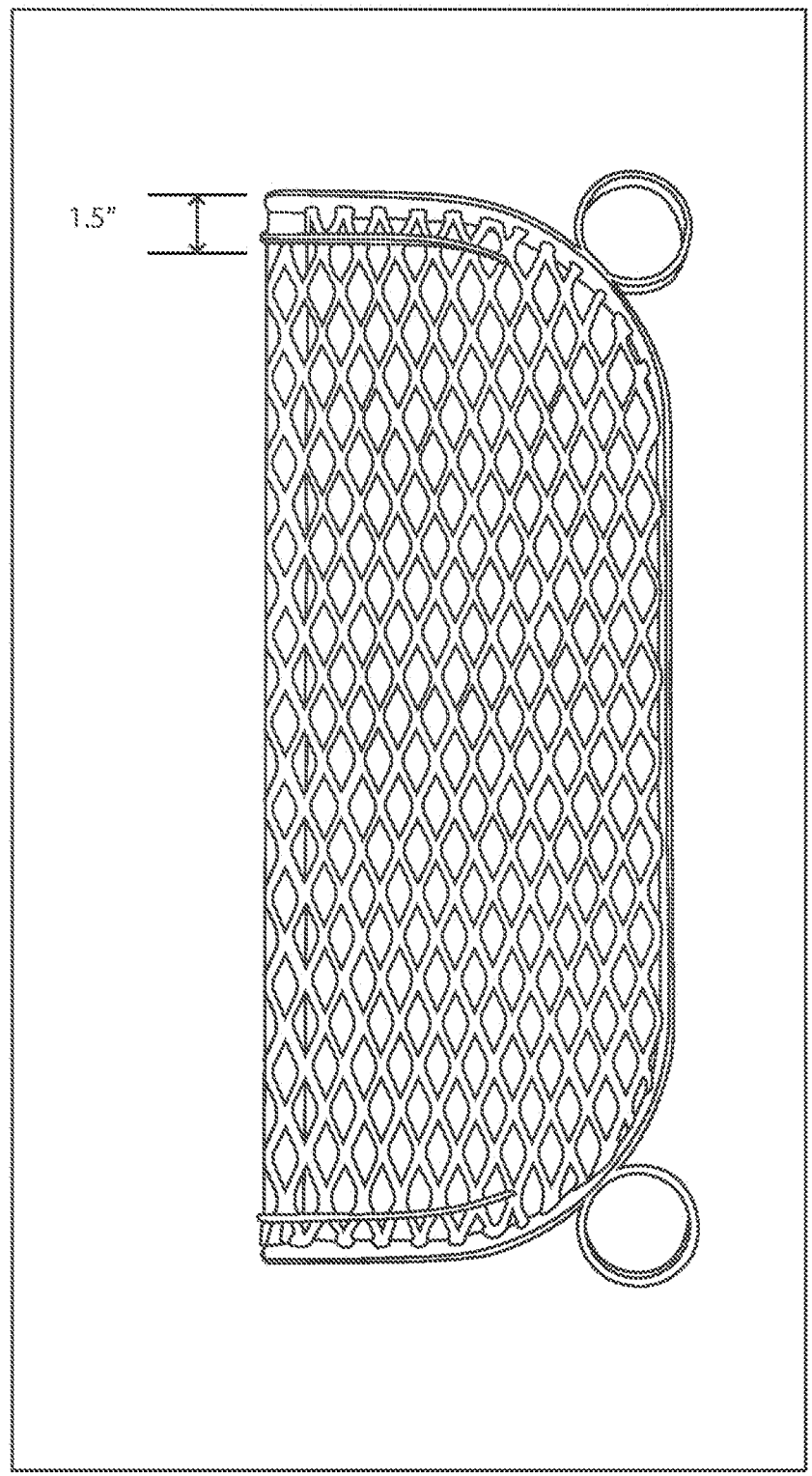
Figure 50:
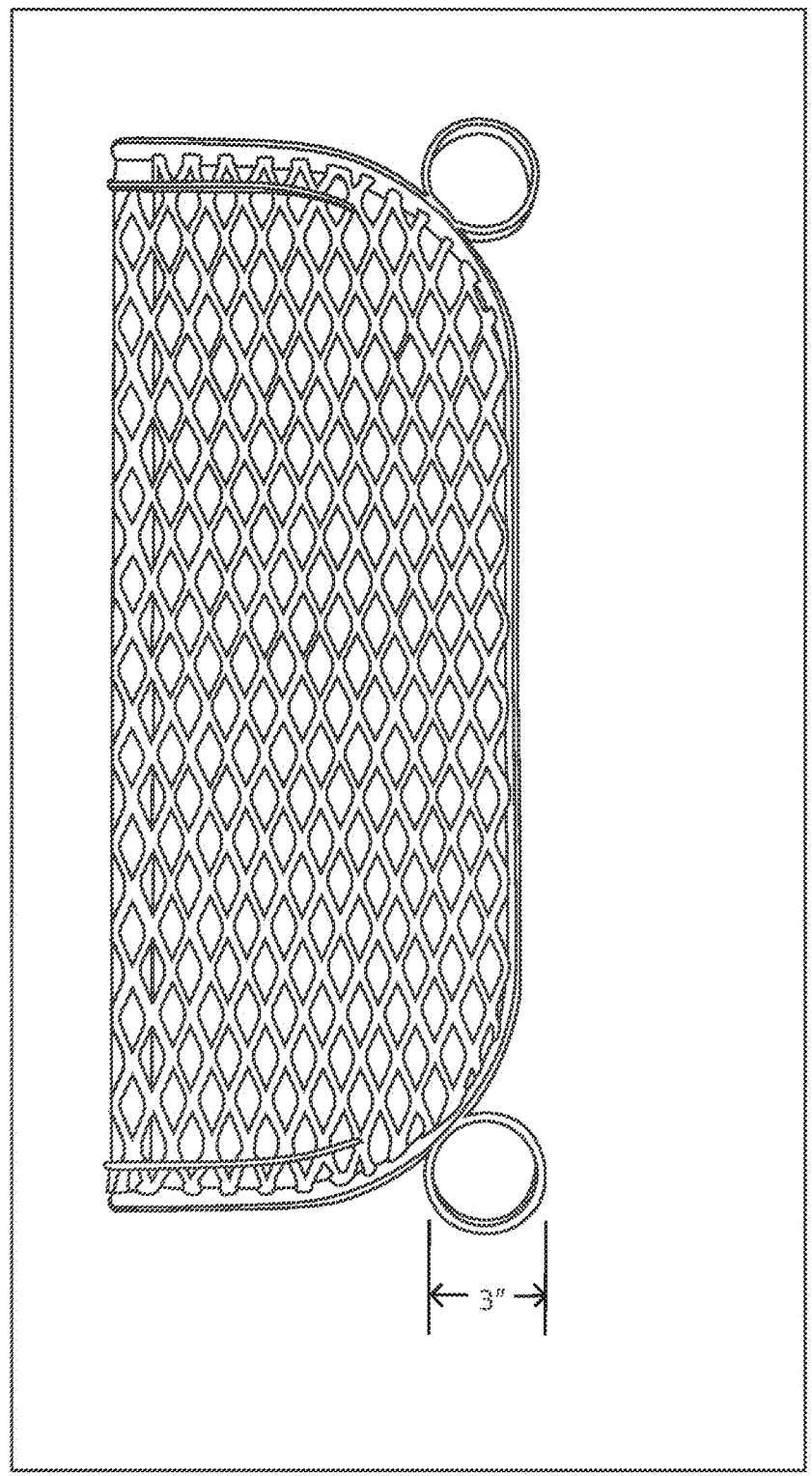
Figure 51:
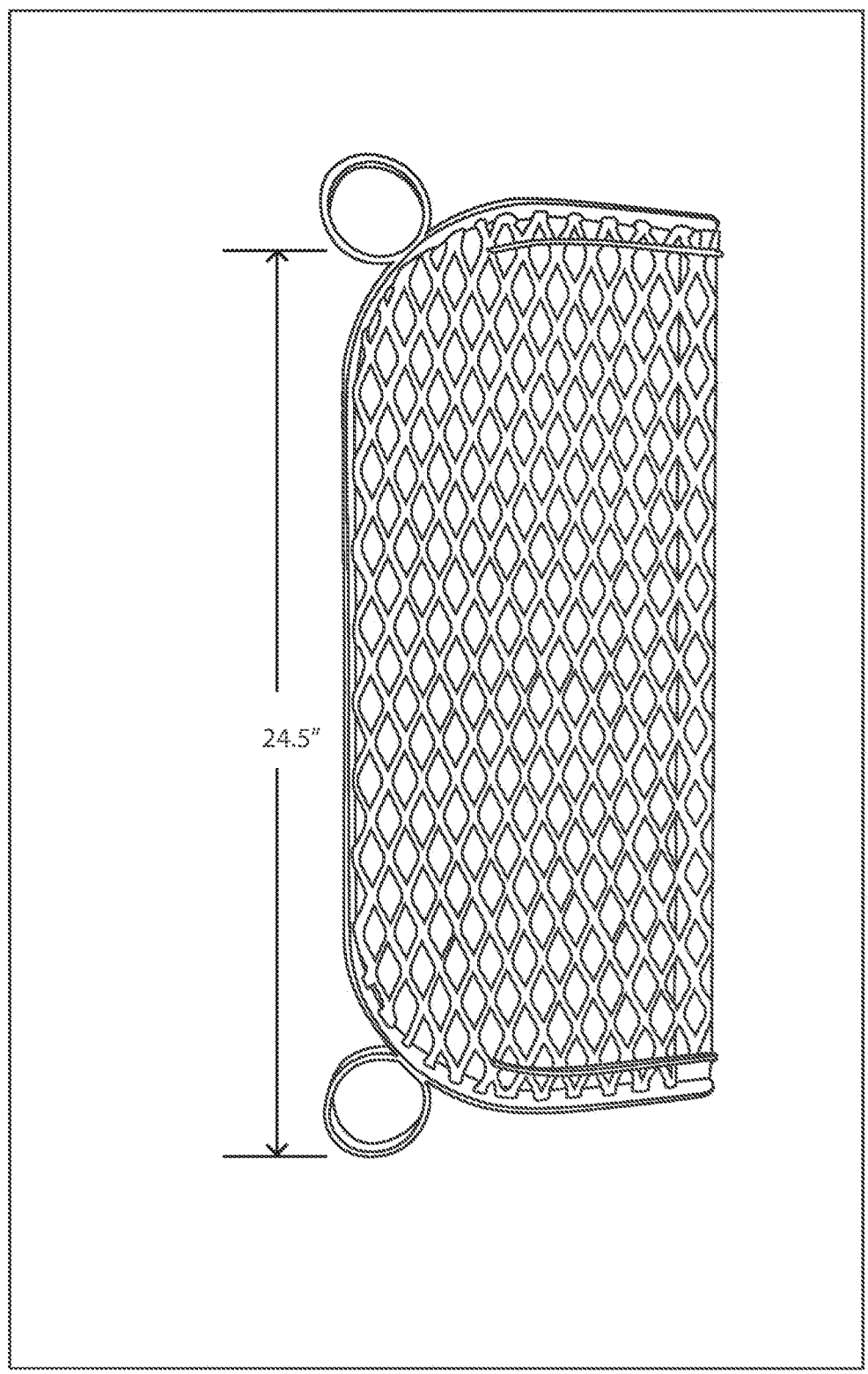
Figure 52:
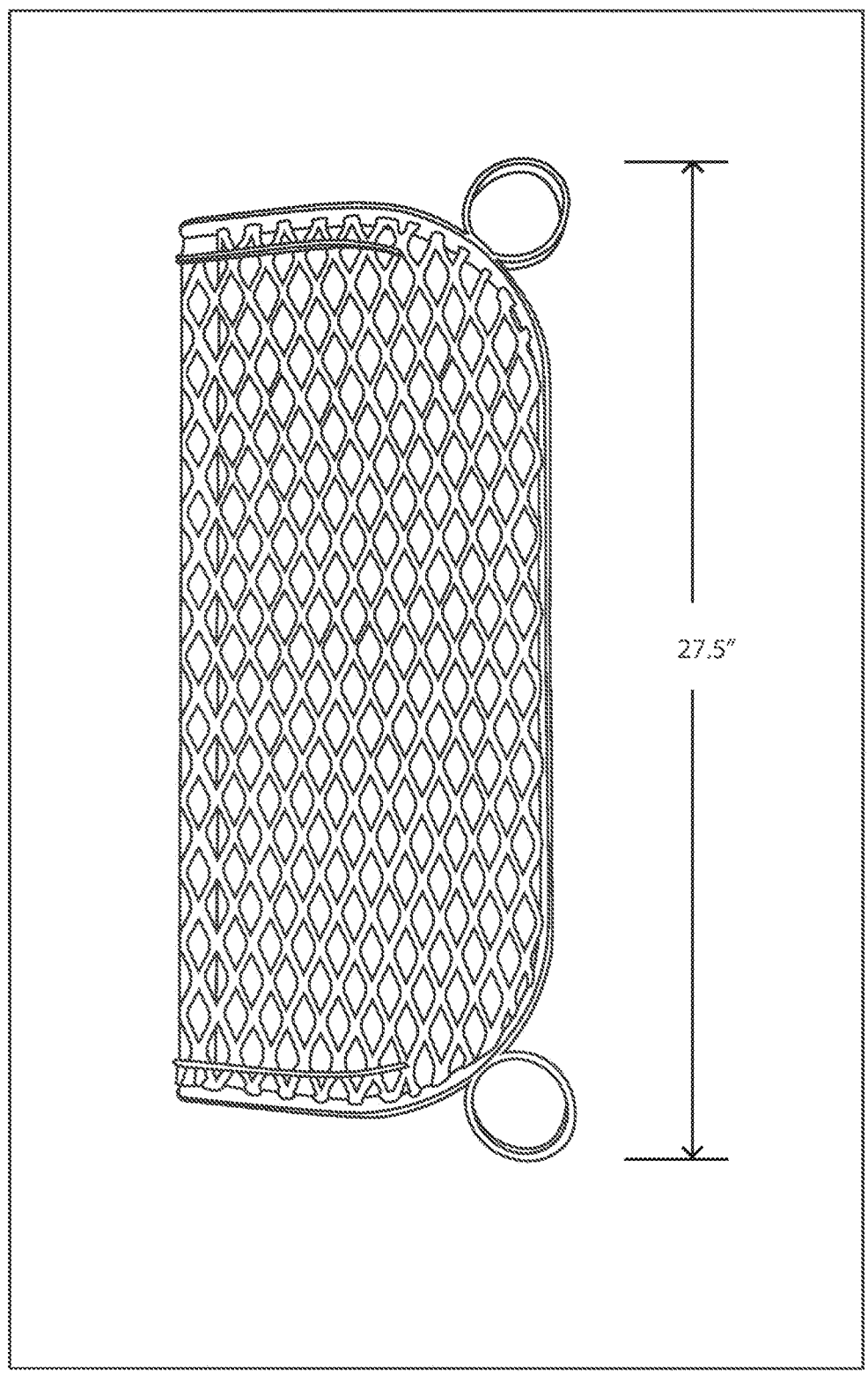
Figure 53:
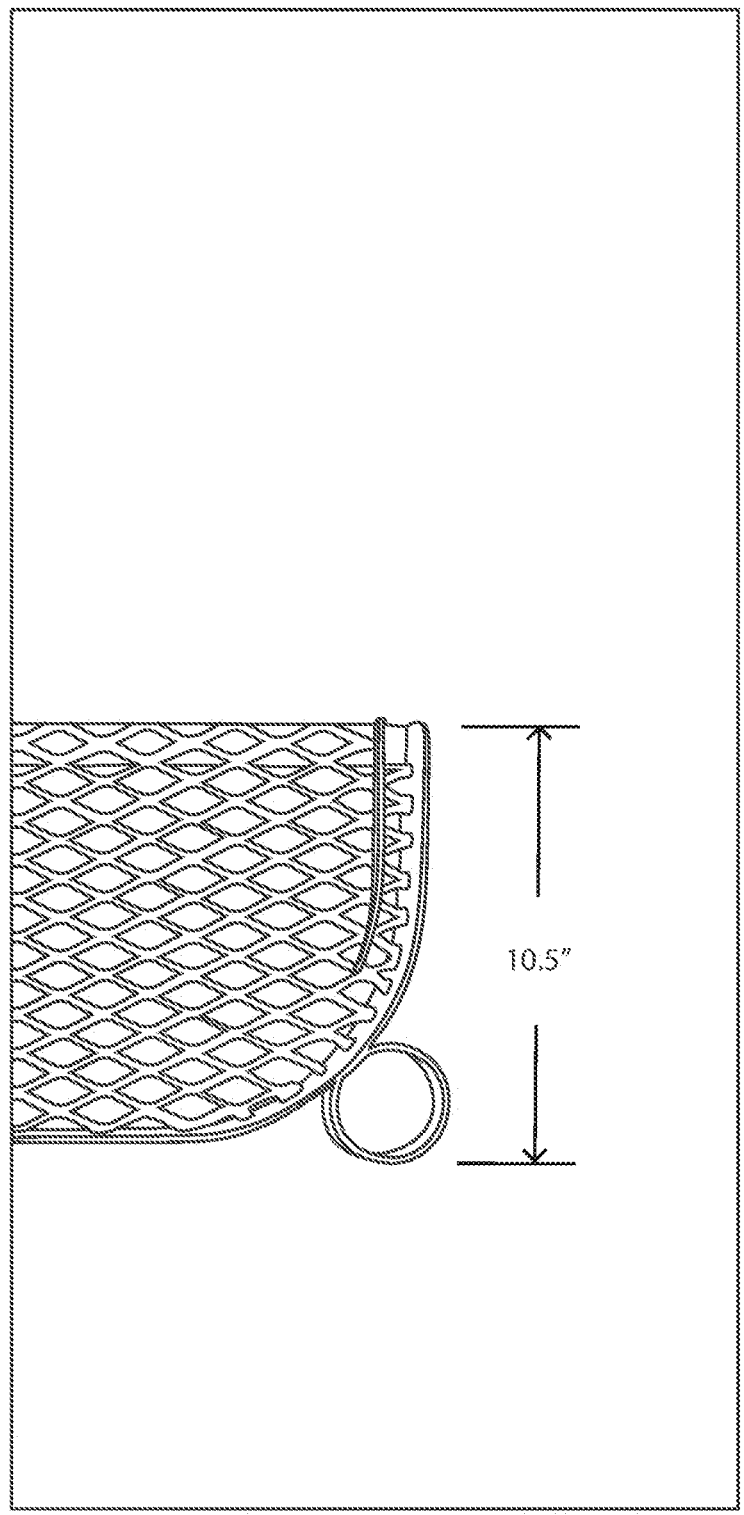
Figure 54:
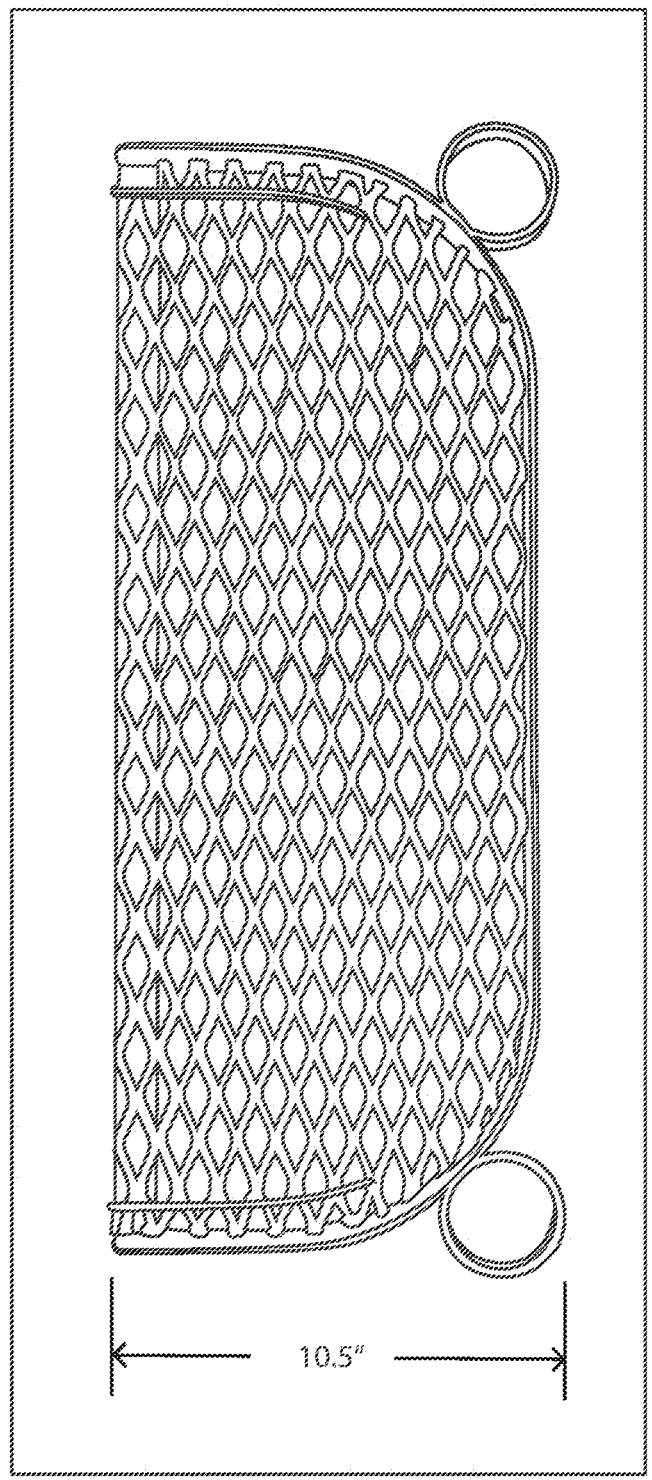

FIGS. 38, 39, 40, and 41 show steps in cleaning a concrete broom or brush with the shelf. Like the screed, brooms used in concrete work are large and often difficult to clean, especially wire bristle brooms. The usual cleaning process is to soak the broom bristles in water, then smack them on the ground. Not only is this an inefficient cleaning method, it also leaves concrete material on the ground of the work site. The shelf 5 permits a worker to scrape off the bristles by brushing them back and forth against the grating of the shelf 5 and/or the scraping flange 13, as shown in FIGS. 38 and 39. Instead of smacking the broom against the ground, the cleaning of the broom can be finished by striking the bristles against the shelf 5, as shown in FIGS. 40 and 41. Any concrete material not removed by the scraping is knocked free and collected in the basin 3, thereby minimizing the dirtying of the work site with concrete material.

FIGS. 42, 43, 44, and 45 show views of the upper side of a shelf in accordance with at least one possible exemplary embodiment. FIGS. 46, 47, 48, 49, 50, 51, 52, 53, and 54 show views of the lower side of the shelf shown in FIGS. 42, 43, 44, and 45. This embodiment of the shelf 5 has somewhat different dimensions than the embodiment shown in the other figures and omits the scraping flange 13 and retaining bracket 15.

The entirety of the appended drawings, including all dimensions, proportions, and/or shapes disclosed thereby or reasonably understood therefrom, are hereby incorporated by reference. All of the patents, patent applications, patent publications, and other documents cited herein, are hereby incorporated by reference as if set forth in their entirety herein.

Although the invention has been described in detail for the purpose of illustration of any embodiments disclosed herein, including the most practical or preferred embodiments at the time of filing of this application, it is to be understood that such detail is solely for that purpose and that the invention is not limited to such embodiments, but, on the contrary, is intended to cover modifications and equivalent arrangements that are within the spirit and scope of the present application, including the specification and the claims as originally filed, as amended, or as issued. For example, it is to be understood that the present invention contemplates that, to the extent possible, one or more features or components of any disclosed embodiment can be combined with one or more features or components of any other disclosed embodiment.

What is claimed is:

1. A concrete wheelbarrow shelf arrangement configured to support concrete tools thereon, said concrete wheelbarrow shelf arrangement comprising:
    a main body portion being configured, upon installation on a wheelbarrow, to be disposed to cover over or span across a portion of a wheelbarrow basin;
    said main body portion comprising openings therein to permit water and concrete material to pass through said shelf and into the wheelbarrow basin upon cleaning of concrete tools;
    an outer flange being disposed to extend transverse to or essentially perpendicular to said upper surface of said main body portion;
    said out flange being configured to minimize or prevent sliding movement of said shelf arrangement along a lip of the wheelbarrow basin;
    at least one inner flange being disposed to extend transverse to or essentially perpendicular to said lower surface of said main body portion;
    said at least one inner flange being configured to minimize or prevent sliding movement of said shelf arrangement along a lip of the wheelbarrow basin;
    at least one holding ring being configured to hold brushes or similar cleaning implements; and
    a retaining bracket being configure to suspend said shelf arrangement from the lip of the wheelbarrow basin in a storage position adjacent a rear surface of the wheelbarrow basin and between handles of the wheelbarrow upon said shelf arrangement not being in use to clean concrete tools.

2. The concrete wheelbarrow shelf arrangement according to claim 1, further comprising a scraping flange being disposed to project out of an upper surface of said main body portion and being configured to be used to scrape concrete material off of concrete tools being rubbed back and forth against said scraping flange.

3. The concrete wheelbarrow shelf arrangement according to claim 1, further comprising at least one brush device being detachably connected to said main body portion to permit a worker to rub concrete tools against said at least one brush device to clean the concrete tools.

4. A concrete wheelbarrow shelf arrangement configured to support concrete tools thereon, said concrete wheelbarrow shelf arrangement comprising:
   a main body portion being configured, upon installation on a wheelbarrow, to be disposed to cover over or span across a portion of a wheelbarrow basin;
   said main body portion comprising openings therein to permit water and concrete material to pass through said shelf and into the wheelbarrow basin upon cleaning of concrete tools;
   an outer flange being disposed to extend transverse to or essentially perpendicular to said upper surface of said main body portion;
   said out flange being configured to minimize or prevent sliding movement of said shelf arrangement along a lip of the wheelbarrow basin;
   at least one inner flange being disposed to extend transverse to or essentially perpendicular to said lower surface of said main body portion;
   said at least one inner flange being configured to minimize or prevent sliding movement of said shelf arrangement along a lip of the wheelbarrow basin;
   at least one holding ring being configured to hold brushes or similar cleaning implements;
   a scraping flange being disposed to project out of an upper surface of said main body portion and being configured to be used to scrape concrete material off of concrete tools being rubbed back and forth against said scraping flange; and
   a retaining bracket being configured to suspend said shelf arrangement from the lip of the wheelbarrow basin in a storage position adjacent a rear surface of the wheelbarrow basin and between handles of the wheelbarrow upon said shelf arrangement not being in use to clean concrete tools.

5. The concrete wheelbarrow shelf arrangement according to claim 2, further comprising at least one brush device being detachably connected to said main body portion to permit a worker to rub concrete tools against said at least one brush device to clean the concrete tools.

6. A method of cleaning concrete tools, said method comprising the steps of:
   having a concrete wheelbarrow shelf arrangement comprising:
       a main body portion being configured, upon installation on a wheelbarrow, to be disposed to cover over or span across a portion of a wheelbarrow basin;
       said main body portion comprising openings therein to permit water and concrete material to pass through said shelf and into the wheelbarrow basin upon cleaning of concrete tools;
       an outer flange being disposed to extend transverse to or essentially perpendicular to said upper surface of said main body portion;
       said out flange being configured to minimize or prevent sliding movement of said shelf arrangement along a lip of the wheelbarrow basin;
       at least one inner flange being disposed to extend transverse to or essentially perpendicular to said lower surface of said main body portion;
       said at least one inner flange being configured to minimize or prevent sliding movement of said shelf arrangement along a lip of the wheelbarrow basin; and
       at least one holding ring being configured to hold brushes or similar cleaning implements;
   installing said concrete wheelbarrow shelf on a wheelbarrow by placing said main body to cover over or span across a portion of a wheelbarrow basin;
   wetting a concrete tool with water from said wheelbarrow basin or other container;
       removing concrete material from said concrete tool by rubbing or scraping a portion of said concrete tool against or across said main body portion or manually brushing or scraping a portion of said concrete tool being supported on or held by said concrete wheelbarrow shelf;
   catching at least a substantial portion of removed concrete material in said wheelbarrow basin;
   rinsing said concrete tool by at least one of steps (i) and (ii):
       (i) submerging said concrete tool in water in said wheelbarrow basin by inserting said concrete tool into the portion of said wheelbarrow basin not covered by said main body; and
       (ii) placing said concrete tool on said concrete wheelbarrow shelf and pouring water over said concrete tool, taken from either said wheelbarrow basin or another source of water, and permitting the poured water and any concrete material removed thereby to flow through said openings in said main body and into said wheelbarrow basin; and
   placing other concrete tools on said main body or in said at least one holding ring for temporary storage prior to cleaning or after cleaning.

7. The method of cleaning concrete tools according to claim 6, said method further comprising removing concrete material from said concrete tool by rubbing a portion of said concrete tool against or across said at least one brush device detachably connected to said to said main body portion.

8. The method of cleaning concrete tools according to claim 6, said method further comprising removing concrete material from said concrete tool by rubbing or scraping a portion of said concrete tool against or across a scraping flange being disposed to project out of an upper surface of said main body portion.

* * * * *